(12) United States Patent
Nakagawa et al.

(10) Patent No.: US 10,012,160 B2
(45) Date of Patent: Jul. 3, 2018

(54) CONTROL DEVICE AND CONTROL METHOD OF ENGINE

(71) Applicant: Hitachi Automotive Systems, Ltd., Hitachinaka-shi, Ibaraki (JP)

(72) Inventors: Shinji Nakagawa, Tokyo (JP); Akihito Numata, Ibaraki (JP); Eisaku Fukuchi, Ibaraki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 365 days.

(21) Appl. No.: 14/760,930

(22) PCT Filed: Jan. 10, 2014

(86) PCT No.: PCT/JP2014/050265
§ 371 (c)(1),
(2) Date: Jul. 14, 2015

(87) PCT Pub. No.: WO2014/112427
PCT Pub. Date: Jul. 24, 2017

(65) Prior Publication Data
US 2015/0369152 A1    Dec. 24, 2015

(30) Foreign Application Priority Data
Jan. 18, 2013 (JP) .................... 2013-007255

(51) Int. Cl.
*F02D 41/00* (2006.01)
*F02D 41/14* (2006.01)
(Continued)

(52) U.S. Cl.
CPC ..... *F02D 41/0085* (2013.01); *F02D 41/1456* (2013.01); *F02D 41/1498* (2013.01);
(Continued)

(58) Field of Classification Search
CPC ............... F02D 41/0085; F02D 41/247; F02D 41/1456; F02D 41/1498; F02D 41/40; F02D 2041/288; Y02T 10/44
(Continued)

(56) References Cited

U.S. PATENT DOCUMENTS 4,096,833 A * 6/1978 Sweet .................. F02D 41/064
123/488
4,232,830 A * 11/1980 Casey ................ F02M 51/0678
239/585.5

(Continued)

FOREIGN PATENT DOCUMENTS

DE          199 45 618 A1     3/2001
DE          19945618 A1 *     3/2001   ......... F02D 41/1454
(Continued)

OTHER PUBLICATIONS

European Search Report issued in counterpart European Application No. 14740393.5 dated Aug. 5, 2016 (8 pages).

(Continued)

*Primary Examiner* — Sizo Vilakazi
*Assistant Examiner* — Brian Kirby
(74) *Attorney, Agent, or Firm* — Crowell & Moring LLP

(57) ABSTRACT

It is possible to prevent the stability of an engine from deteriorating even when degrees of changes over time of injection characteristics are different in each fuel injection valve. An inter-cylinder air-fuel ratio variation detection unit 1100 calculates an air-fuel ratio variation index (Ind_imb) which indicates a degree of variation in an air-fuel ratio between cylinders from an exhaust air-fuel ratio, engine rotation speed, or the like. Unlike in a case where the air-fuel ratio variation index (Ind_imb) is lower than a set value, when the air-fuel ratio variation index (Ind_imb) is higher than the set value, a fuel injection pulse width limitation unit (Continued)

2100 sets a (allowable) minimum value (Min_TI) of a fuel injection pulse width so as to be greater. In addition, a fuel injection pulse width calculation unit 3100 calculates fuel injection pulse widths (TI_1, TI_2, TI_3, and TI_4) of cylinders so as not to be lower than the minimum value (Min_TI).

12 Claims, 40 Drawing Sheets

(51) Int. Cl.
 *F02D 41/40* (2006.01)
 *F02D 41/24* (2006.01)
 *F02D 41/28* (2006.01)

(52) U.S. Cl.
 CPC ........... *F02D 41/247* (2013.01); *F02D 41/40* (2013.01); *F02D 2041/288* (2013.01); *Y02T 10/44* (2013.01)

(58) Field of Classification Search
 USPC ................................. 701/103–104; 123/445
 See application file for complete search history.

(56) References Cited

U.S. PATENT DOCUMENTS

| | | | | |
|---|---|---|---|---|
| 4,254,653 A * | 3/1981 | Casey | | F02M 51/0678 73/1.26 |
| 4,949,904 A * | 8/1990 | Bata | | F02M 51/0614 239/5 |
| 5,191,531 A * | 3/1993 | Kurosu | | F02D 41/34 123/295 |
| 6,053,150 A * | 4/2000 | Takahashi | | F02D 41/2438 123/300 |
| 6,085,142 A * | 7/2000 | Di Leo | | F02D 41/1498 701/104 |
| 6,192,855 B1 * | 2/2001 | Schietecatte | | F02D 41/1497 123/299 |
| 6,192,863 B1 * | 2/2001 | Takase | | F02D 41/3809 123/357 |
| 6,236,910 B1 * | 5/2001 | Iwai | | F02D 41/26 123/480 |
| 6,340,014 B1 * | 1/2002 | Tomita | | F02D 41/024 123/295 |
| 6,401,703 B1 * | 6/2002 | Mamiya | | F02D 31/008 123/295 |
| 6,481,427 B1 * | 11/2002 | Javaherian | | F02D 41/1408 123/673 |
| 6,668,812 B2 * | 12/2003 | Javaherian | | F02D 41/0085 123/406.24 |
| 6,748,920 B2 * | 6/2004 | Ito | | F02D 41/403 123/299 |
| 6,928,983 B2 * | 8/2005 | Mashiki | | F02D 41/008 123/300 |
| 7,093,586 B2 * | 8/2006 | Mattes | | F02D 41/247 123/478 |
| 7,152,594 B2 * | 12/2006 | Anilovich | | F02D 41/1454 123/690 |
| 7,219,005 B2 * | 5/2007 | Mazet | | F02D 41/20 123/299 |
| 7,325,535 B2 * | 2/2008 | Kumano | | F02D 35/023 123/305 |
| 7,357,123 B2 * | 4/2008 | Maekawa | | F02D 11/106 123/490 |
| 7,509,946 B2 * | 3/2009 | Cooke | | F02D 41/2096 123/498 |
| 7,552,709 B2 * | 6/2009 | Fujii | | F02D 41/2438 123/299 |
| 8,374,770 B2 * | 2/2013 | Jung | | F02D 41/009 123/324 |
| 2002/0099492 A1 * | 7/2002 | Okawa | | F02D 41/008 701/104 |
| 2005/0022783 A1 * | 2/2005 | Nagano | | F02D 41/3094 123/339.23 |
| 2005/0274353 A1 * | 12/2005 | Okubo | | F02D 41/0042 123/299 |
| 2006/0074543 A1 * | 4/2006 | Rossignol | | F02D 41/1498 701/111 |
| 2007/0119413 A1 * | 5/2007 | Lewis | | F02D 41/0025 123/295 |
| 2007/0169756 A1 * | 7/2007 | Potter | | F02D 41/20 123/490 |
| 2007/0215096 A1 * | 9/2007 | Kumano | | F02D 35/023 123/295 |
| 2008/0087251 A1 * | 4/2008 | Idogawa | | F02D 41/0255 123/445 |
| 2009/0029440 A1 | 1/2009 | Vind et al. | | |
| 2009/0099753 A1 * | 4/2009 | Kaneko | | F02D 41/1475 701/103 |
| 2009/0150045 A1 * | 6/2009 | Iwashita | | F02D 41/403 701/103 |
| 2010/0077728 A1 * | 4/2010 | Wang | | F02D 41/0085 60/276 |
| 2011/0029218 A1 | 2/2011 | Nakagawa et al. | | |
| 2011/0174282 A1 * | 7/2011 | Maruyama | | F02D 41/0085 123/703 |
| 2011/0185798 A1 * | 8/2011 | Kim | | G01M 15/00 73/114.48 |
| 2011/0192146 A1 * | 8/2011 | Sugimoto | | F02D 41/0085 60/276 |
| 2011/0277451 A1 * | 11/2011 | Hoshino | | F02D 41/0255 60/285 |
| 2011/0307164 A1 * | 12/2011 | Arihara | | F02D 35/026 701/105 |
| 2012/0072095 A1 * | 3/2012 | Shinoda | | F02D 19/0647 701/103 |
| 2012/0089318 A1 * | 4/2012 | Ruggiano | | F02D 41/0002 701/103 |
| 2012/0145122 A1 * | 6/2012 | Kurtz | | F02D 41/0025 123/299 |
| 2012/0166065 A1 * | 6/2012 | Lewis | | F02D 41/0025 701/103 |
| 2012/0173115 A1 * | 7/2012 | Sawada | | F02D 41/0085 701/101 |
| 2012/0180763 A1 * | 7/2012 | Cowgill | | F02D 41/402 123/478 |
| 2012/0209497 A1 | 8/2012 | Yoshikawa | | |
| 2012/0330533 A1 * | 12/2012 | Noda | | F02D 41/0085 701/104 |
| 2013/0151119 A1 * | 6/2013 | Mariucci | | F02D 41/402 701/104 |

FOREIGN PATENT DOCUMENTS

| | | | |
|---|---|---|---|
| DE | 100 12 025 A1 | 10/2001 | |
| DE | 10012025 A1 * | 10/2001 | ......... F02D 41/0085 |
| DE | 102 56 239 A1 | 6/2004 | |
| DE | 10 2006 015 968 B3 | 11/2007 | |
| DE | 10 2008 006 674 A1 | 8/2009 | |
| JP | 2003-138036 A | 5/2003 | |
| JP | 2004-132241 A | 4/2004 | |
| JP | 2005-133626 A | 5/2005 | |
| JP | 2009-281236 A | 12/2009 | |
| JP | 2011-27059 | 2/2011 | |
| JP | 2011-144785 A | 7/2011 | |
| JP | 2011-236862 A | 11/2011 | |
| JP | 2012-167646 A | 9/2012 | |

OTHER PUBLICATIONS

International Search Report (PCT/ISA/210) dated Feb. 25, 2014 with English-language translation (four (4) pages).

* cited by examiner

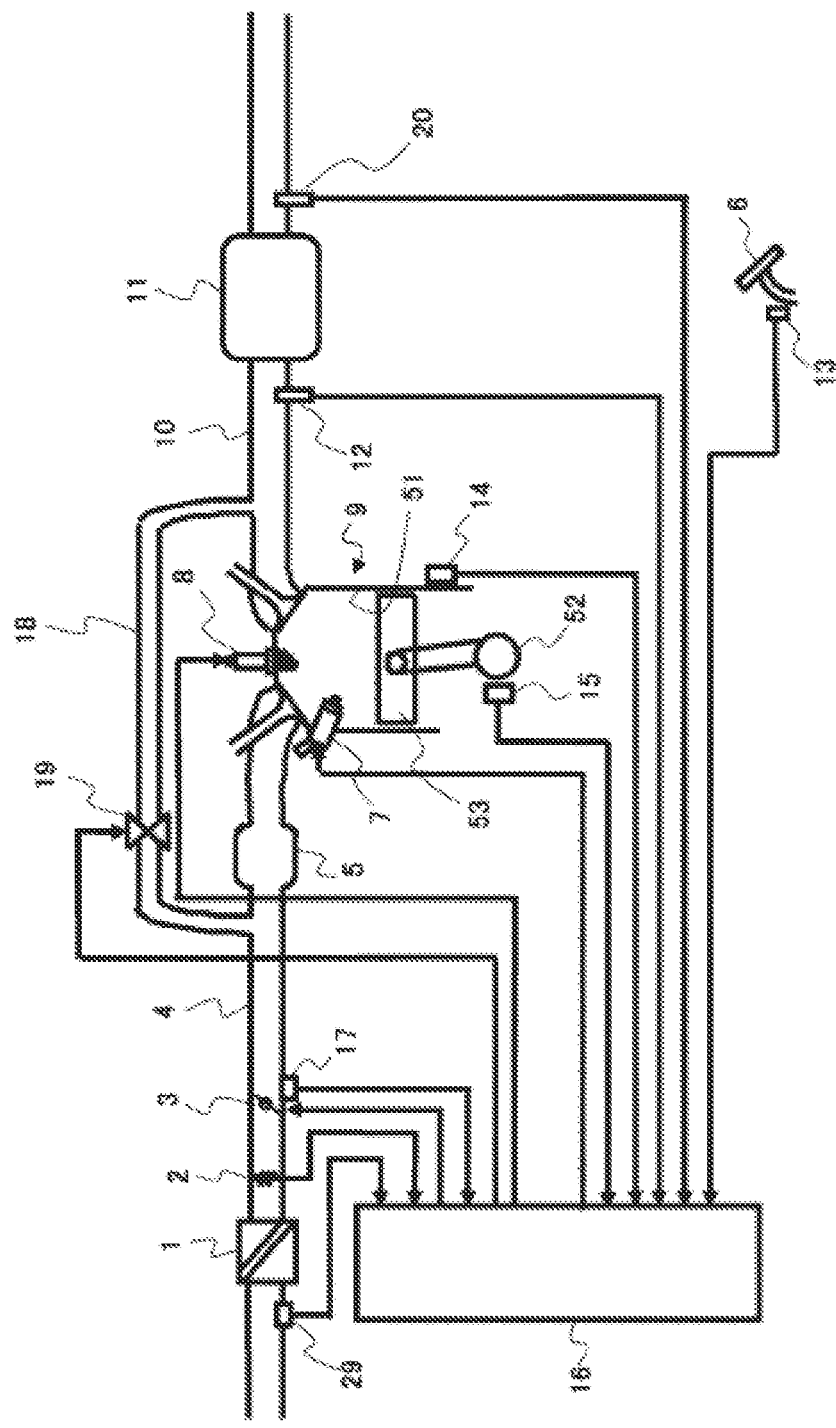
[Fig. 1]

[Fig. 2]
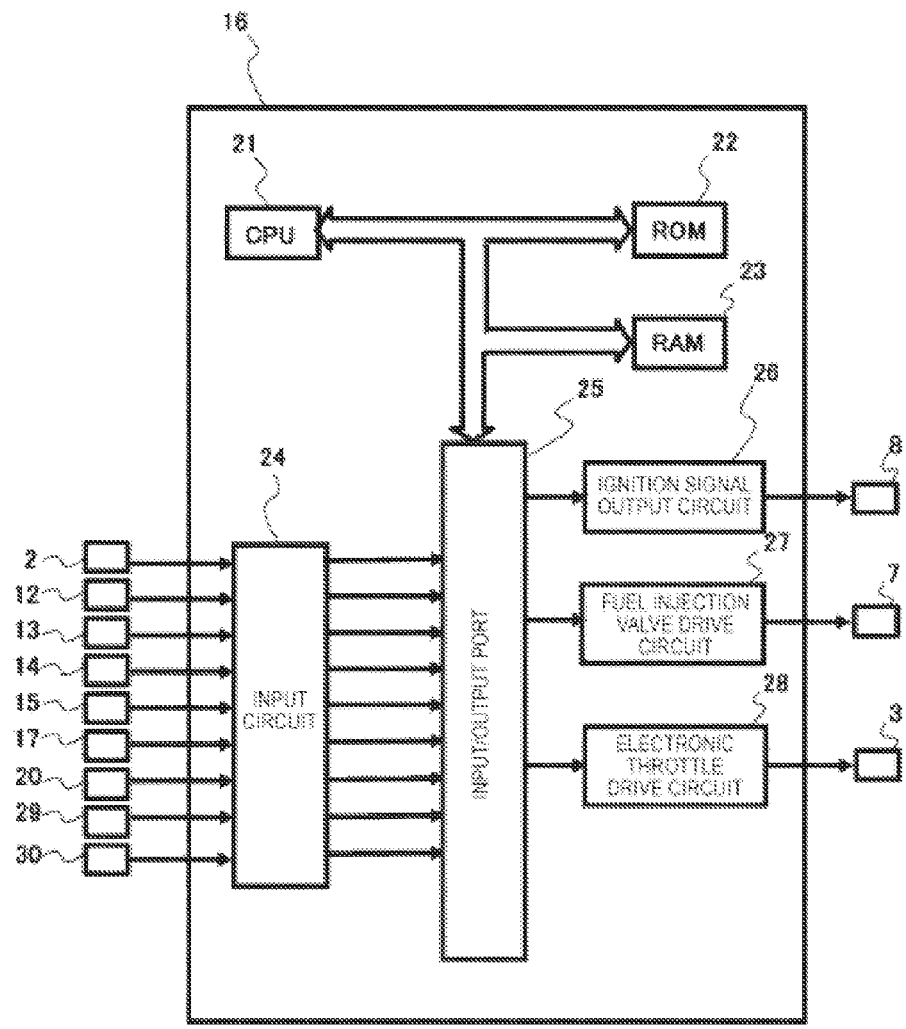

[Fig. 3]
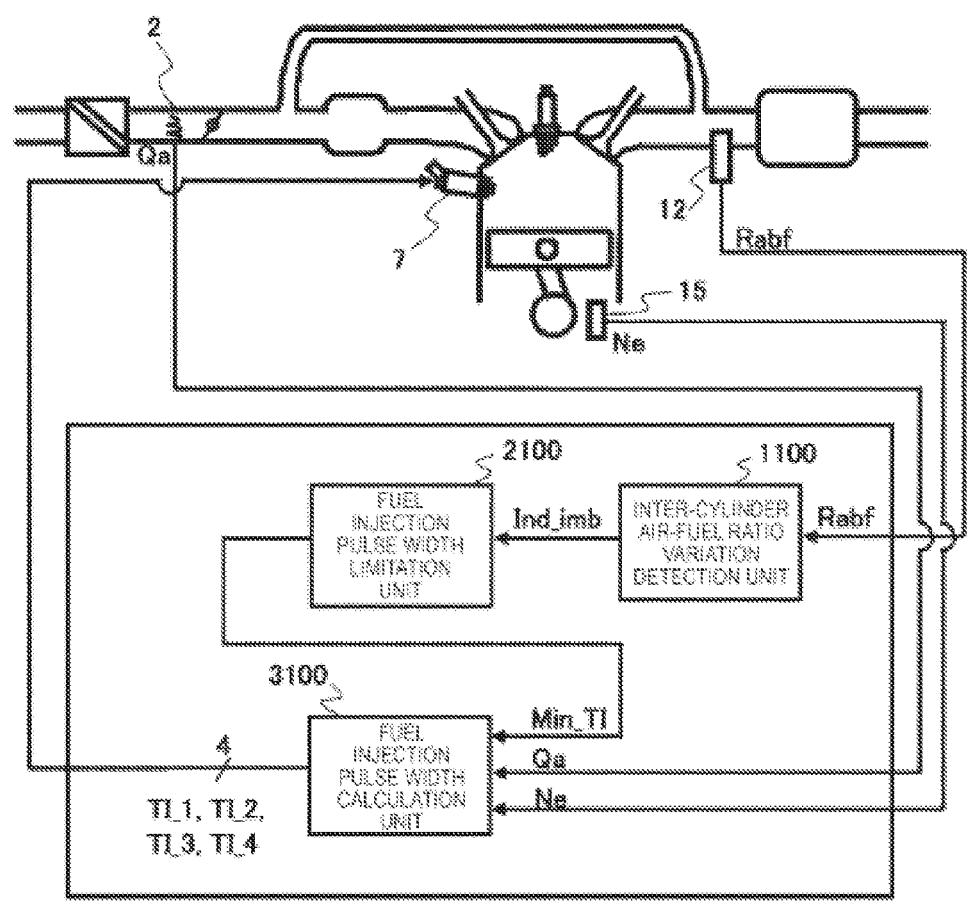

[Fig. 4]
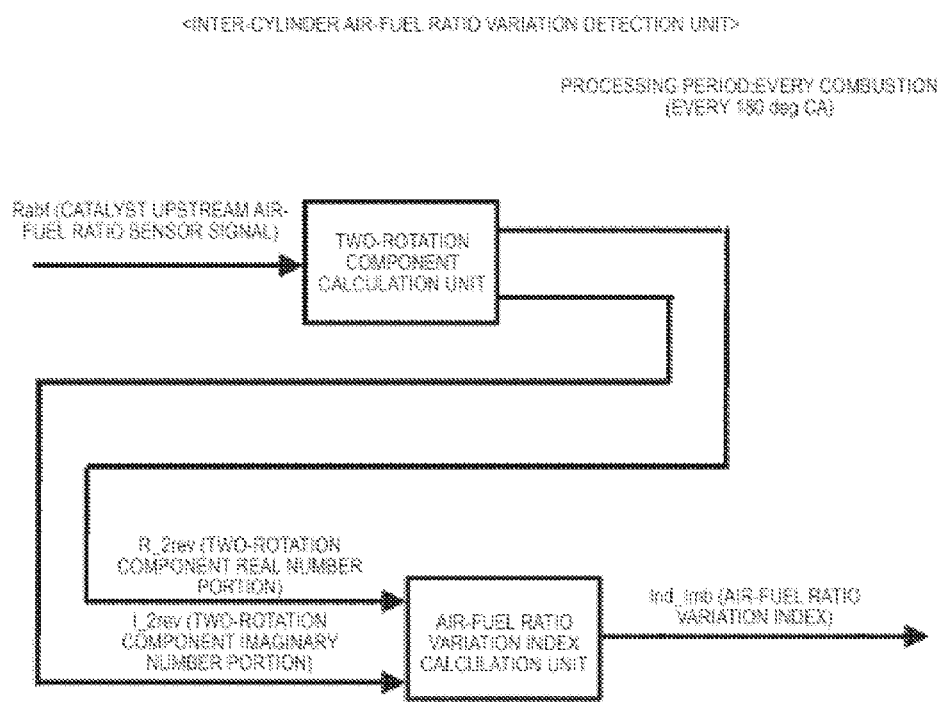

[Fig. 5]
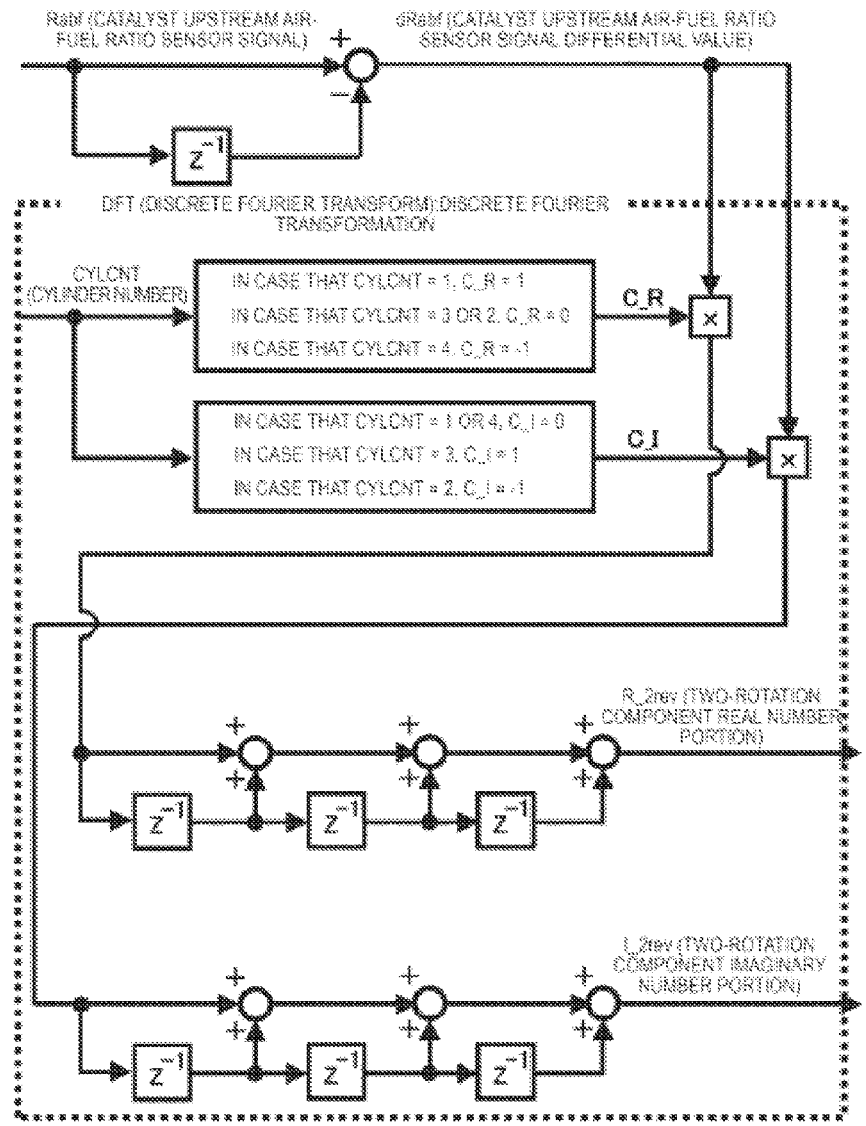

[Fig. 6]
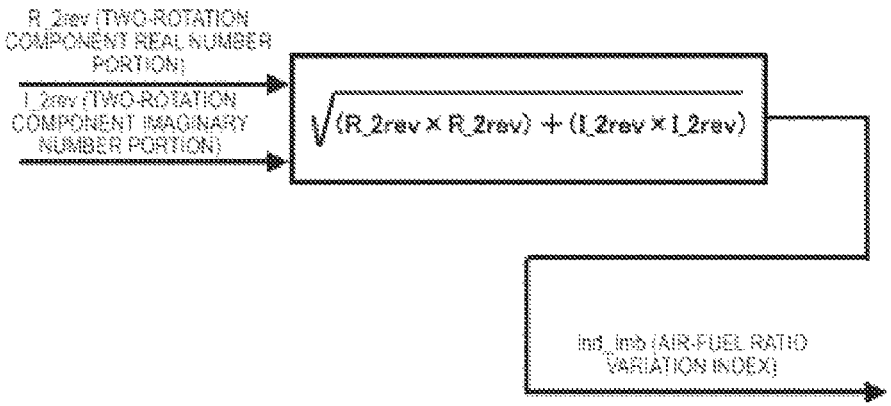
[Fig. 7]
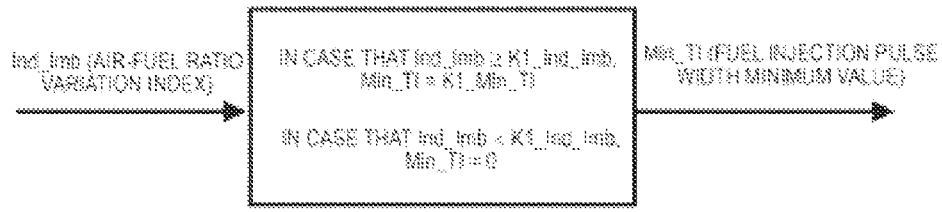

[Fig. 8]
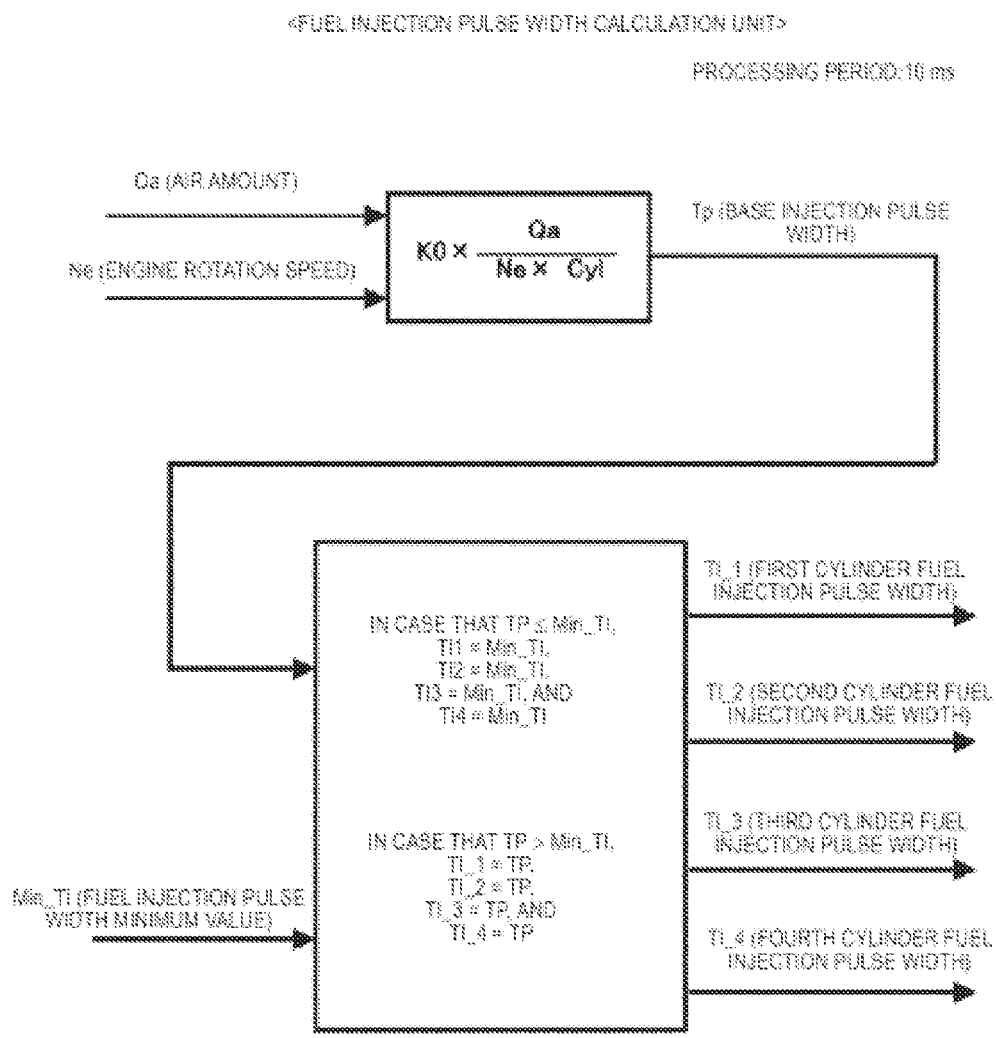

[Fig. 9]
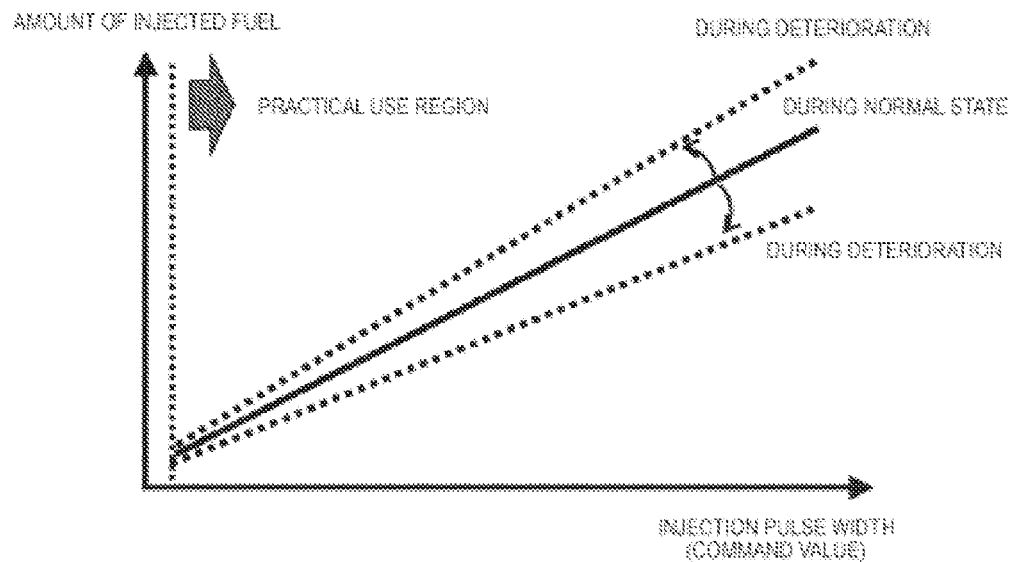
[Fig. 10]
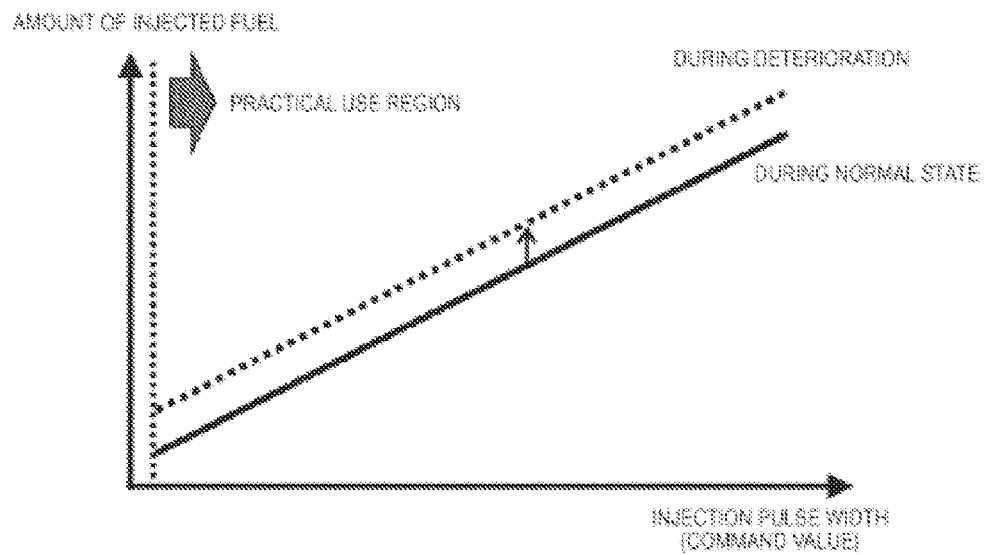

[Fig. 11]
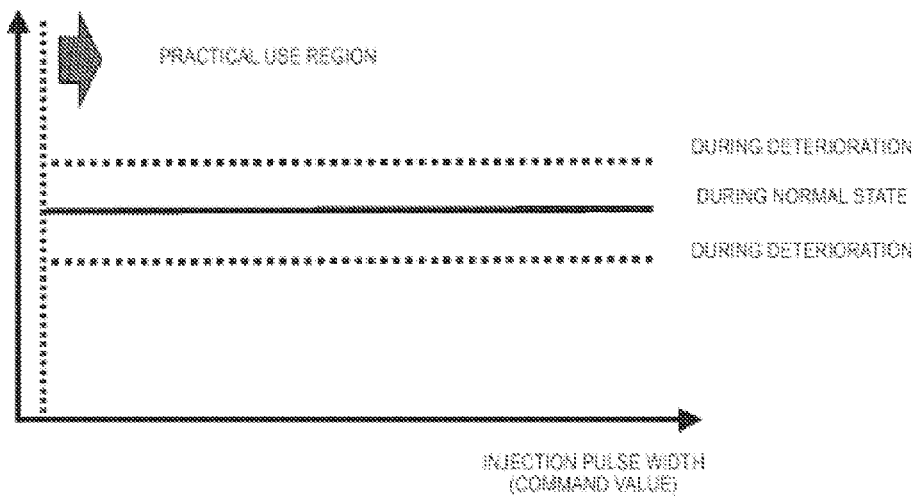
[Fig. 12]
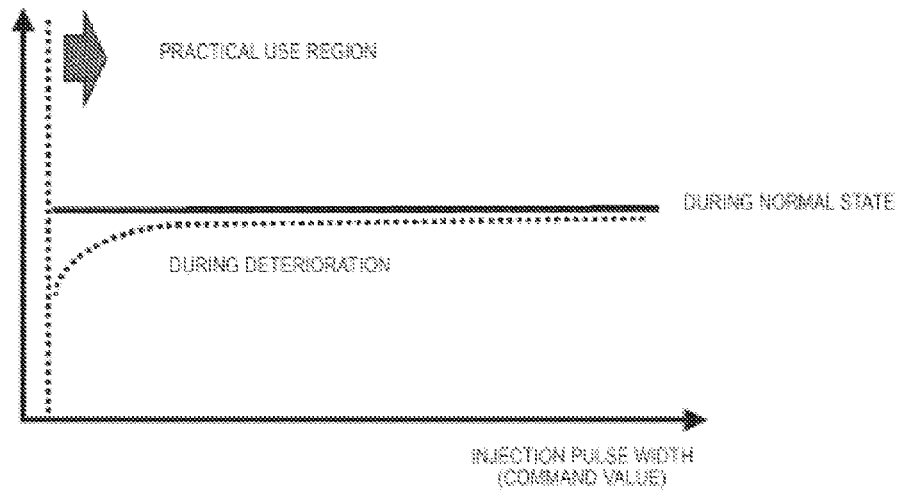

[Fig. 13A]
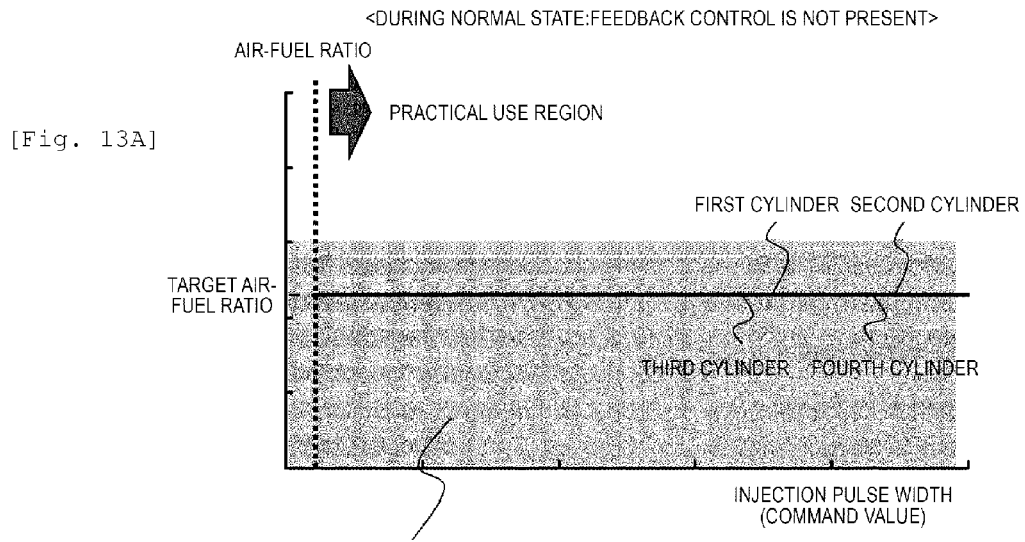
[Fig. 13B]
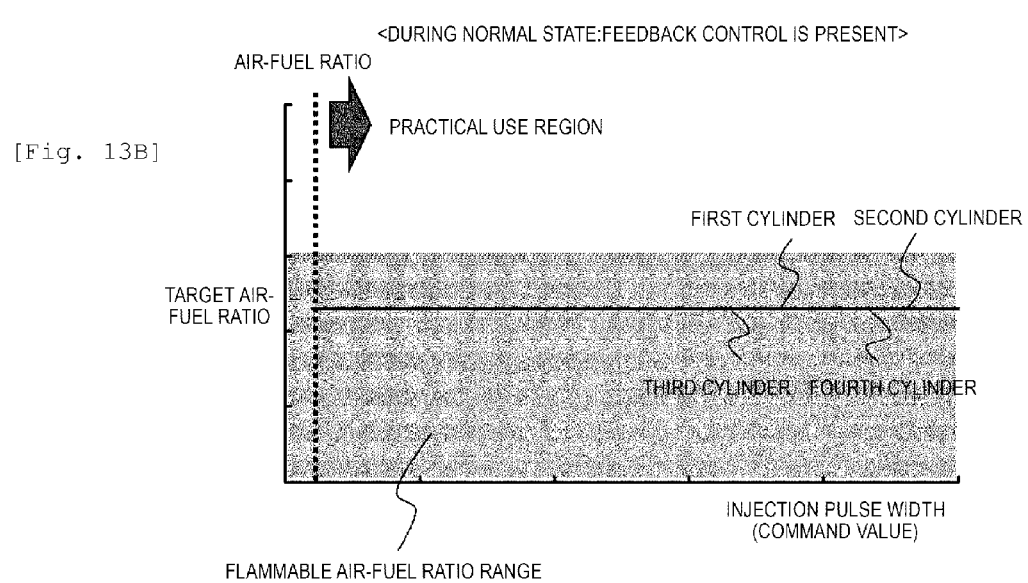

[Fig. 14A]
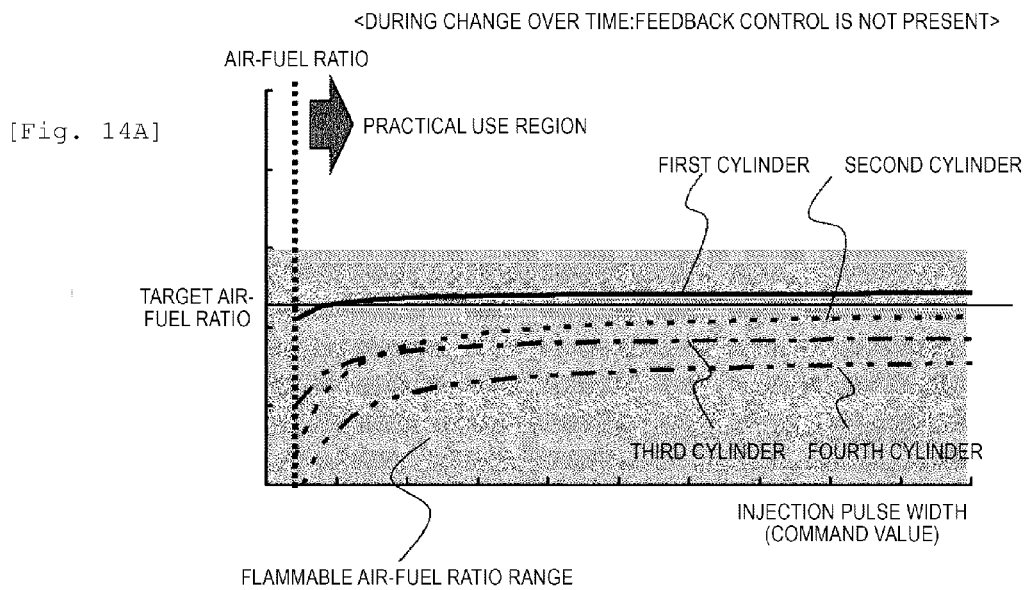
[Fig. 14B]
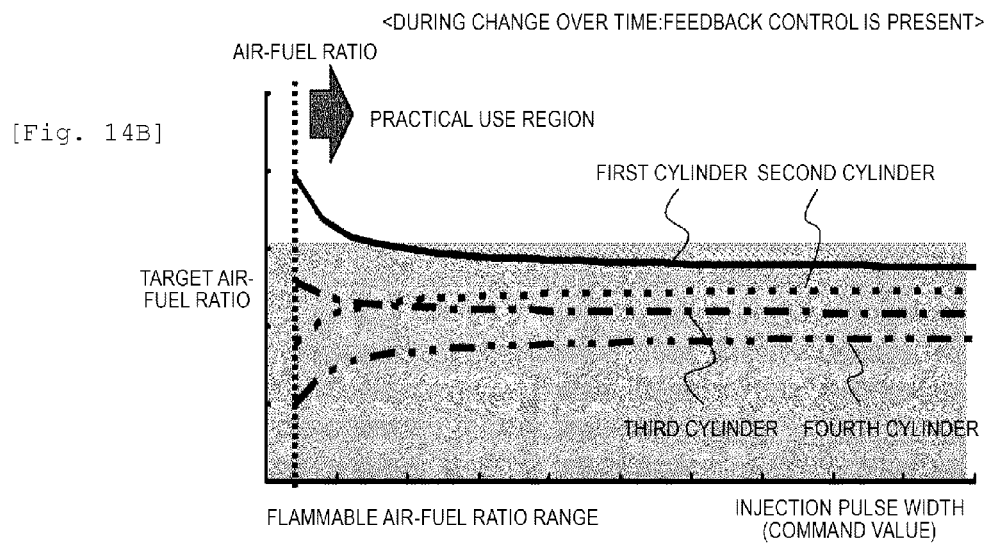

[Fig. 15]
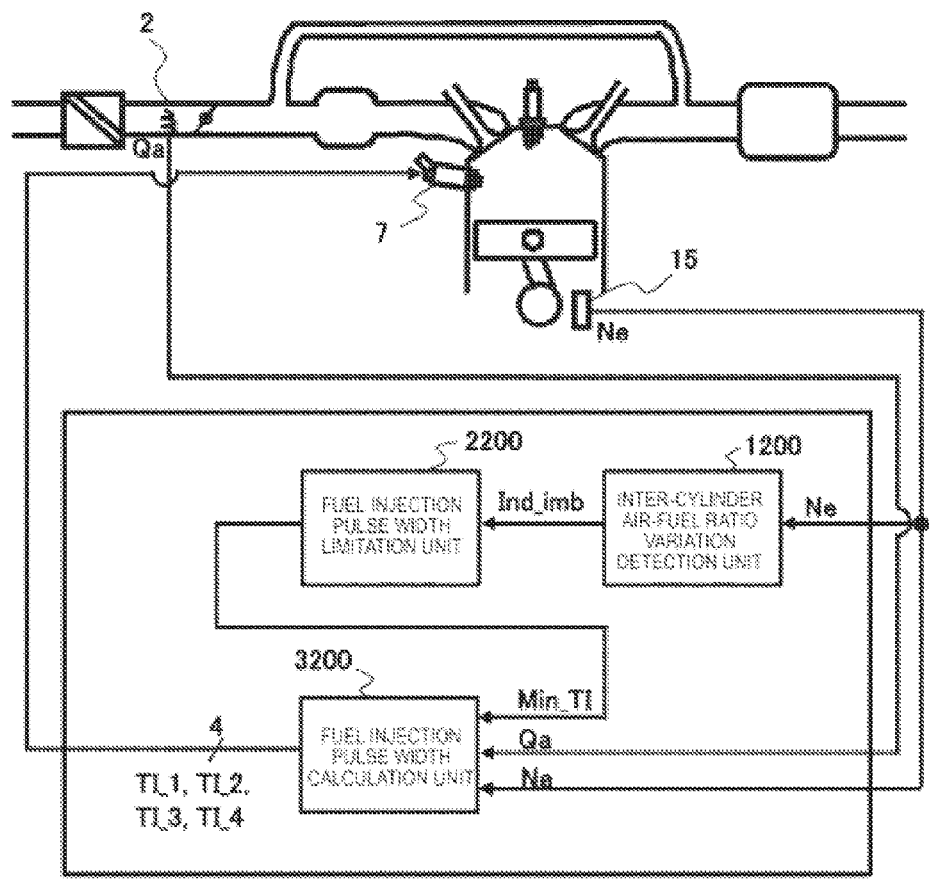

[Fig. 16]
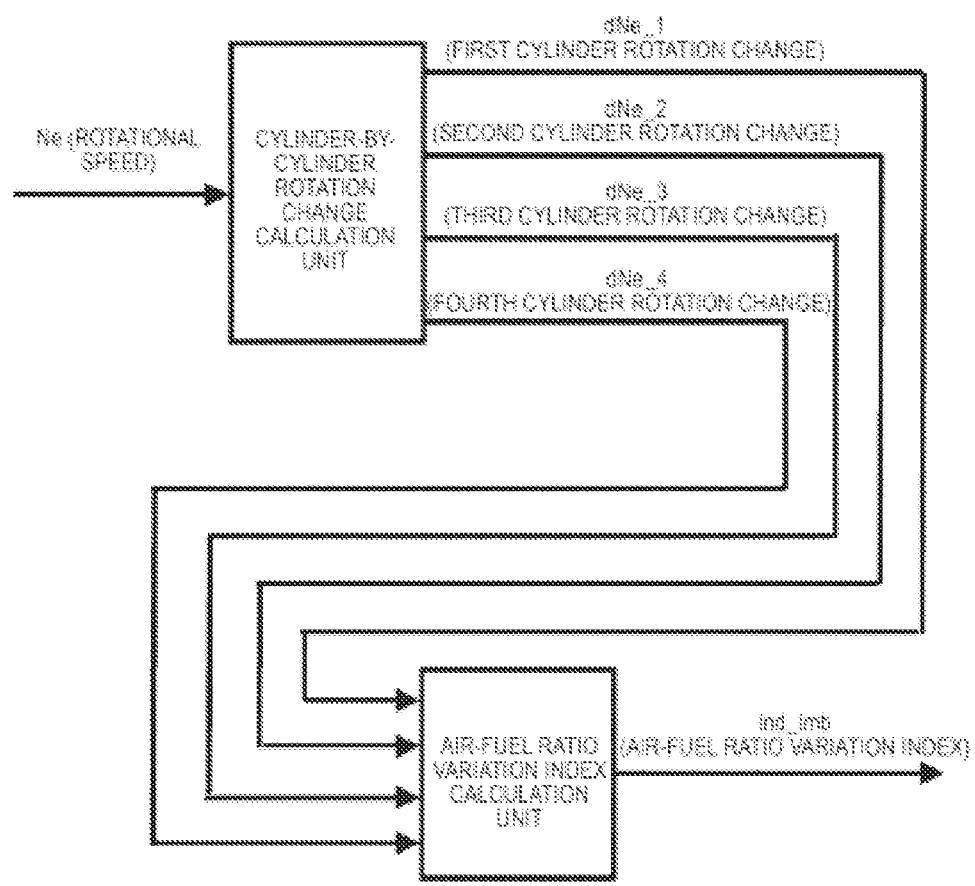

[Fig. 17]
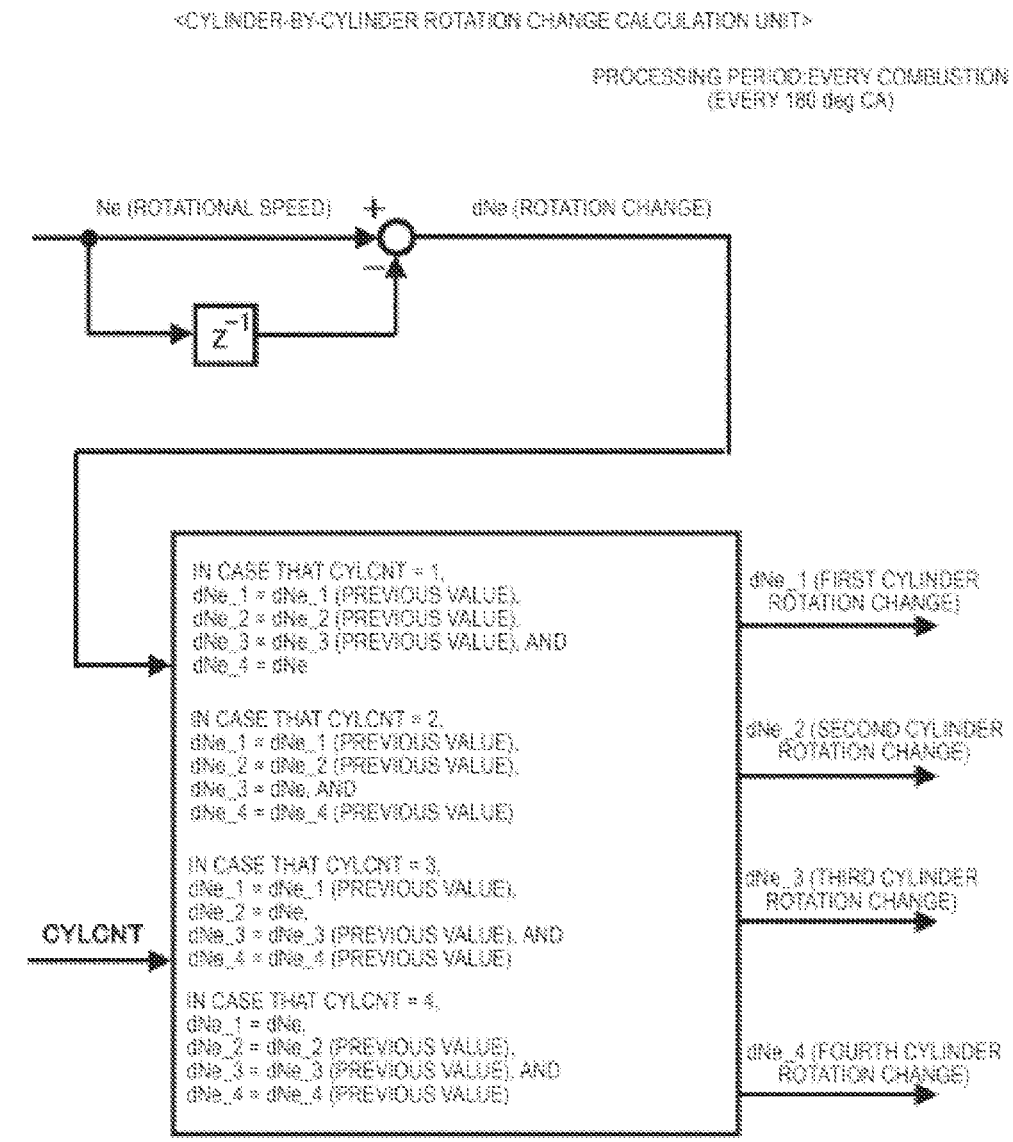

[Fig. 18]
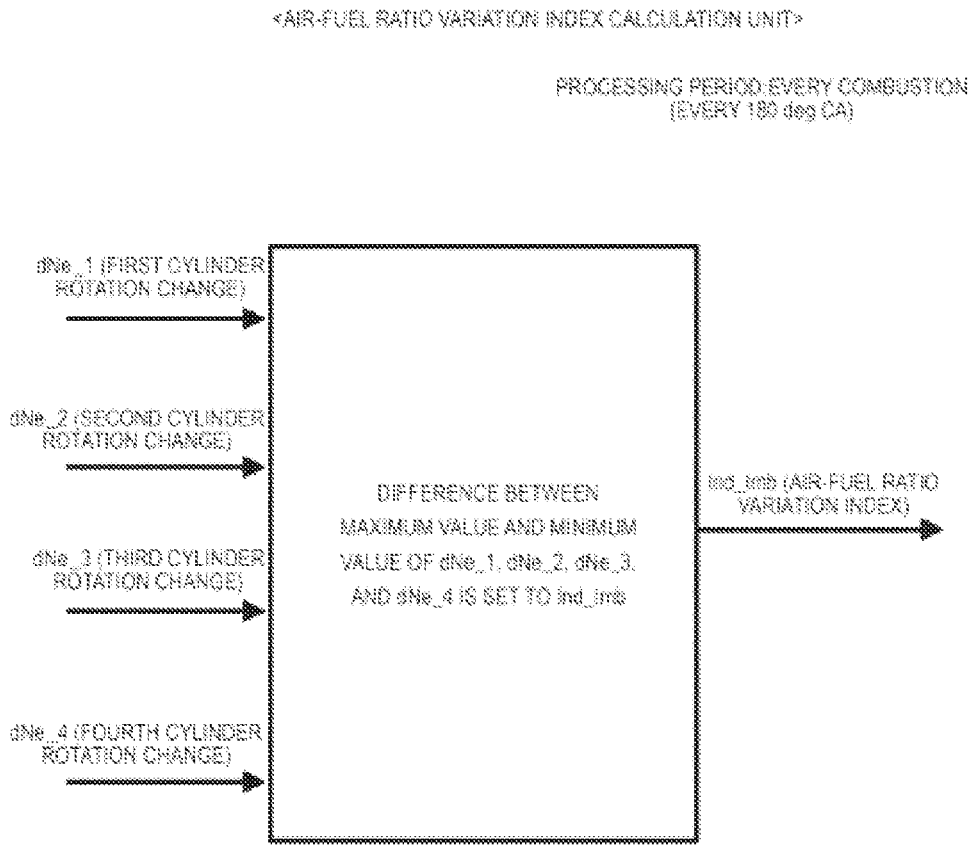
[Fig. 19]
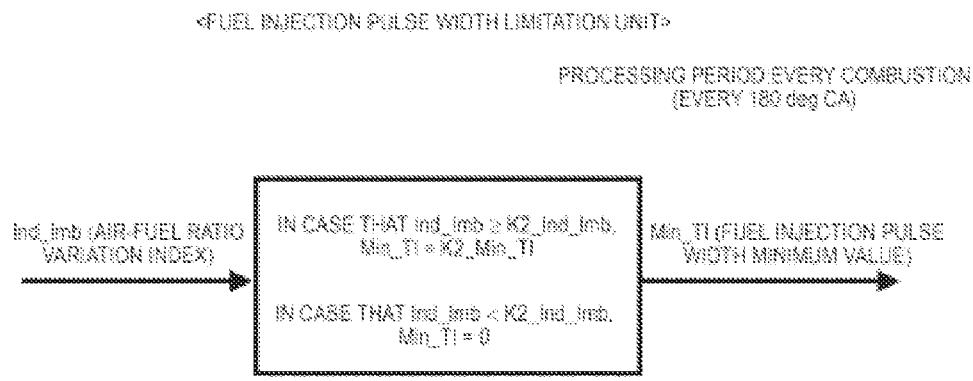

[Fig. 20]
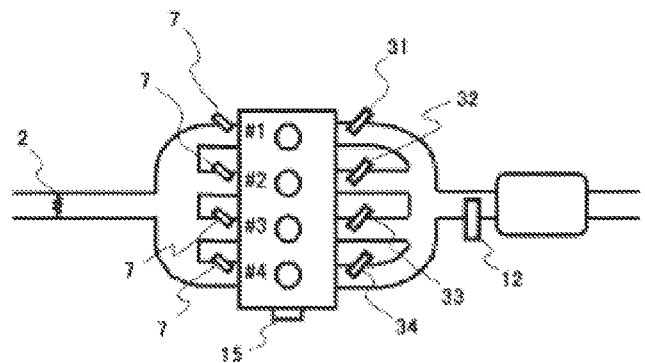
[Fig. 21]
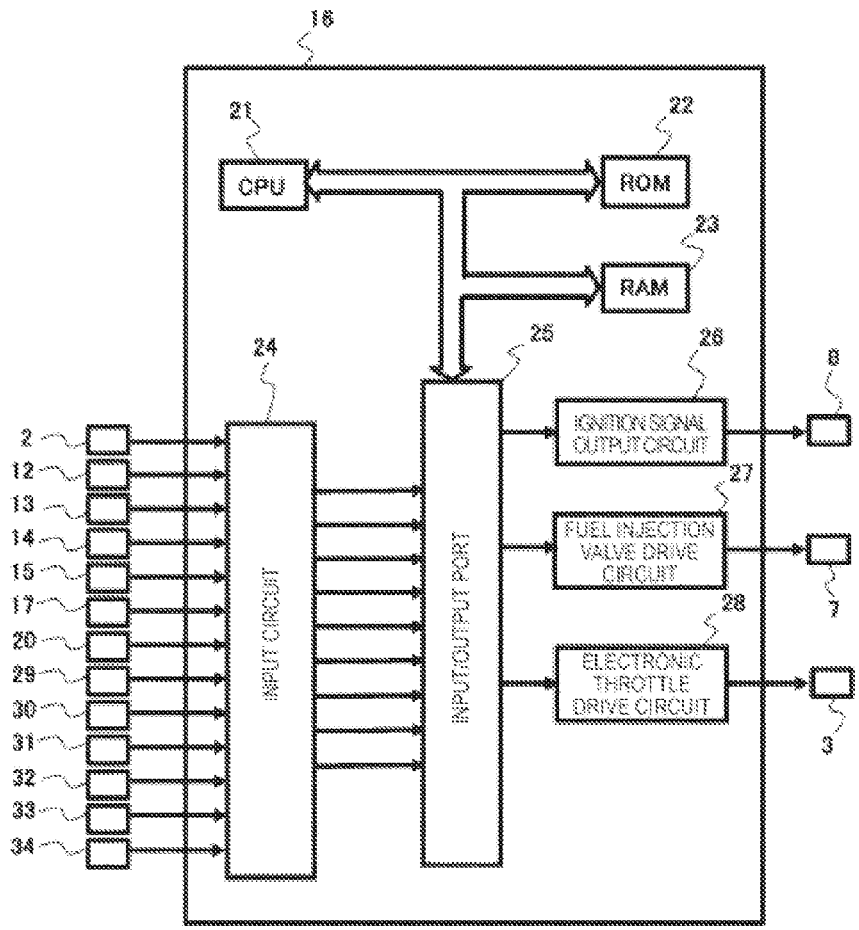

[Fig. 22]
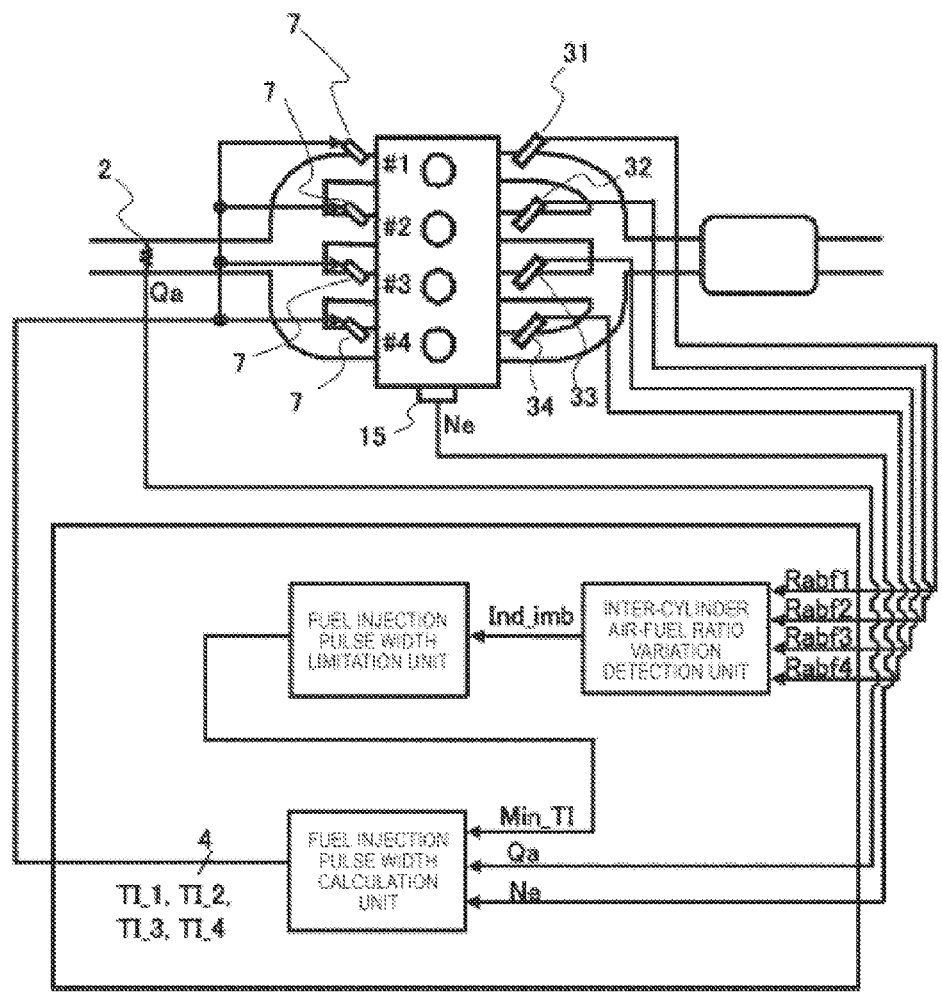

[Fig. 23]
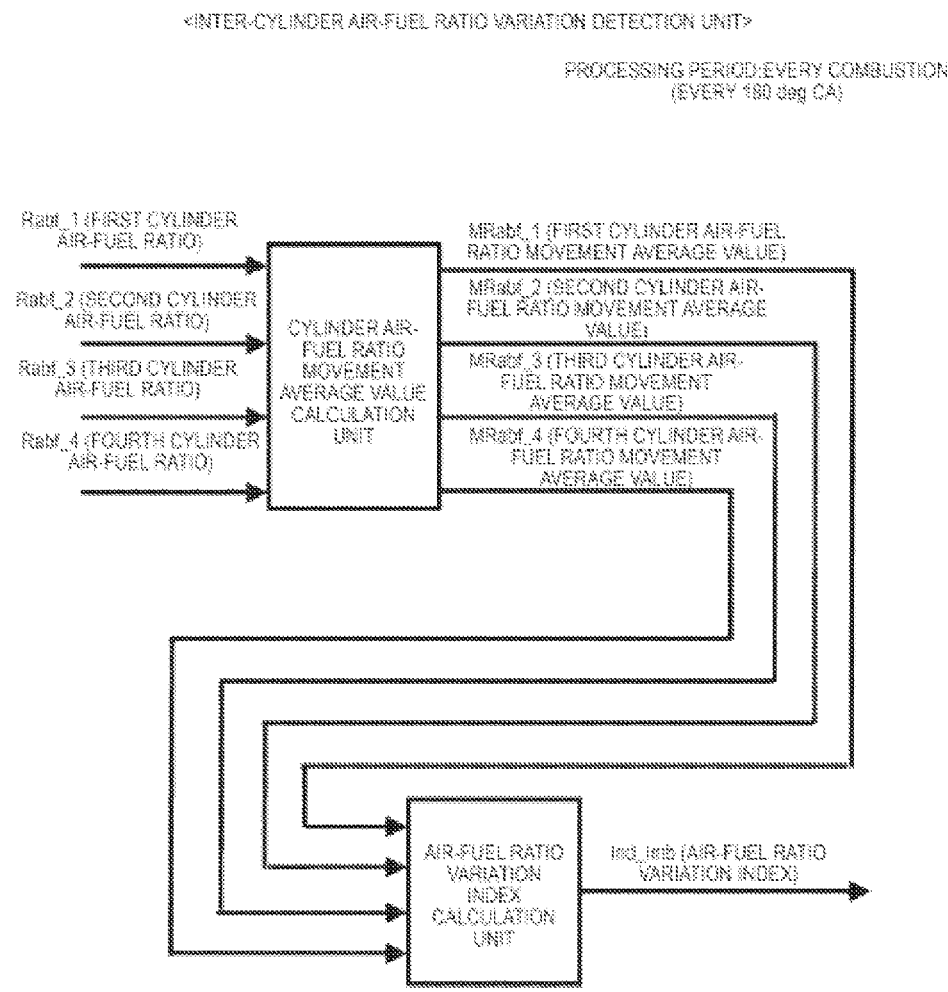

[Fig. 24]
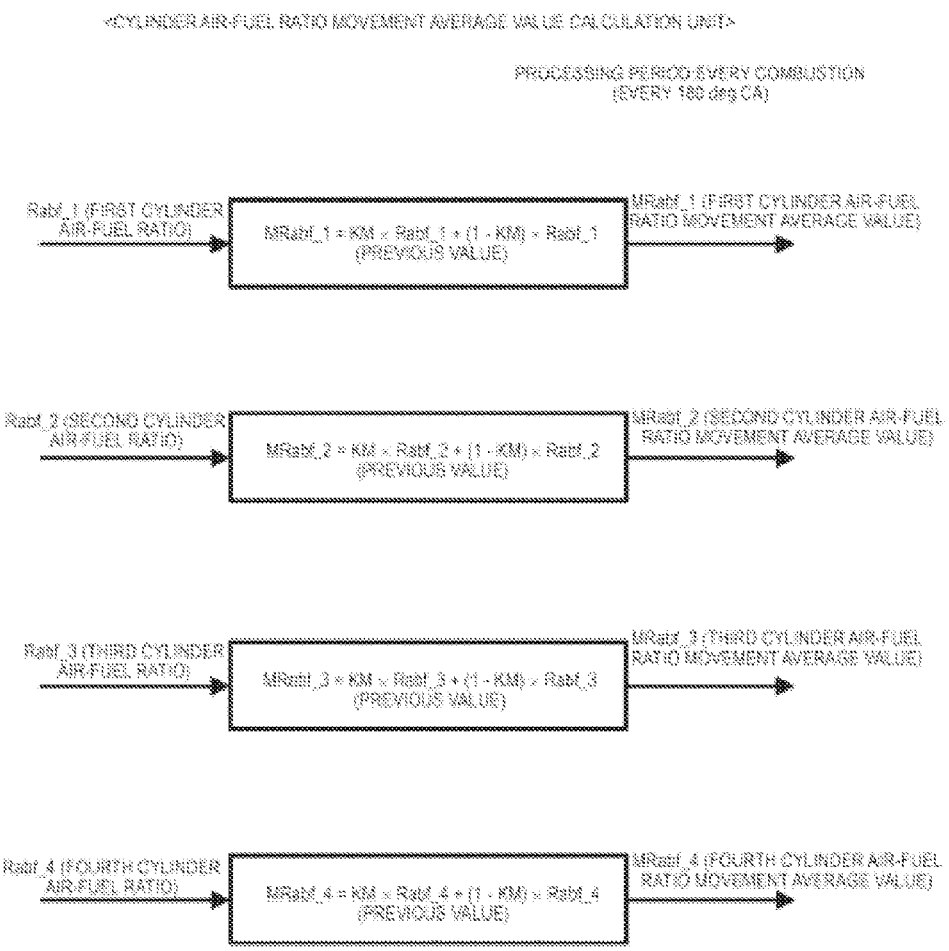

[Fig. 25]
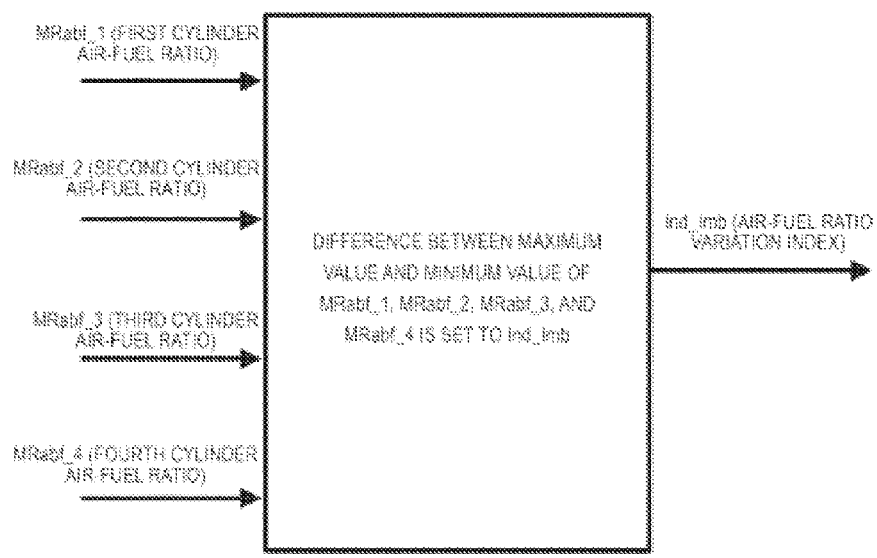
[Fig. 26]
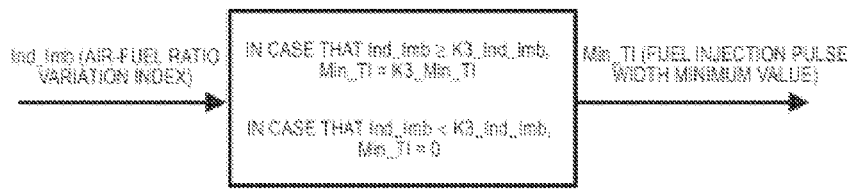

[Fig. 27]
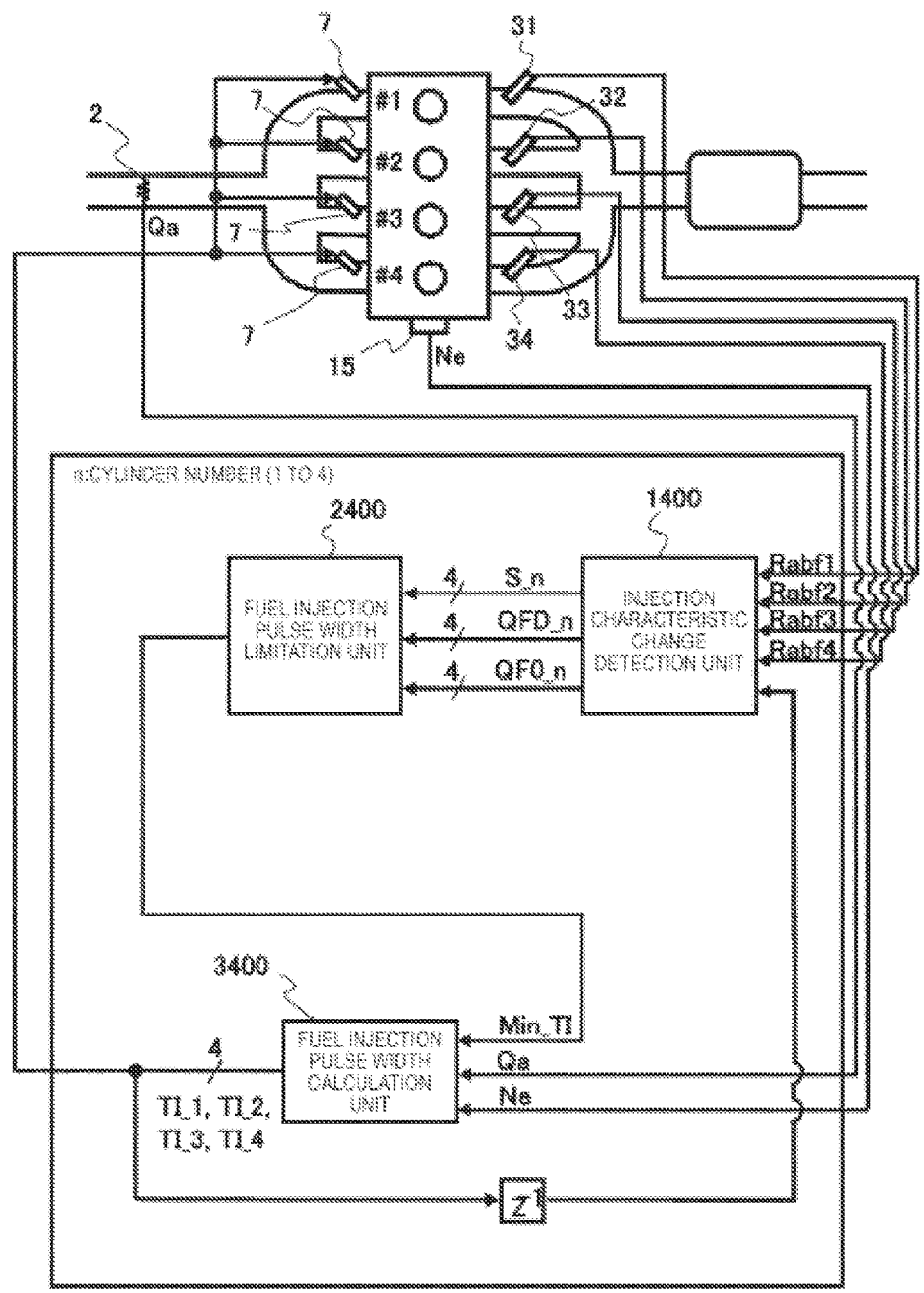

[Fig. 28]
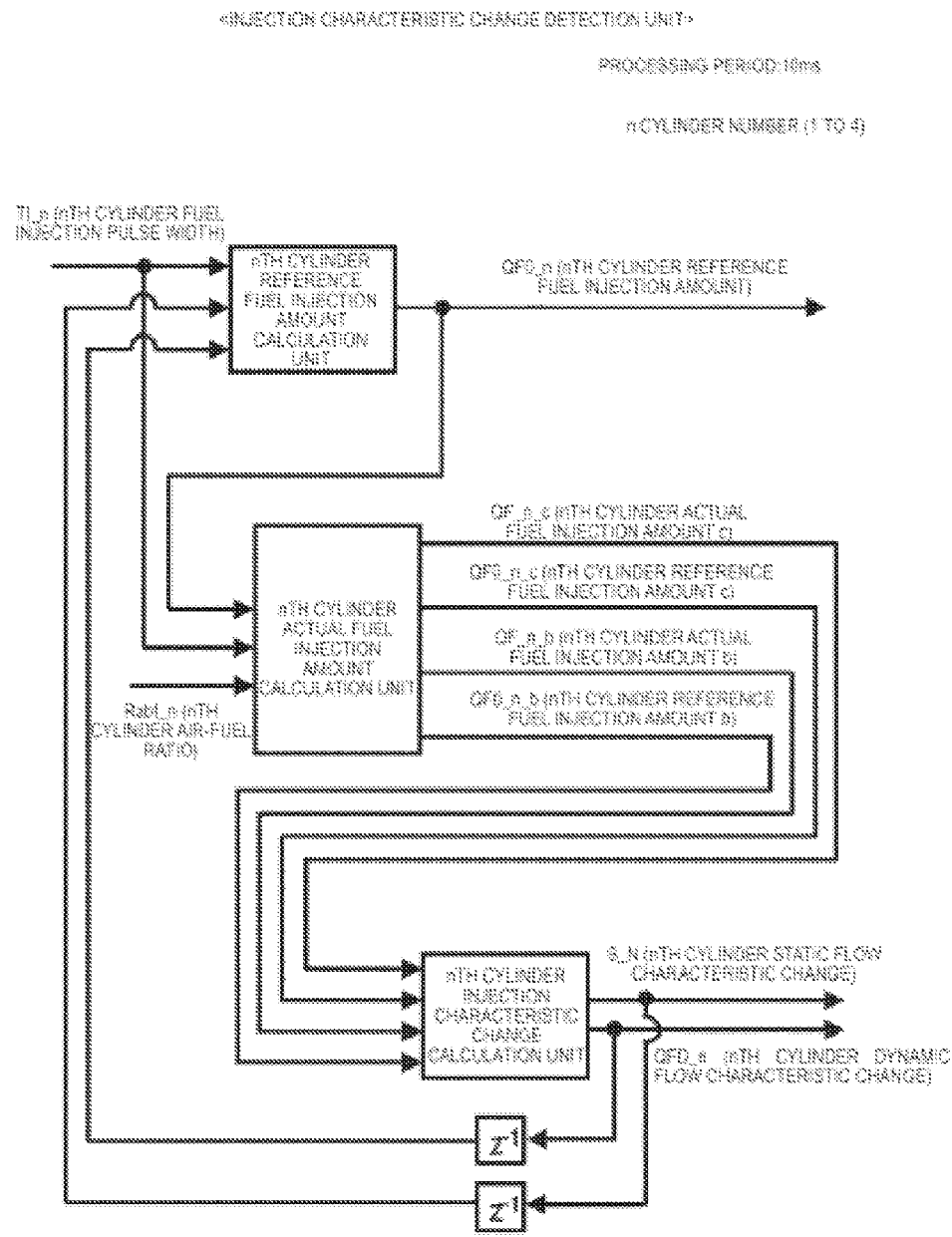

[Fig. 29]
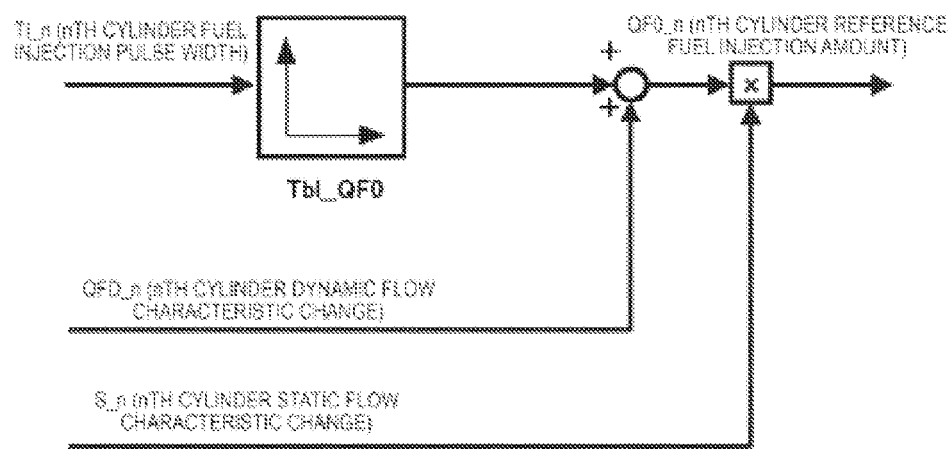

[Fig. 30]
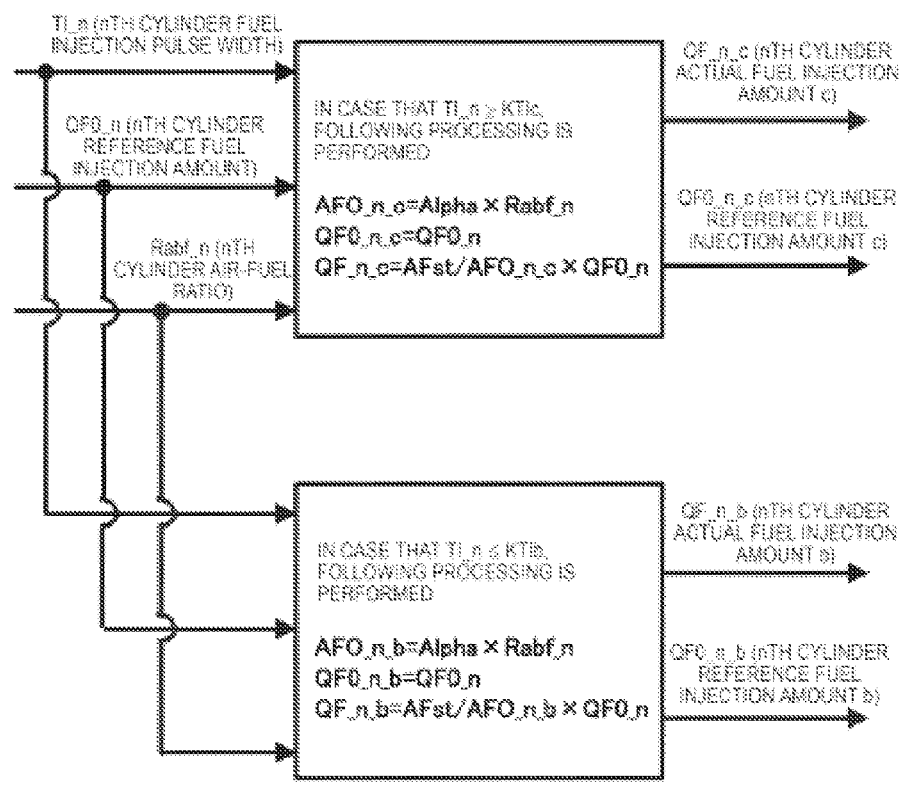

[Fig. 31]
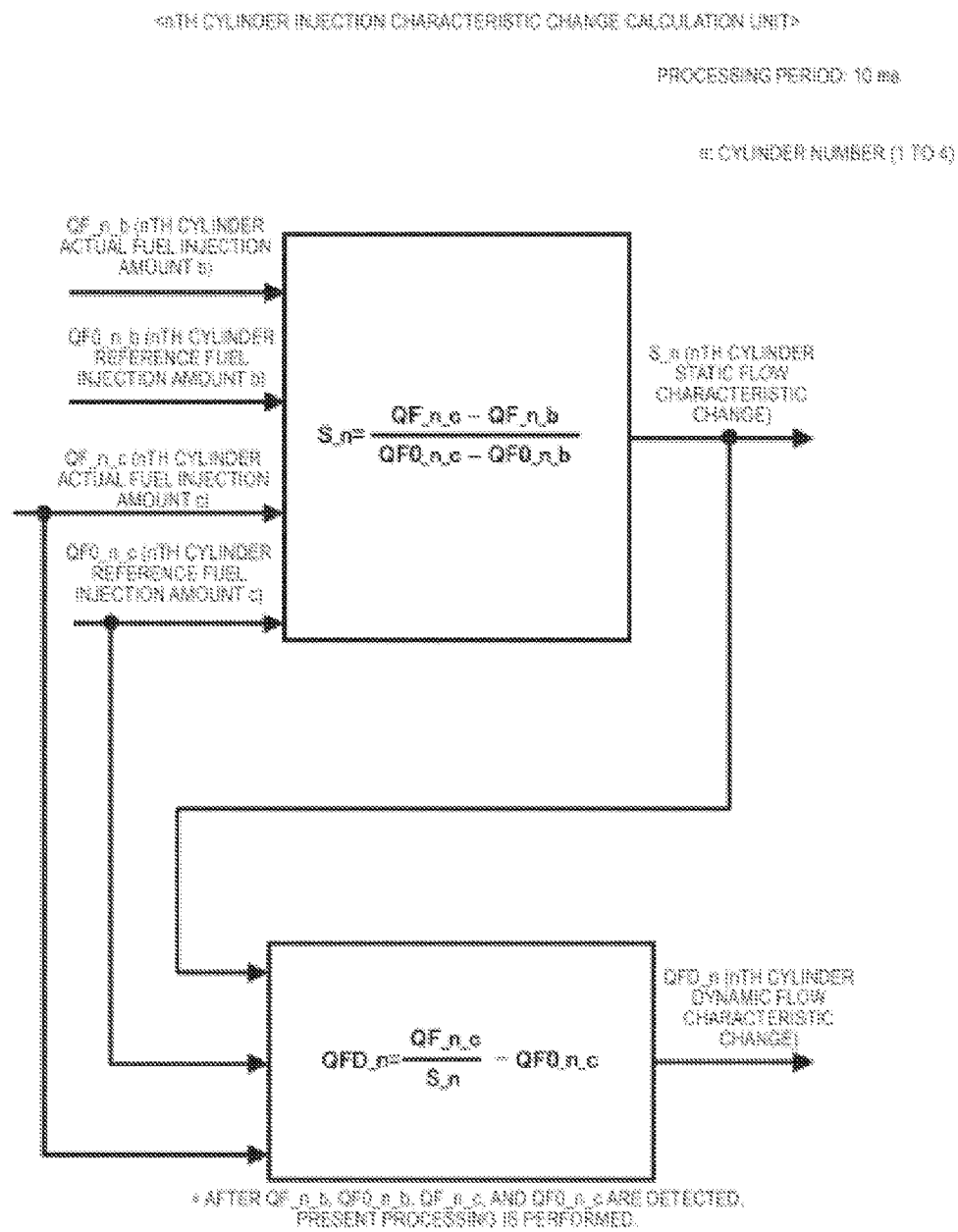

[Fig. 32]
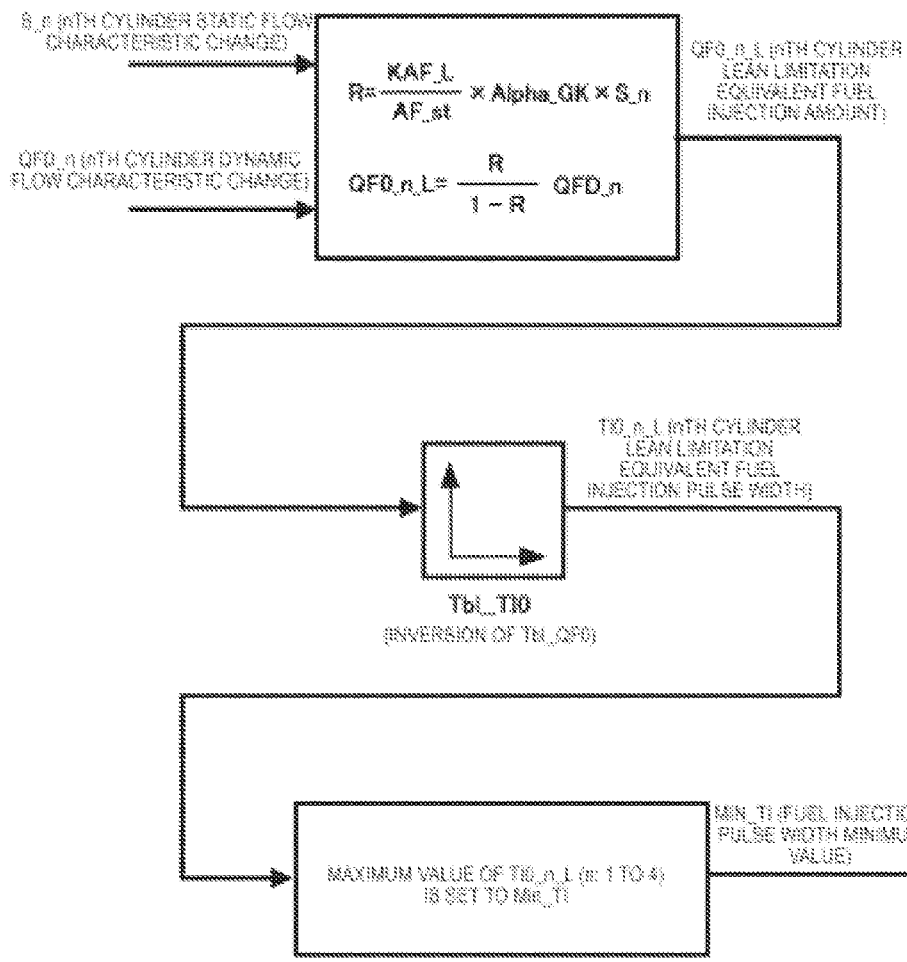

[Fig. 33]
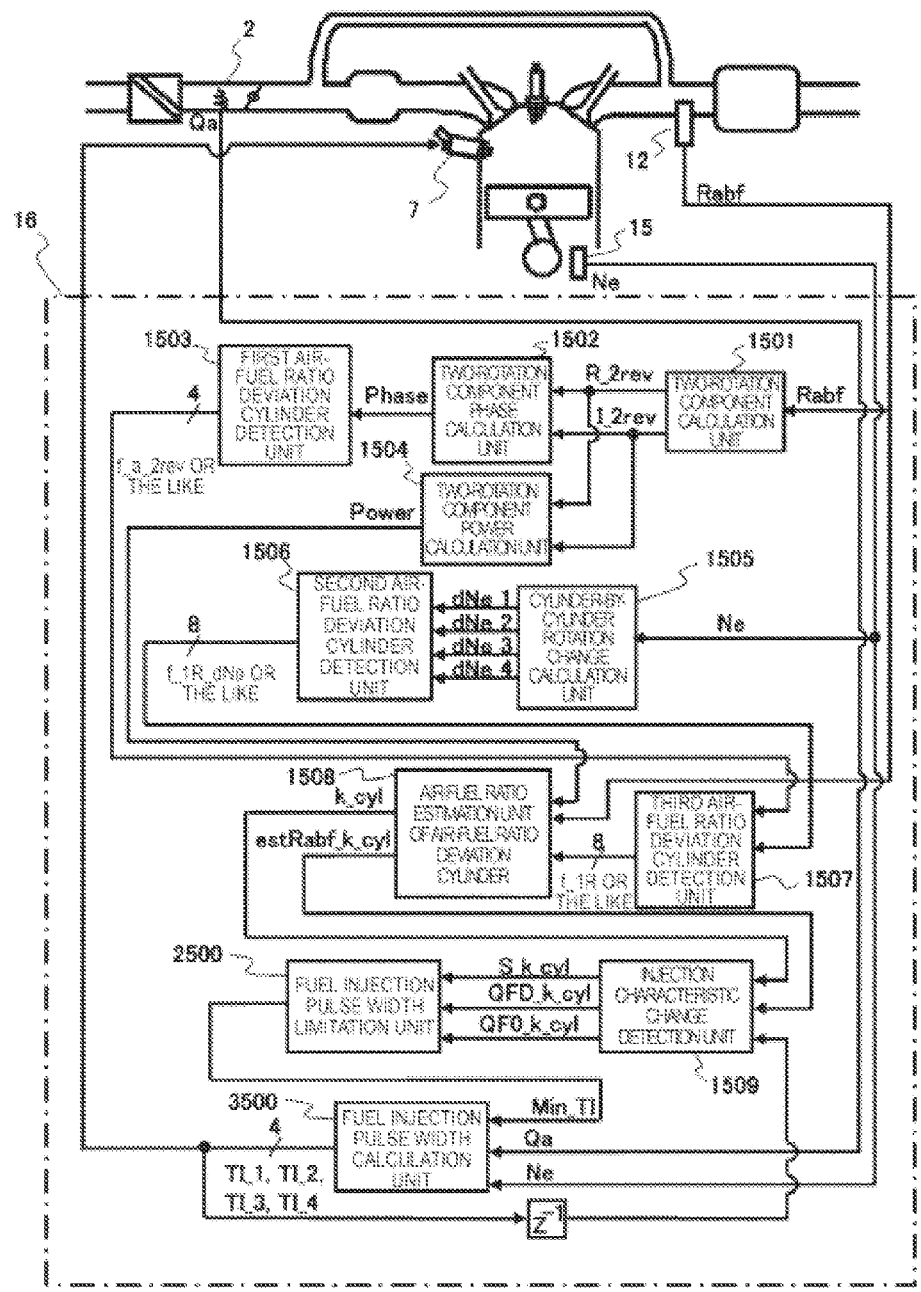

[Fig. 34]
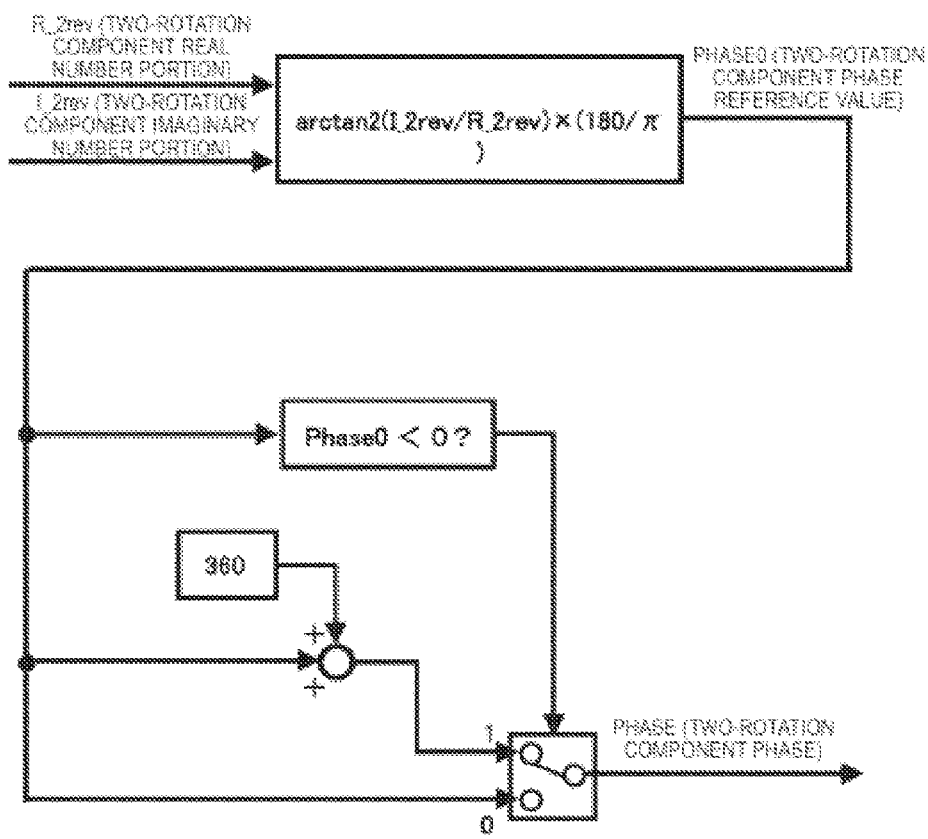

[Fig. 35]
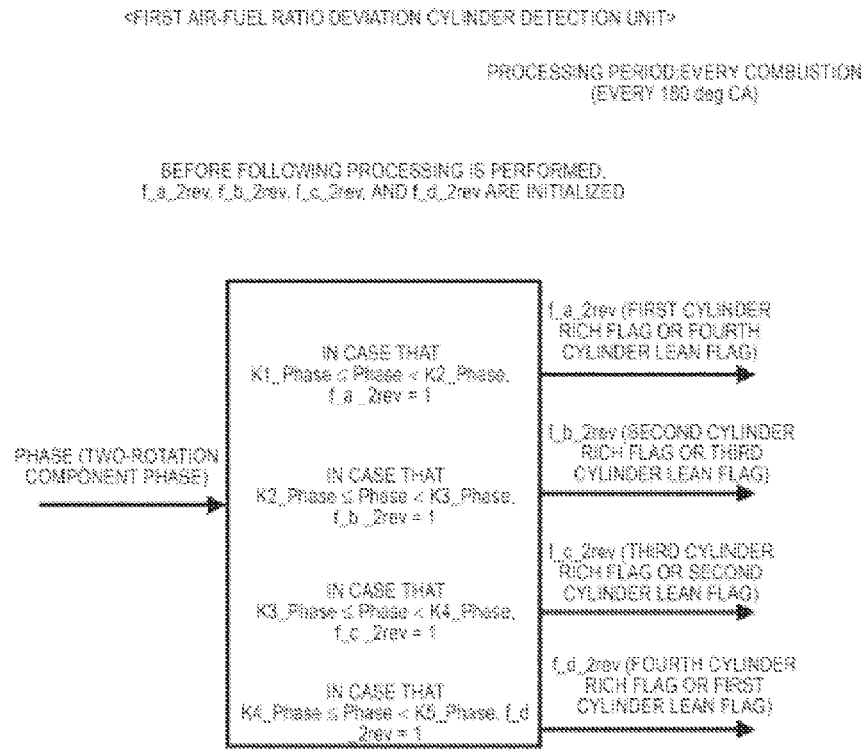
[Fig. 36]
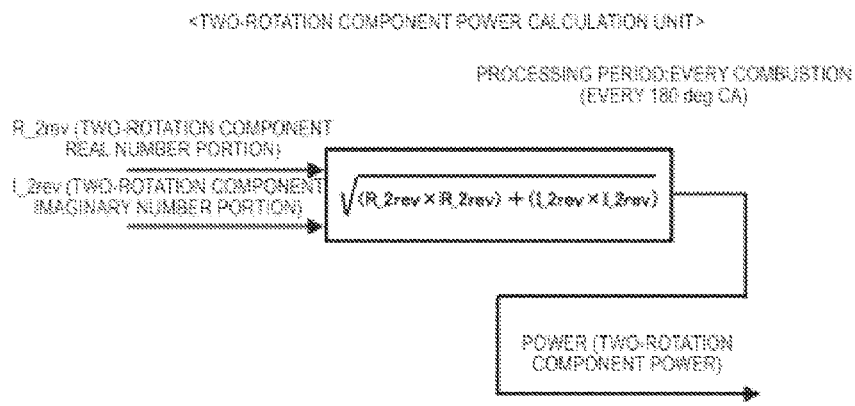

[Fig. 37]
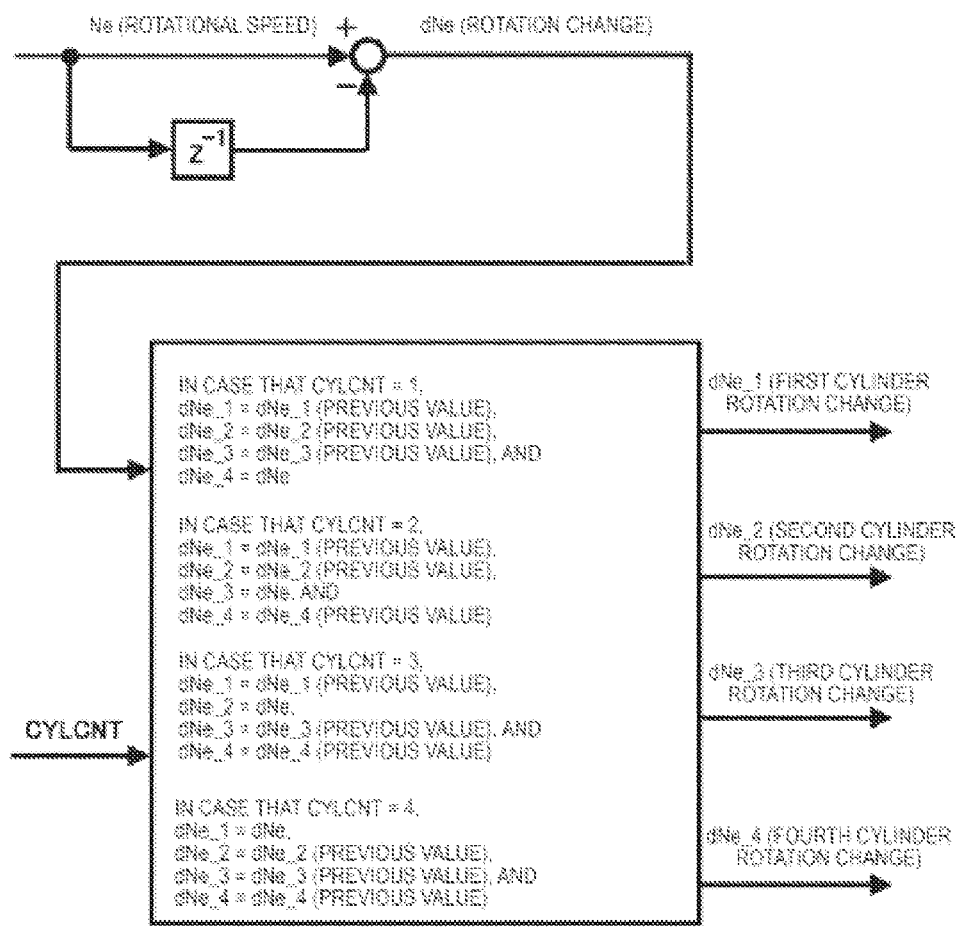

[Fig. 38]
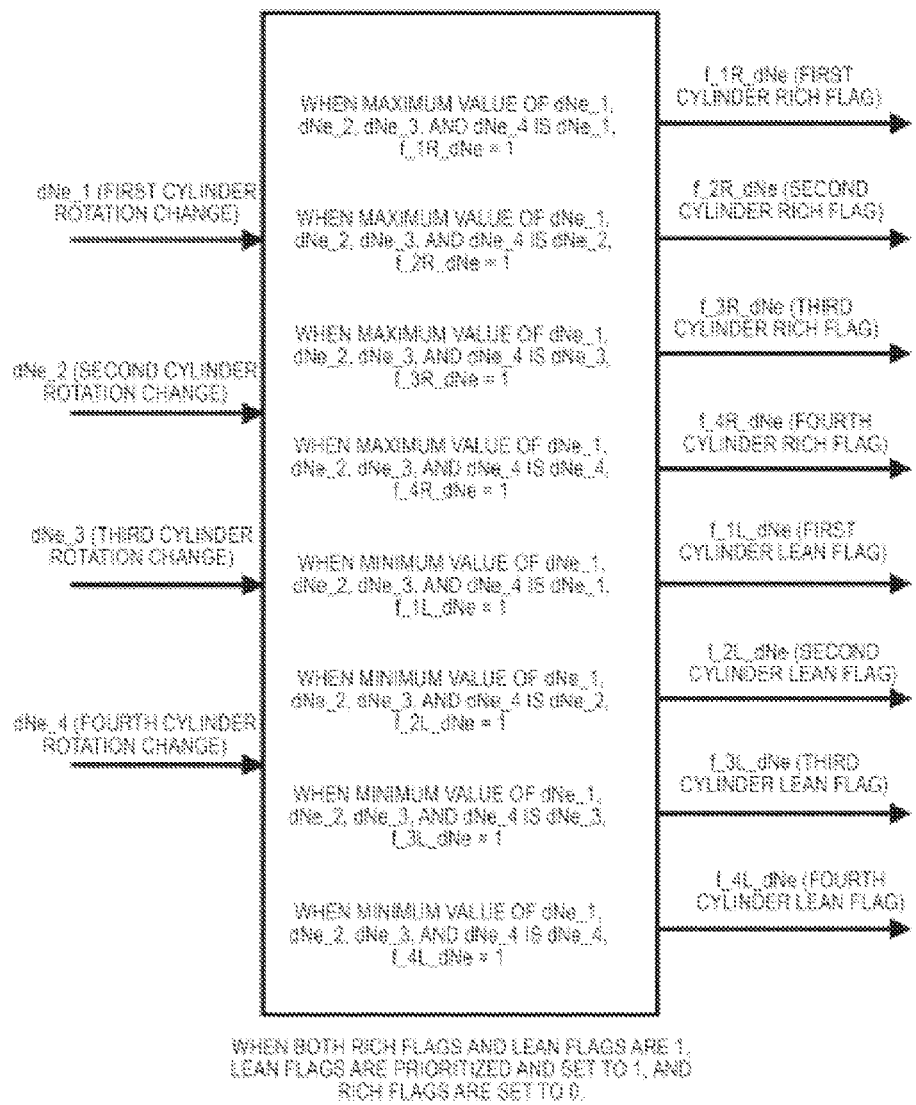

[Fig. 39]
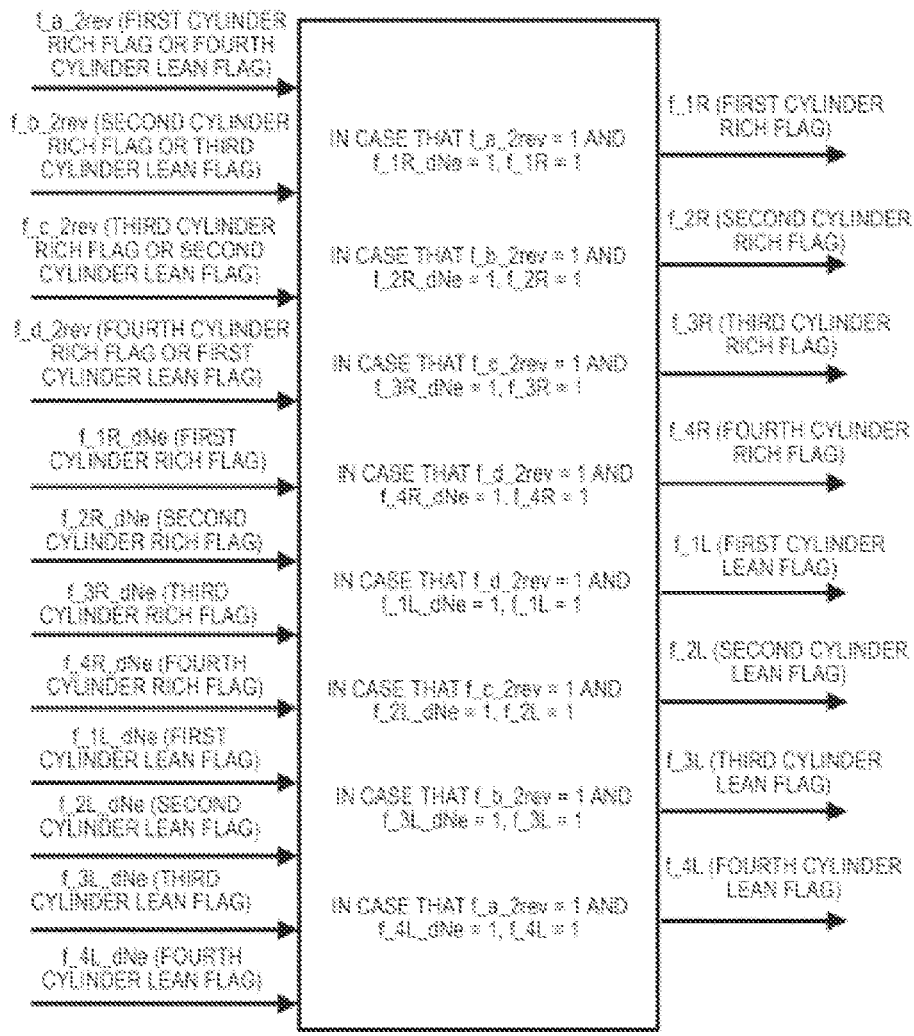

[Fig. 40]
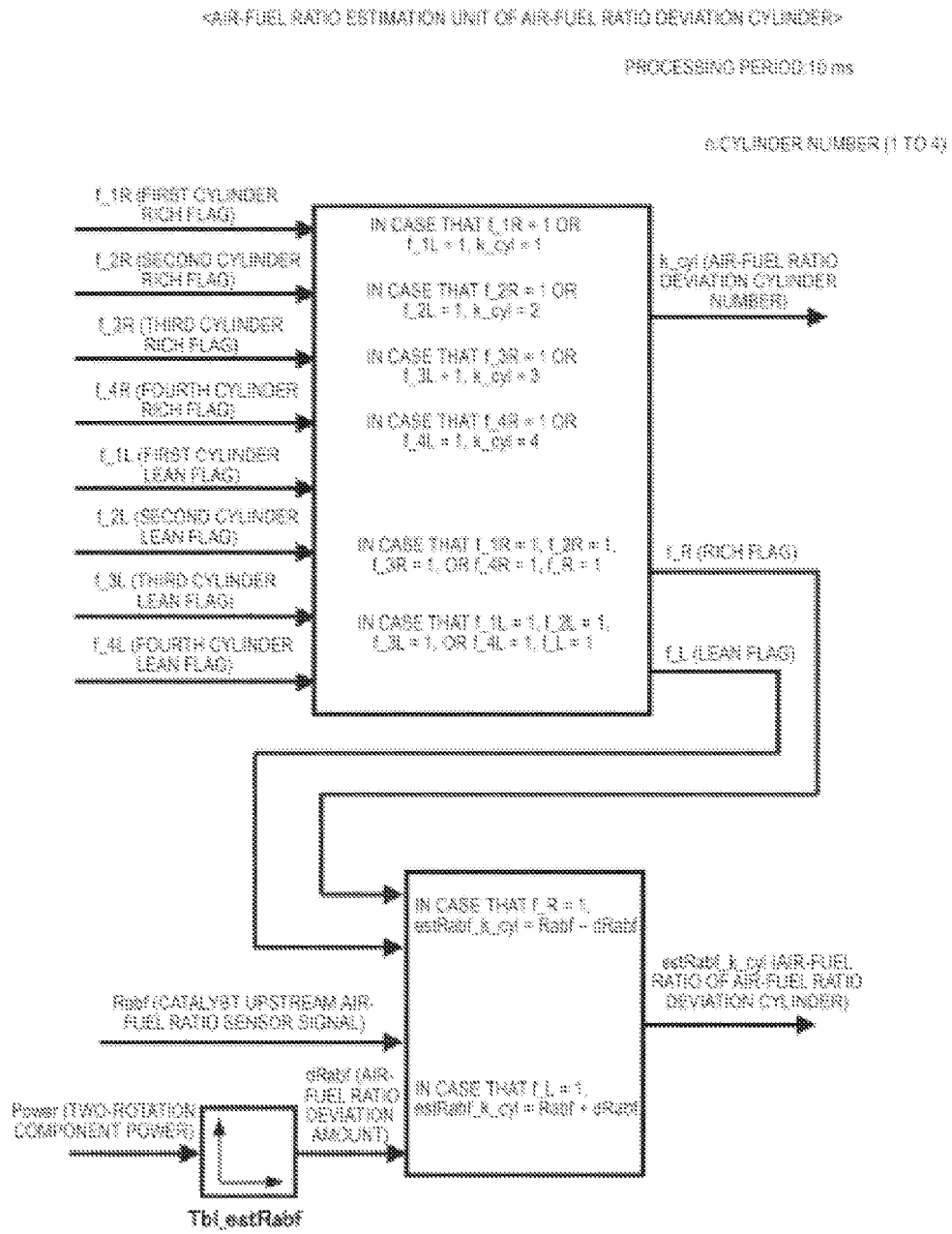

[Fig. 41]
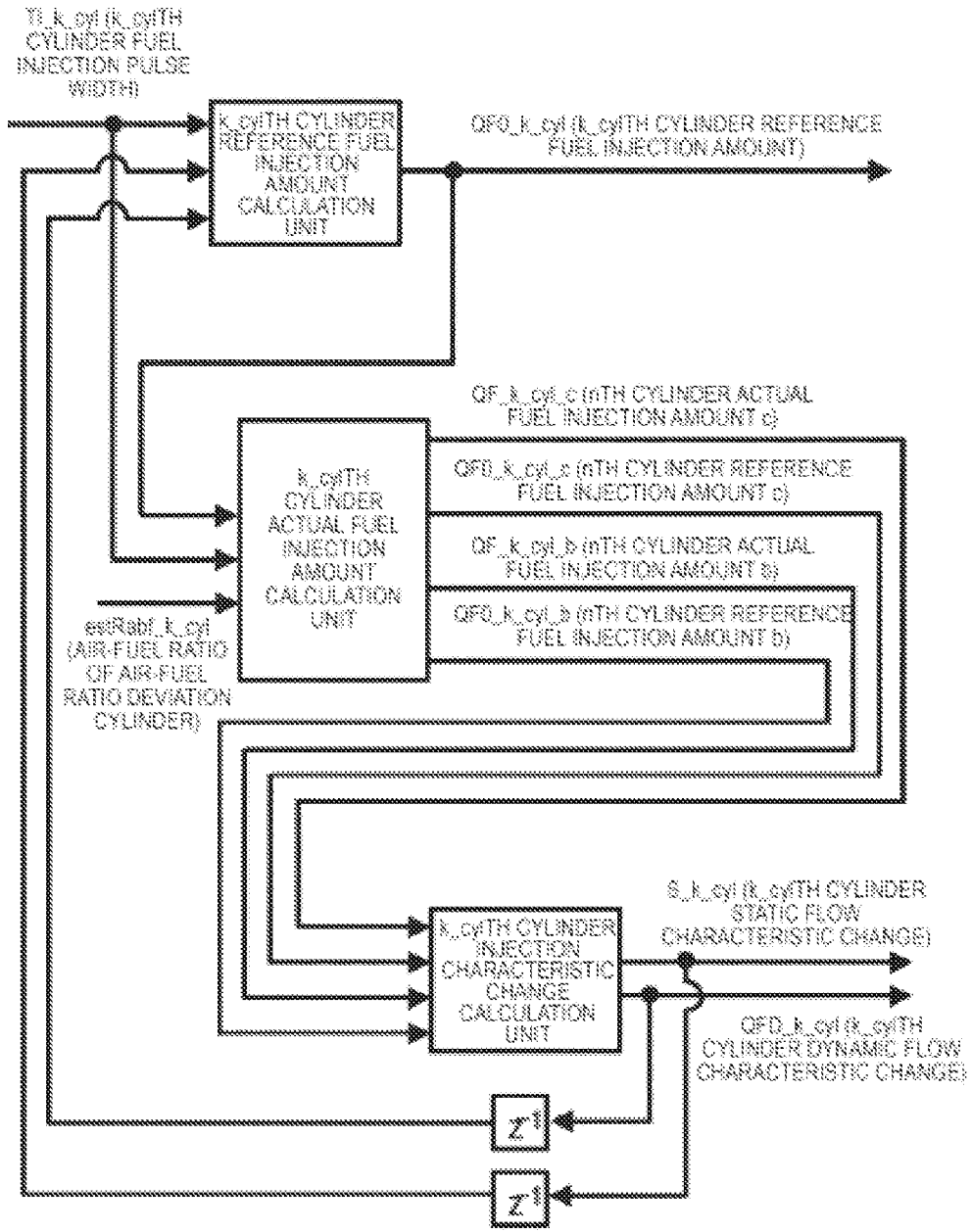

[Fig. 42]
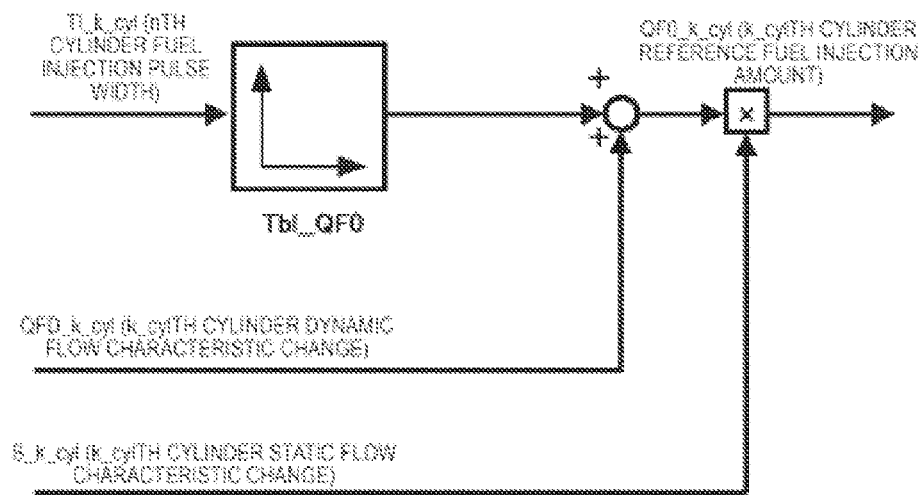

[Fig. 43]
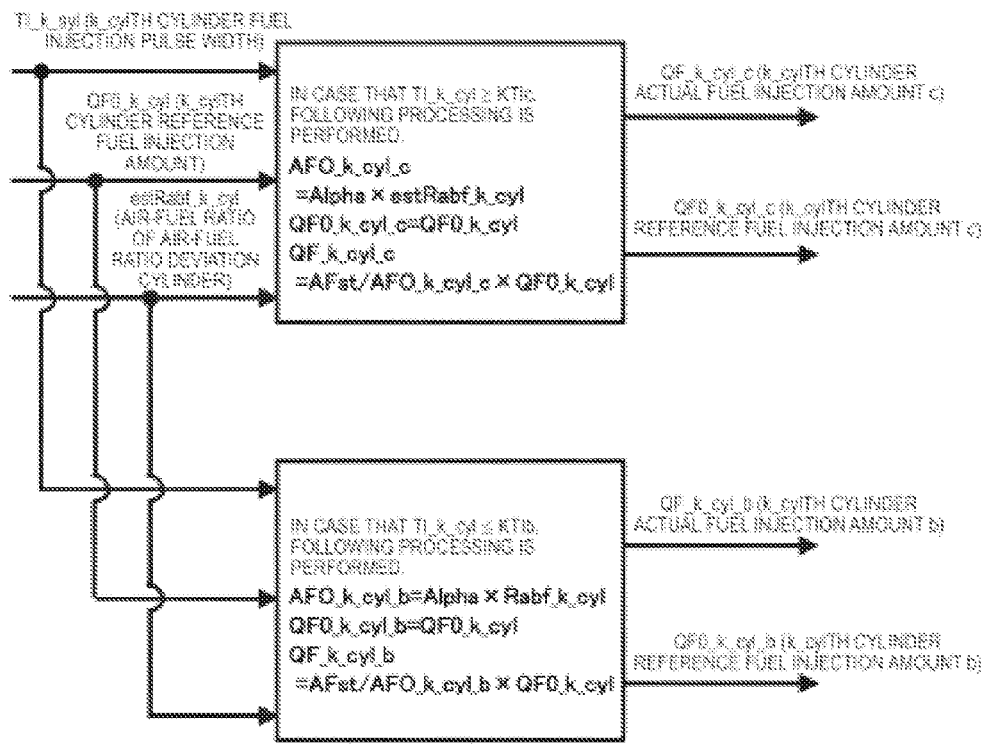

[Fig. 44]
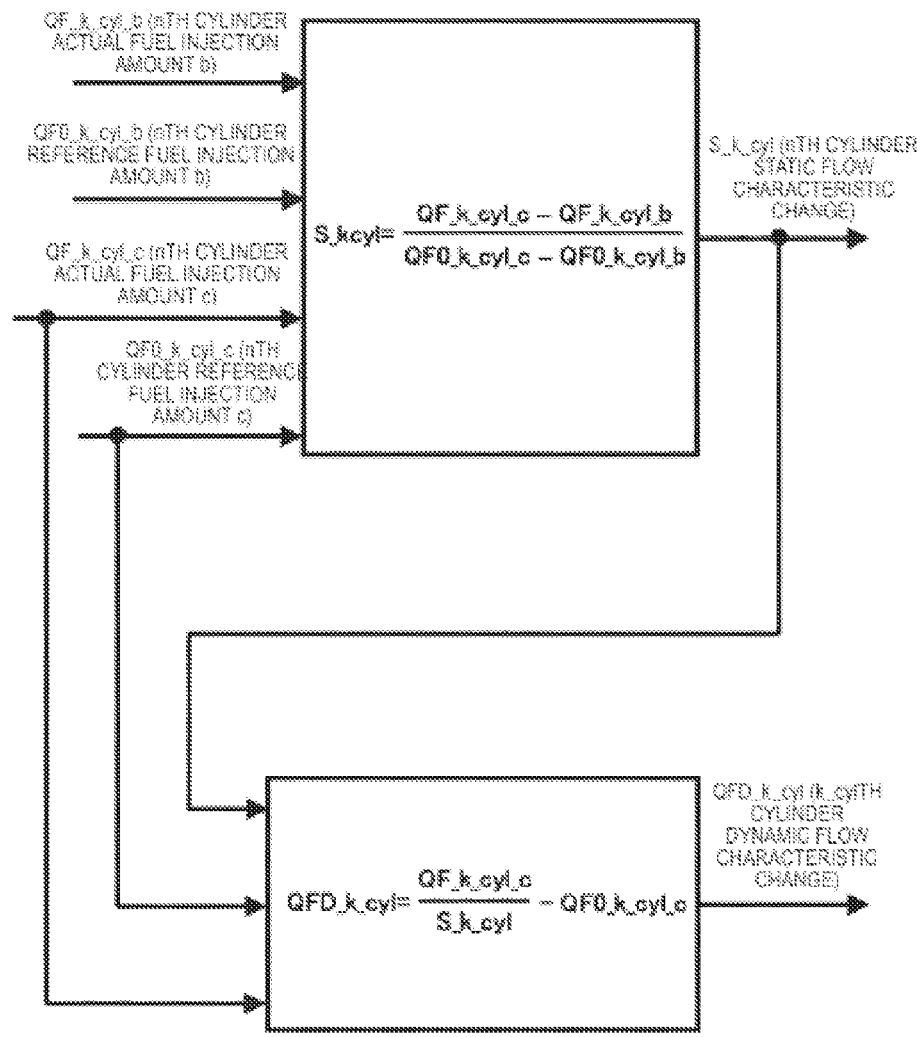

[Fig. 45]
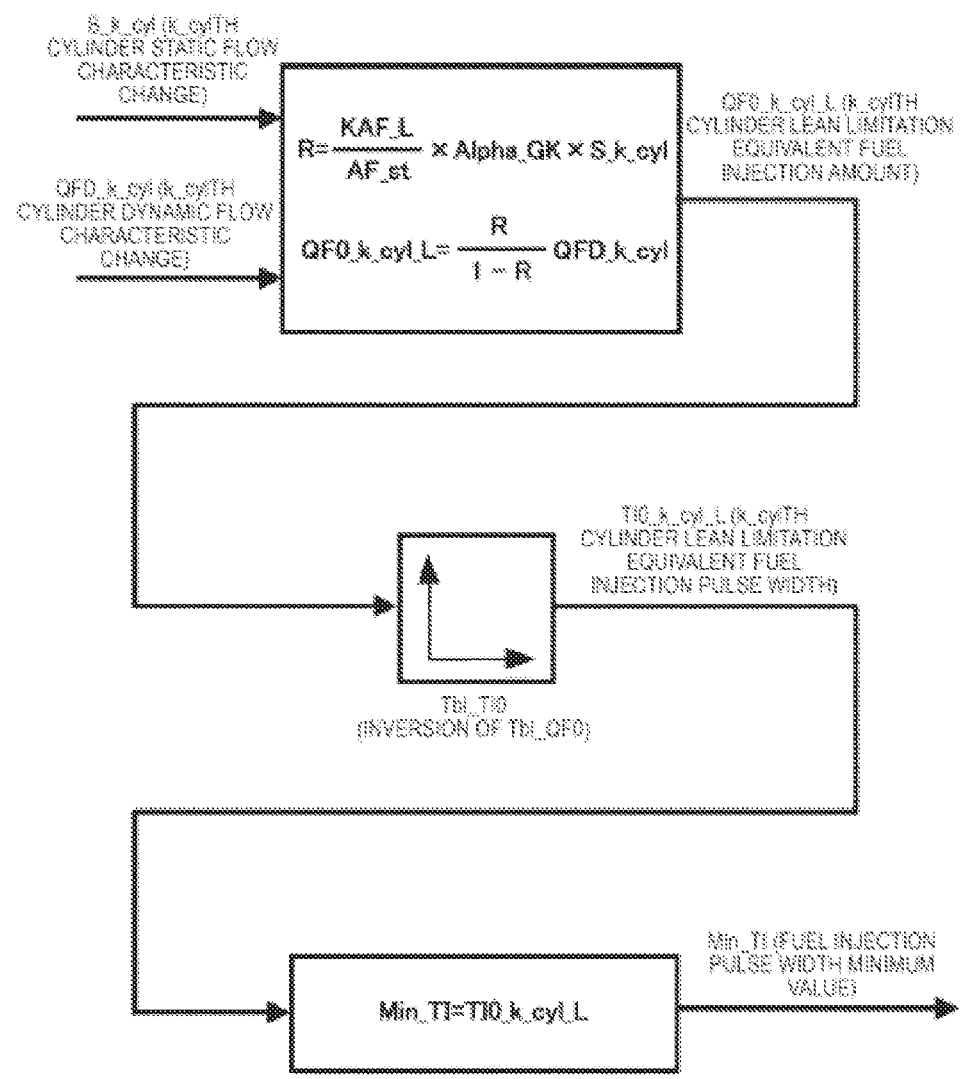

[Fig. 46]
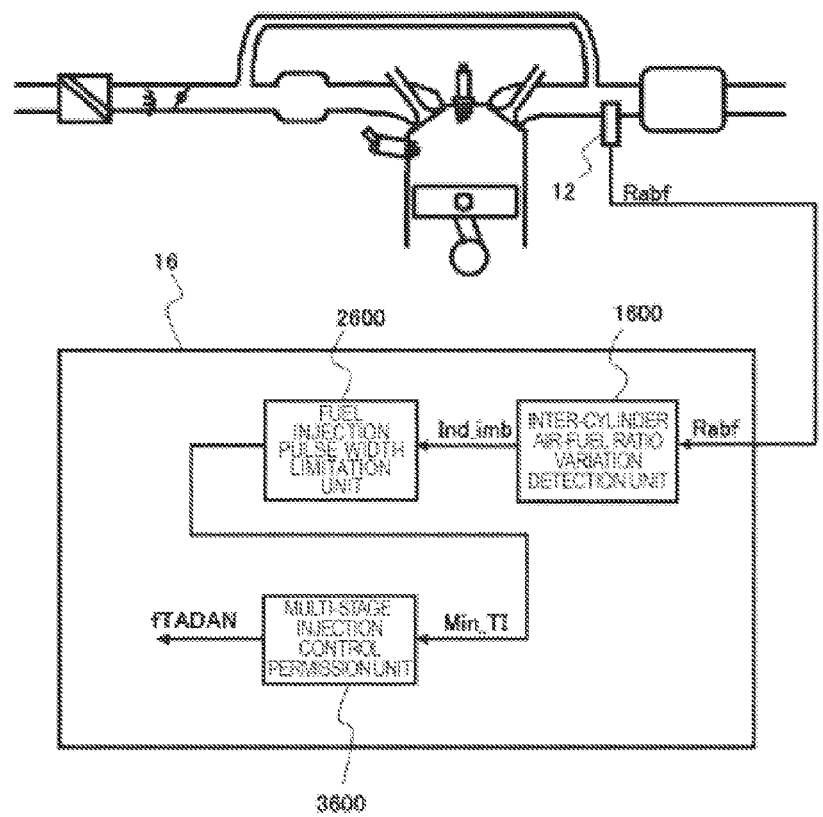
[Fig. 47]
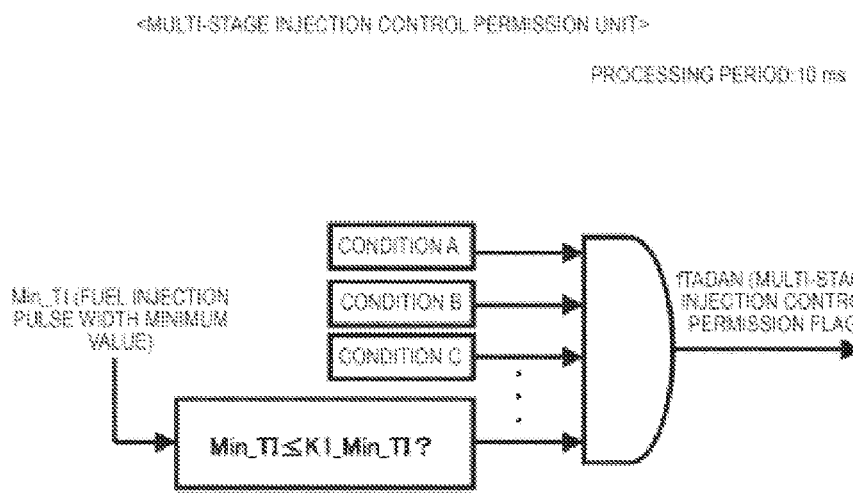

[Fig. 48]
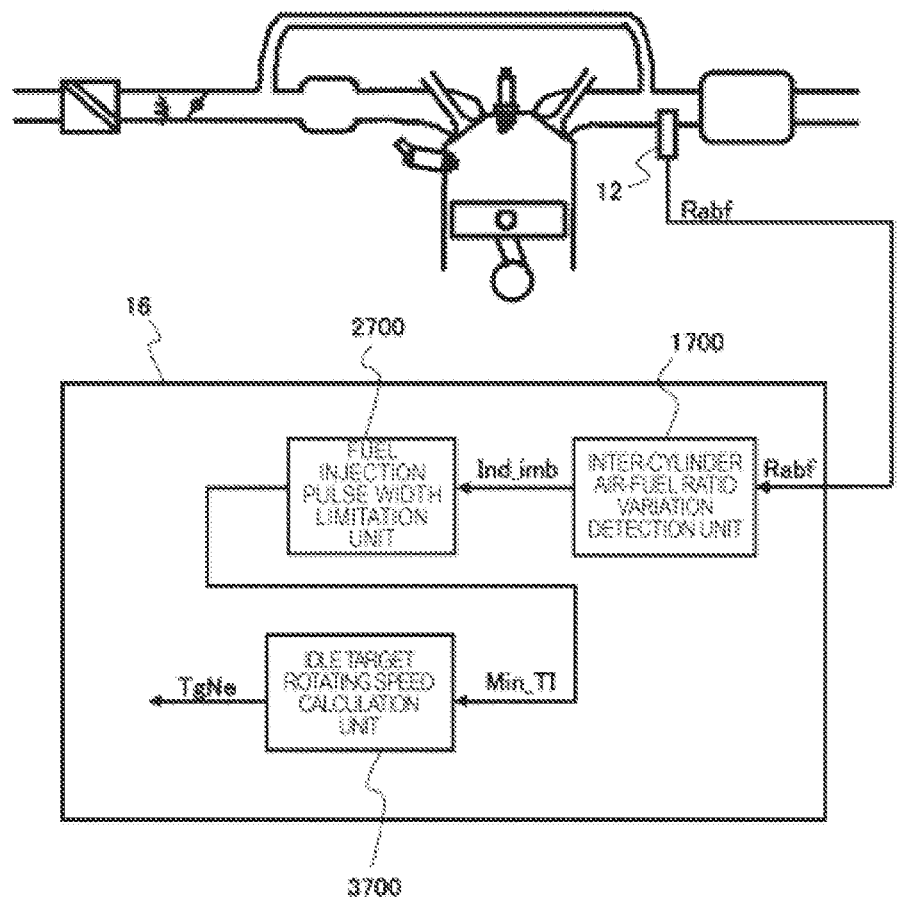
[Fig. 49]
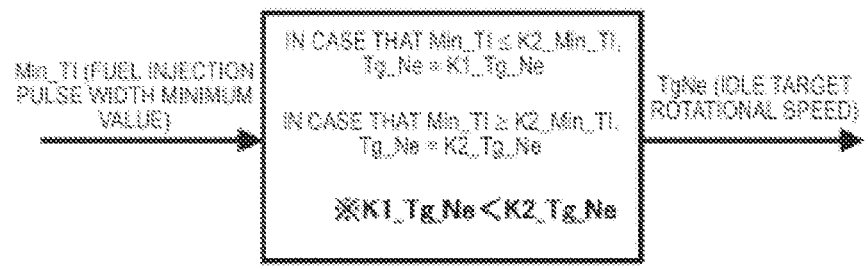

CONTROL DEVICE AND CONTROL METHOD OF ENGINE

TECHNICAL FIELD

The present invention relates to a control device of a multi-cylinder engine in which a fuel injection valve is provided in each of a plurality of cylinders and a control method thereof.

BACKGROUND ART

PTL 1 discloses that in a multi-cylinder engine, execution of an emission reduction control is limited when a difference between individual cylinder air-fuel ratios is equal to or more than a first degree and less than a second degree, execution of the emission reduction control is inhibited when the difference is equal to or more than the second degree, and a purge control, an EGR control, or the like is used as the emission reduction control.

CITATION LIST

Patent Literature

PTL 1: JP-A-2011-236862

SUMMARY OF INVENTION

Technical Problem

However, in a fuel injection valve, due to changes over time caused by deterioration of a mechanical system, abrasion, or clogging due to deposits, a change (static flow characteristics) in an amount of injected fuel per unit valve open time is generated and a lift profile change (dynamic flow characteristics) is generated when the valve is driven so as to be open and closed, and if degrees in changes of the static flow characteristics and the dynamic flow characteristics are different from each other between the fuel injection valves, variation in the air-fuel ratio between cylinders occurs. In the changes of the static flow characteristics, since the amount of injected fuel is changed to an increase side or a decrease side at a constant ratio with respect to an arbitrary fuel injection pulse width, a constant deviation is generated in the air-fuel ratio. Meanwhile, in the changes of the dynamic flow characteristics, valve closing delay with respect to a valve closing command is mainly generated, and the amount of injected fuel increases by a constant amount with respect to the arbitrary fuel injection pulse width. Accordingly, in a cylinder having the fuel injection valve in which the changes of the dynamic flow characteristics are great, deviation to a rich side of the air-fuel ratio increases as the fuel injection pulse width decreases, and thus, an air-fuel ratio difference between cylinders also increases. Here, in a state where the changes of the dynamic flow characteristics strongly influence the air-fuel ratio and the fuel injection pulse width is small, if an air-fuel ratio feedback control is performed in which the fuel injection pulse width is changed so that a detection value of an average air-fuel ratio of each cylinder approaches a target air-fuel ratio, in order to correct enrichment of the average air-fuel ratio due to the changes of the dynamic flow characteristics, a control which decreases the fuel injection pulse width normally is performed. Accordingly, the fuel injection pulse width in the fuel injection valve having relatively small changes (increments) of the dynamic flow characteristics is changed to an excessively decreased side, the air-fuel ratio of the cylinder having the fuel injection valve deviates from a flammable range and is lean, and stability of the engine may deteriorate.

Accordingly, an object of the present invention is to provide a control device of an engine and a control method thereof capable of preventing stability of the engine from deteriorating even when degrees in the changes over time of injection characteristics are different from each other in every fuel injection valve.

Solution to Problem

In a control device of an engine according to an aspect of the invention, an injection pulse width of the fuel injection valve is limited so as to be more than a predetermined value based on variation in an air-fuel ratio between a plurality of cylinders. In a control device of an engine according to a further aspect of the invention, a variable range of an injection pulse width of a fuel injection valve is changed according to variation in an air-fuel ratio between a plurality of cylinders. According to a still further aspect of the invention, there is provided a control method of an engine including: a step of detecting variation in an air-fuel ratio between a plurality of cylinders; a step of setting a lower limit value of an injection pulse width of the fuel injection valve according to the variation in the air-fuel ratio; and a step of limiting the injection pulse width of the fuel injection valve so as to be more than the lower limit value.

Advantageous Effects of Invention

According to the present invention, even when degrees in changes over time of injection characteristics are different from each other in every fuel injection valve, since an air-fuel ratio of each cylinder exceeds a flammable air-fuel ratio range, it is possible to prevent the stability of an engine from deteriorating.

BRIEF DESCRIPTION OF DRAWINGS

FIG. 1 is an engine control system diagram in first, second, fifth to seventh examples.

FIG. 2 is a diagram showing an inner portion of a control unit in the first, second, fifth to seventh example.

FIG. 3 is a block diagram showing the entire control of the first example.

FIG. 4 is a block diagram showing an inter-cylinder air-fuel ratio variation detection unit in the first, sixth, and seventh examples.

FIG. 5 is a block diagram showing a two-rotation component calculation unit in the first, sixth, and seventh examples.

FIG. 6 is a block diagram showing an air-fuel ratio variation index calculation unit in the first, sixth, and seventh examples.

FIG. 7 is a block diagram showing a fuel injection pulse width limitation unit in the first example.

FIG. 8 is a block diagram showing a fuel injection pulse width calculation unit in the first to fifth examples.

FIG. 9 is a diagram showing changes in characteristics of an amount of fuel injected with respect to a fuel injection pulse width when static flow characteristics are changed.

FIG. 10 is a diagram showing changes in characteristics of an amount of injected fuel with respect to the fuel injection pulse width when dynamic flow characteristics are changed.

FIG. 11 is a diagram showing changes in characteristics of an air-fuel ratio with respect to the fuel injection pulse width when the static flow characteristics are changed.

FIG. 12 is a diagram showing changes in characteristics of the air-fuel ratio with respect to the fuel injection pulse width when the dynamic flow characteristics are changed.

FIGS. 13A and 13B are diagrams showing changes in characteristics of the air-fuel ratio with respect to the fuel injection pulse width when a fuel injection valve of each cylinder in a four-cylinder engine is normal (static flow characteristics and dynamic flow characteristics are not changed).

FIGS. 14A and 14B are diagrams showing changes in characteristics of the air-fuel ratio with respect to the fuel injection pulse width when a change over time of the fuel injection valve of each cylinder in the four-cylinder engine occurs (static flow characteristics and dynamic flow characteristics are changed).

FIG. 15 is a block diagram showing the entire control of the second example.

FIG. 16 is a block diagram showing an inter-cylinder air-fuel ratio variation detection unit in the second example.

FIG. 17 is a block diagram showing a cylinder-by-cylinder rotation change calculation unit in the second example.

FIG. 18 is a block diagram showing an air-fuel ratio variation index calculation unit in the second example.

FIG. 19 is a block diagram showing a fuel injection pulse width limitation unit in the second example.

FIG. 20 is an engine control system diagram in the third and fourth examples.

FIG. 21 is a diagram showing the inner portion of a control unit in the third and fourth examples.

FIG. 22 is a block diagram showing the entire control of the third example.

FIG. 23 is a block diagram showing an inter-cylinder air-fuel ratio variation detection unit in the third example.

FIG. 24 is a block diagram showing a cylinder air-fuel ratio movement average calculation unit in the third example.

FIG. 25 is a block diagram showing an air-fuel ratio variation index calculation unit in the third example.

FIG. 26 is a block diagram showing a fuel injection pulse width limitation unit in the third example.

FIG. 27 is a block diagram showing the entire control of the fourth example.

FIG. 28 is a block diagram showing an injection characteristic change detection unit in the fourth example.

FIG. 29 is a block diagram showing an nth cylinder reference fuel injection amount calculation unit in the fourth example.

FIG. 30 is a block diagram showing an nth cylinder actual fuel injection amount calculation unit in the fourth example.

FIG. 31 is a block diagram showing an nth cylinder injection characteristic change calculation unit in the fourth example.

FIG. 32 is a block diagram showing a fuel injection pulse width limitation unit in the fourth example.

FIG. 33 is a block diagram showing the entire control of the fifth example.

FIG. 34 is a two-rotation component phase calculation unit in the fifth example.

FIG. 35 is a block diagram showing a first air-fuel ratio deviation cylinder detection unit in the fifth example.

FIG. 36 is a block diagram showing a two-rotation component power calculation unit in the fifth example.

FIG. 37 is a block diagram showing a cylinder-by-cylinder rotation change calculation unit in the fifth example.

FIG. 38 is a block diagram showing a second air-fuel ratio deviation cylinder detection unit in the fifth example.

FIG. 39 is a block diagram showing a third air-fuel ratio deviation cylinder detection unit in the fifth example.

FIG. 40 is a block diagram showing an air-fuel ratio estimation unit of an air-fuel ratio deviation cylinder in the fifth example.

FIG. 41 is a block diagram showing an injection characteristic change detection unit in the fifth example.

FIG. 42 is a block diagram showing a k_cylth cylinder reference fuel injection amount calculation unit in the fifth example.

FIG. 43 is a block diagram showing a k_cylth cylinder actual fuel injection amount calculation unit in the fifth example.

FIG. 44 is a block diagram showing a k_cylth cylinder injection characteristic change calculation unit in the fifth example.

FIG. 45 is a block diagram showing a fuel injection pulse width limitation unit in the fifth example.

FIG. 46 is a block diagram showing the entire control of the sixth example.

FIG. 47 is a block diagram showing a multi-stage injection control permission unit in the sixth example.

FIG. 48 is a block diagram showing the entire control of the seventh example.

FIG. 49 is a block diagram showing an idle target rotating speed calculation unit in the seventh example.

DESCRIPTION OF EMBODIMENTS

Hereinafter, an embodiment of the present invention will be described with reference to drawings.

First Example

FIG. 1 is a system diagram of an engine in a first example.

An engine 9 shown in FIG. 1 is used for a vehicle power source and is configured of multiple cylinders, and here, is a four-cylinder engine.

In the engine 9, air passes through an air cleaner 1 from the outside, and flows into a cylinder 51 via an intake duct 4, an intake collector 5a, and an intake air manifold 5b. An amount of intake air of the engine 9 is adjusted by an electronic throttle 3, and an air flow sensor 2 detects the amount of intake air of the engine 9.

In addition, an intake air temperature sensor 29 detects the temperature (intake air temperature) of intake air of the engine 9, and a crank angle sensor 15 outputs a signal every 10 deg of rotation of angle of a crank shaft 52 and a signal every combustion period (every 180 deg in the four-cylinder engine). In addition, a water temperature sensor 14 detects the temperature of a cooling water of the engine 9, and an accelerator opening sensor 13 detects an amount of depression of an accelerator pedal 6 and detects torque required by a driver of a vehicle. In addition, a throttle opening sensor 17 detects the opening of the electronic throttle 3.

The signal of each of the accelerator opening sensor 13, the air flow sensor 2, the intake air temperature sensor 29, the throttle opening sensor 17, the crank angle sensor 15, and the water temperature sensor 14 is sent to a control unit (ECU) 16 described below. The control unit 16 acquires information related to an operational state of the engine 9 from the output of each sensor, and calculates main operation amounts of the engine 9 such as an amount of intake air, an amount of injected fuel, or ignition timing.

The control unit 16 converts a target amount of intake air into a degree of target throttle opening, converts the degree of target throttle opening to a driving signal of the electronic throttle 3, and outputs the driving signal to the electronic throttle 3. In addition, the control unit 16 converts the amount of injected fuel into an injection pulse signal (valve opening pulse signal), and outputs the injection pulse signal to a fuel injection valve (injector) 7, which is provided in every cylinder and directly injects fuel into each cylinder 51, at the injection timing of each cylinder.

In addition, the control unit 16 outputs an ignition signal to a power transistor (not shown) so that an ignition plug 8 performs ignition at a calculated ignition timing, and the power transistor turns a primary circuit of an ignition coil on and off based on the ignition signal and generates a high voltage required for the ignition at a secondary circuit. The fuel injected from the fuel injection valve 7 mixes with the air taken in via the intake air manifold 5b and thus, a fuel-air mixture is formed in the cylinder 51. The fuel-air mixture formed in the cylinder 51 is ignited by a spark which is generated by an ignition plug 8 at a predetermined ignition timing, a piston 53 is pressed by the combustion pressure, and thus, the crank shaft 52 is rotated.

Exhaust gas which is generated after the ignition is fed to a three-way catalyst 11 via an exhaust manifold 10. In addition, a portion of the exhaust gas is recirculated to the intake air side through an exhaust recirculating pipe 18, and an exhaust recirculation amount is adjusted by a valve 19 which is mounted on the exhaust recirculating pipe 18. An air-fuel ratio sensor 12 which detects an exhaust air-fuel ratio is attached to an exhaust passage between the engine 9 and the three-way catalyst 11, and an oxygen sensor 20 which detects richness/leanness of the exhaust air-fuel ratio with respect to a theoretical air-fuel ratio is provided in the exhaust passage of the downstream side of the three-way catalyst 11.

FIG. 2 is a block diagram showing a circuit configuration of the control unit 16. Output values of the air flow sensor 2, the air-fuel ratio sensor 12, the accelerator opening sensor 13, water temperature sensor 14, crank angle sensor 15, throttle valve opening sensor 17, the oxygen sensor 20, the intake air temperature sensor 29, and a vehicle speed sensor 30 are input to the control unit 16 and are subjected to signal processing such as noise removal in an input circuit 24, and thereafter, the output values are stored in a RAM 23 via an input/output port 25 and are supplied for calculation processing in a CPU 21.

A control program which describes the contents of the calculation processing in the CPU 21 is written to a ROM 22 in advance. In addition, after a value which indicates an amount of operation of each actuator calculated according to the control program is stored in the RAM 23, the value is sent to the input/output port 25. As the operation signal of the ignition plug 8, an ON signal is set when electricity is applied to the primary circuit of the ignition coil, an ON/OFF signal which becomes OFF is set when electricity is not applied to the primary circuit, and timing when the electricity applied to the primary circuit is intercepted becomes ignition timing. The operation signals of the ignition plug 8 are output to the ignition coil, in which a power transistor provided in each ignition plug 8 is built-in, via an ignition signal output circuit 26.

In addition, as the driving signal (injection pulse signal) of the fuel injection valve 7, an ON signal is set when the valve is open, an ON/OFF signal which becomes OFF when the valve is closed is set, and the signals are output to each fuel injection valve 7 via a drive circuit 27. Here, the amount of injected fuel is controlled according to a fuel injection pulse width which is the ON time (valve opening time) of the driving signal (injection pulse signal) of the fuel injection valve 7. In addition, the driving signal which drives the electronic throttle 3 at a target opening is sent to the electronic throttle 3 (throttle motor) via the electronic throttle drive circuit 28.

Hereinafter, in the calculation processing of the fuel injection pulse width using the control unit 16, processing of characteristics of the present invention which limits the fuel injection pulse width so that the fuel injection pulse width is not less than an allowable minimum value (is more than the allowable minimum value) will be described in detail. FIG. 3 is a functional block diagram showing an outline of the calculation processing of the fuel injection pulse width in the control unit 16.

As shown in FIG. 3, the control unit 16 includes calculation units such as an inter-cylinder air-fuel ratio variation detection unit 1100, a fuel injection pulse width limitation unit 2100, and a fuel injection pulse width calculation unit 3100. In addition, the inter-cylinder air-fuel ratio variation detection unit 1100 calculates an air-fuel ratio variation index (Ind_imb) which indicates the degree of variation in the air-fuel ratio between the cylinders, based on an amplitude (power) during a two-rotation period of the engine of output signals (Rabf) of the air-fuel ratio sensor 12, the fuel injection pulse width limitation unit 2100 calculates the (allowable) minimum value (Min_TI) of the fuel injection pulse width from the air-fuel ratio variation index (Ind_imb), and the fuel injection pulse width calculation unit 3100 calculates fuel injection pulse widths (TI_1, TI_2, TI_3, and TI_4) of the cylinders based on the minimum value (Min_TI) or the like. Hereinafter, each calculation unit will be described in detail.

<Inter-Cylinder Air-Fuel Ratio Variation Detection Unit (FIG. 4)>

FIG. 4 is a functional block diagram showing the calculation processing in the inner-cylinder air-fuel ratio variation detection unit 1100 which calculates the air-fuel ratio variation index (Ind-imb), and in FIG. 4, the two-rotation component calculation unit 1101 calculates a two-rotation component real number portion (R_2rev) and a two-rotation component imaginary number portion (I_2rev) from the signal (Rabf) of the air-fuel ratio sensor, and an air-fuel ratio variation index calculation unit 1102 calculates the air-fuel ratio variation index (Ind_Imb) from the two-rotation component real number portion (R_2rev) and the two-rotation component imaginary number portion (I_2rev).

<Two-Rotation Component Calculation Unit (FIG. 5)>

FIG. 5 is a functional block diagram showing the calculation processing in the two-rotation component calculation unit 1101 which calculates the real number portion (R_2rev) and the imaginary number portion (I_2rev) of the two-rotation component in the signal (Rabf) of the air-fuel ratio sensor 12. The two-rotation component calculation unit 1101 calculates a difference (amount of change per predetermined time) between a current value and a previous value of the signal (Rabf) of the air-fuel ratio sensor 12, and the difference is defined as an air-fuel ratio sensor signal differential value (dRabf). In addition, the two-rotation component calculation unit 1101 performs Discrete Fourier Transformation with respect to the air-fuel ratio sensor signal differential value (dRabf).

In the Discrete Fourier Transformation, a first variable (C_R) and a second variable (C_I) are calculated based on a cylinder discrimination value (CYLCNT) which indicates the cylinder in which a piston is positioned at a predetermined position. In the four-cylinder engine 9 of the present example, the ignition of the cylinders is performed in an order of a first cylinder→a third cylinder→a fourth cylinder→a second cylinder, and accordingly, for example, the cylinder discrimination value (CYLCNT) is updated in an order of 1→3→4→2→1 every time 110 deg (BTDC 110 deg) is detected before a compression top dead center, that is, every 180 deg in a crank angle, and the cylinder discrimination value (CYLCNT) indicates that the cylinder, in which the piston is positioned at the predetermined position (in the vicinity of the compression top dead center), is which out of the four cylinders.

The first variable (C_R) is calculated as follows based on the cylinder discrimination value (CYLCNT).

$C\_R=1$ in case that $CYLCNT=1$, $C\_R=0$ in the case that $CYLCNT=3$ or 2, and $C\_R=-1$ in the case that $CYLCNT=4$.

In addition, the second variable (C_I) is calculated as follows based on the cylinder discrimination value (CYLCNT).

$C\_I=0$ in the case that $CYLCNT=1$ or 4, $C\_I=1$ in the case that $CYLCNT=3$, and $C\_I=-1$ in the case that $CYLCNT=2$.

In addition, a sum of the current value, the previous value, a preceding value of the previous value, and a further preceding value of the previous value of C_R×dRabf is calculated based on the first variable (C_R) and the air-fuel ratio sensor signal differential value (dRabf), and the sum is defined as the real number portion (R_2rev). Moreover, a sum of the current value, the previous value, a preceding value of the previous value, and a further preceding value of the previous value of C_I×dRabf is calculated based on the second variable (C_I) and the air-fuel ratio sensor signal differential value (dRabf), and the sum is defined as the imaginary number portion (I_2rev).

In addition, the calculations of the real number portion (R_2rev) and the imaginary number portion (I_2rev) are performed when the fuel injection pulse width is greater (longer) than a predetermined value. As described in detail below, the variation in the air-fuel ratio abruptly increases as the fuel injection pulse width decreases (is shorter), the variation in the air-fuel ratio is influenced by the size of the fuel injection pulse width, and the detection results of the variation in the air-fuel ratio are changed, and thus, the calculations are performed in order to set a pulse width region in which the variation in the air-fuel ratio is sufficiently small with respect to the change of the fuel injection pulse width to the detection region of the variation in the air-fuel ratio so that the detection results of the variation in the air-fuel ratio are not influenced. Accordingly, the predetermined value of the fuel injection pulse width is set based on a lower limit value of the pulse width region in which the change of the variation in the air-fuel ratio is sufficiently small with respect to the change of the fuel injection pulse width.

<Air-Fuel Ratio Variation Index Calculation Unit (FIG. 6)>

FIG. 6 is a functional block diagram showing the calculation processing in the air-fuel ratio variation index calculation unit 1102. In the air-fuel ratio variation index calculation unit 1102, the air-fuel ratio variation index (Ind_Imb) is calculated according to the following expression (Expression 1) based on the two-rotation component real number portion (R_2rev) and the two-rotation component imaginary number portion (I_2rev).

$$\text{Ind\_Imb}=\sqrt{(R\_2\text{rev}\times R\_2\text{rev})+(I\_2\text{rev}\times I\_2\text{rev})} \quad \text{Expression 1}$$

The air-fuel ratio variation index (Ind_Imb) calculated according to Expression 1 is the power of the two-rotation component of the engine in the signal (Rabf) of the air-fuel ratio sensor 12, and the power is a value which is correlated with the amplitude. Accordingly, the air-fuel ratio variation index (Ind_Imb) indicates the vibration amplitude of frequency corresponding to the two-rotation of the engine in the signal (Rabf) of the air-fuel ratio sensor.

<Fuel Injection Pulse Width Limitation Unit (FIG. 7)>

FIG. 7 is a functional block diagram showing the calculation processing in the fuel injection pulse width limitation unit 2100 shown in FIG. 3. In the fuel injection pulse width limitation unit 2100, the allowable minimum value (Min_TI) of the fuel injection pulse width is calculated as follows.

$\text{Min\_TI}=K1\_\text{Min\_TI}$ $(K1\_\text{Min\_TI}>0)$ in the case that $\text{Ind\_Imb}\geq K1\_\text{Ind\_Imb}$, and $\text{Min\_TI}=0$ in the case that $\text{Ind\_Imb}<K1\_\text{Ind\_Imb}$.

Here, K1_Ind_Imb is a threshold value which is used to determinate the level of the air-fuel ratio variation index (Ind_Imb), and when the fuel injection pulse width decreases, K1_Ind_Imb is appropriately determined in advance so that K1_Ind_Imb can determine whether or not the variation in the air-fuel ratio is a variation in an air-fuel ratio which is likely to deviate from the flammable air-fuel ratio. That is, the threshold value (K1_Ind_Imb) is set so that in the case in which Ind_Imb≥K1_Ind_Imb, it is estimated that a portion of the cylinders is likely to deviate from the flammable air-fuel ratio as the fuel injection pulse width decreases, and in the case that Ind_Imb<K1_Ind_Imb, it is estimated that the air-fuel ratios of all cylinders do not deviate from the flammable air-fuel ratio even when the fuel injection pulse width decreases.

Moreover, by changing the allowable minimum value (Min_TI), that is, the lower limit value of the injection pulse width according to the air-fuel ratio variation index (Ind_Imb), a variable range of the injection pulse width is changed, and thus, when the variation in the air-fuel ratio between cylinders increases, the air-fuel ratio of each cylinder is caused to be within the flammable air-fuel ratio by preventing the decrease of the injection pulse width. That is, the (K1_Min_TI) is set in advance so that the air-fuel ratio of each cylinder is within the flammable air-fuel ratio range when the variation in the air-fuel ratio between the cylinders increases. In other words, the (K1_Min_TI) is previously set to the lower limit value of the pulse width, in which the air-fuel ratio does not deviate from the flammable air-fuel ratio and is not lean even at the cylinder in which the air-fuel ratio is the leanest.

The variation in the air-fuel ratio due to the changes of static flow characteristics of the fuel injection valve 7 is constant regardless of the fuel injection pulse width. However, the variation in the air-fuel ratio due to the changes of dynamic flow characteristics increases as the fuel injection pulse width decreases. In the present example, since the variation in the air-fuel ratio is detected when the fuel injection pulse width is sufficiently great, the changes of the static flow characteristics are mainly detected, and the changes of the dynamic flow characteristics, in which the deviation in the air-fuel ratio occurs when the fuel injection pulse width decreases, are rarely detected. Accordingly, an appropriate value such as the empirically worst value of the changes of the dynamic flow characteristics with respect to the changes of the static flow characteristics is determined in advance, and according to the appropriate value, whether or not the air-fuel ratio deviates from the flammable air-fuel ratio is determined based on the air-fuel ratio variation index (Ind_Imb) as the fuel injection pulse width decreases. In addition, as a reference value of the limit of the flammable air-fuel ratio, the limit is 16 or more on the lean side, and is 10 or less on the rich side. However, the limit is dependent on performance of the engine.

<Fuel Injection Pulse Width Calculation Unit (FIG. 8)>

FIG. 8 is a functional block diagram showing the calculation processing in the fuel injection pulse width calculation unit 3100 shown in FIG. 3. The fuel injection pulse width calculation unit 3100 which calculates the fuel injection pulse widths (TI_1, TI_2, TI_3, and TI_4) of the cylinders includes a base injection pulse width calculation unit 3101 and an injection pulse width selection unit 3102. The base injection pulse width calculation unit 3101 calculates a base injection pulse width (Tp) from an amount (Qa) of intake air and an engine rotation speed (Ne) according to the following expression.

$$Tp = K0 \times Qa/(Ne \times Cyl)$$

Here, Cyl is the number of the cylinders, and Cyl is 4 in the four-cylinder engine. In addition, K0 is a value which is determined based on specifications (relationship between the fuel injection pulse width and the amount of injected fuel) of the fuel injection valve 7. In addition, in the injection pulse width selection unit 3102, the allowable minimum value (Min_TI) of the fuel injection pulse width calculated by the fuel injection pulse width limitation unit 2100 and the base injection pulse width (Tp) calculated by the base injection pulse width calculation unit 3101 are compared with each other, and the larger side of both is set to the fuel injection pulse widths (TI_1, TI_2, TI_3, and TI_4) of the cylinders.

That is, TI_1=Min_TI, TI_2=Min_TI, TI_3=Min_TI, and TI_4=Min_TI in the case that Tp≤Min_TI, and TI_1=TP, TI_2=TP, TI_3=TP, and TI_4=TP in the case that TP>Min_TI. Accordingly, the fuel injection pulse width is prevented from being set to the fuel injection pulse widths (TI_1, TI_2, TI_3, and TI_4) which are lower than the allowable minimum value (Min_TI). In other words, the fuel injection pulse widths (TI_1, TI_2, TI_3, and TI_4) are limited so as to be equal to or greater than the allowable minimum value (Min_TI). Here, the allowable minimum value (Min_TI) of the fuel injection pulse width is changed to a greater (longer) value as the air-fuel ratio variation index (Ind_Imb) increases, that is, as the variation in the air-fuel ratio between cylinders increases. Accordingly, even if it is set that TI_1=TP, TI_2=TP, TI_3=TP, and TI_4=TP when the variation in the air-fuel ratio decreases, by increasing the variation in the air-fuel ratio, the allowable minimum value (Min_TI) is changed to be increased, and TP≤Min_TI is satisfied. Therefore, the fuel injection pulse width at the same amount (Qa) of the intake air and the same engine rotation speed (Ne) is set so that TI_1=Min_TI, TI_2=Min_TI, TI_3=Min_TI, and TI_4=Min_TI are satisfied, and the fuel injection pulse widths (TI_1, TI_2, TI_3, and TI_4) increase by the difference of the allowable minimum value (Min_TI) which is changed to be increased and the TP.

In addition, in the present embodiment, the base injection pulse width (Tp) and the allowable minimum value (Min_TI) are compared with each other, and the base injection pulse width (Tp) is limited so as to be equal to or greater than the allowable minimum value (Min_TI). However, the final fuel injection pulse width is obtained by applying air-fuel ratio feedback control correction, increase/decrease amount correction when excessive, fuel vaporization efficiency (water temperature) correction, or the like to the base injection pulse width (Tp), the final fuel injection pulse width and the allowable minimum value (Min_TI) are compared with each other, and the final fuel injection pulse width may be limited so as to be equal to or greater than the allowable minimum value (Min_TI). In addition, Min_TI=0 is satisfied when the variation in the air-fuel ratio decreases. However, here, the limitation which is a countermeasure against deviation from the flammable range due to the variation in the air-fuel ratio is not performed, and for example, limitation for avoiding injection at a low pulse width range in which correlation between the injection pulse width and the injection amount is disturbed is separately performed.

Effect of First Example

Hereinafter, effects of the above-described first example will be described. In the fuel injection valve 7, the change (static flow characteristics) of the amount of injected fuel per unit valve opening time and the lift profile change (dynamic flow characteristics) when the valve is driven so as to be opened and closed occur due to a change over time due to deterioration, abrasion, clogging of deposits, or the like of a mechanical system, and thus, correlation between the fuel injection pulse width (fuel injection valve drive signal width) and the amount of the fuel which is actually injected is changed.

Here, as shown in FIG. 9, the change of the static flow characteristic, which is the change of the amount of injected fuel per unit valve open time, is changed in an increase direction or a decrease direction of the amount of injected fuel at a constant ratio with respect to an arbitrary fuel injection pulse width. In addition, as shown in FIG. 10, in the changes of the dynamic flow characteristics which are the lift profile changes when the valve is driven so as to be opened and closed, the amount of injected fuel is changed by a fixed amount with respect to the arbitrary fuel injection pulse width, and generally, the change of the fixed amount is changed in the increase direction of the amount of injected fuel. This is because lengthening of the time when the fuel injection valve is changed from an open state to a closed state is mainly generated in the lift profile change.

In the changes of the static flow characteristics, since the amount of injected fuel is changed at a constant ratio with respect to the arbitrary fuel injection pulse width, as shown in FIG. 11, deviation of the air-fuel ratio constantly occurs. Meanwhile, in the changes of the dynamic flow characteristics, since the amount of injected fuel is changed by a fixed amount with respect to the arbitrary fuel injection pulse width, as shown in FIG. 12, the deviation of the air-fuel ratio toward the rich side increases as the fuel injection pulse width decreases. Since the deviation of the air-fuel ratio according to the changes of the injection characteristics occurs in every fuel injection valve of each cylinder, when the degrees of the changes between the static flow characteristics and the dynamic flow characteristics are different from each other, the variation in the air-fuel ratio between cylinders occurs.

FIG. 13 shows the air-fuel ratio with respect to the fuel injection pulse width when the injection characteristics (static flow characteristics and dynamic flow characteristics)

of the fuel injection valves 7 of all cylinders are the same as each other in the four-cylinder engine. As shown in FIG. 13, if the injection characteristics of the fuel injection valves 7 of all cylinders are the same as each other, in all cases such as the case where the air-fuel ratio feedback control is not present or the case where the air-fuel ratio feedback control is present, the air-fuel ratios of all cylinders with respect to the arbitrary fuel injection pulse width are approximately coincident with each other. Meanwhile, FIG. 14 shows the air-fuel ratio with respect to the fuel injection pulse width when the injection characteristics (static flow characteristics and dynamic flow characteristics) of the fuel injection valve 7 of each cylinder are changed over time (during the change over time) in the four-cylinder engine. As shown in FIG. 14, the air-fuel ratio feedback control is not present, and when the fuel injection pulse width is relatively great, the changes of the static flow characteristics dominantly influence the air-fuel ratio, and only a certain value of the air-fuel ratio of each cylinder is deviated with respect to the target air-fuel ratio.

In addition, the influences of the changes of the dynamic flow characteristics gradually increase as the fuel injection pulse width decreases, and when the fuel injection pulse width sufficiently decreases, the air-fuel ratio of each cylinder is abruptly deviated to the rich side, and the air-fuel ratio difference between cylinders increases. When the air-fuel ratio feedback control is provided, a function is applied, which evenly corrects the amounts of the injected fuel of all cylinders so that the air-fuel ratio (average value of the air-fuel ratios of cylinders) of an exhaust pipe collection portion reaches the target air-fuel ratio. Accordingly, in the arbitrary fuel injection pulse width, the average value of the air-fuel ratios of the cylinders becomes the target air-fuel ratio.

When the fuel injection pulse width in which the static flow characteristics are greatly affected is relatively great, in the state where the air-fuel ratio of each cylinder is within the target air-fuel ratio, only a certain value of the air-fuel ratio is deviated with respect to the target air-fuel ratio. However, the influences of changes of the dynamic flow characteristics gradually increase as the fuel injection pulse width decreases, the air-fuel ratio difference between the cylinders increases, and thus, variation in the air-fuel ratio of each cylinder increases. If the fuel injection pulse width sufficiently decreases, the variation in the air-fuel ratio of each cylinder abruptly increases, and in the example shown in FIG. 14, the air-fuel ratio of the first cylinder abruptly becomes lean and deviates from the flammable air-fuel ratio, and thus, stability of the engine significantly deteriorates.

According to the above-described mechanism of the change over time of the fuel injection valve 7, when the injection characteristics of the fuel injection valve 7 are changed over time, the air-fuel ratio becomes leaner as the fuel injection pulse width decreases. Accordingly, the control unit 16 detects the variation in the air-fuel ratio between the cylinders, and when the variation in the air-fuel ratio increases so as to exceed the allowable level, the control unit sets the allowable minimum value (Min_TI) to be higher than that when the variation in the air-fuel ratio decreases so that the air-fuel ratio does not exceed the flammable range and does not become lean. Therefore, the control unit limits the fuel injection pulse width so as to be equal to or greater than the allowable minimum value (Min_TI), and further suppresses the decrease of the injection pulse width than in the case where the variation in the air-fuel ratio is small.

That is, when the variation in the air-fuel ratio between the cylinders occurs, the air-fuel ratio (average air-fuel ratio of each cylinder) of the exhaust pipe collection portion is vibrated during a two-rotation period of the engine, and the amplitude of the vibration also increases as the variation in the air-fuel ratio increases. Accordingly, when the changes of the static flow characteristics dominantly influence the variation in the air-fuel ratio, that is, when the fuel injection pulse width is relatively great, the amplitude of the air-fuel ratio of the exhaust pipe collection portion during the two-rotation period of the engine is detected. In addition, when the amplitude is equal to or greater than a predetermined value, it is determined that the variation in the air-fuel ratio is likely to increase (is likely to deviate from the flammable air-fuel ratio) when the fuel injection pulse width decreases (the influences of the change of the dynamic flow characteristics with respect to the variation in the air-fuel ratio increase), the lower limit value (Min_TI) of the variable range of the fuel injection pulse width is further increased than in the case where the variation in the air-fuel ratio is small, and thus, the fuel injection pulse width which is lower than the related allowable minimum value (Min_TI) is corrected so as to increase to the allowable minimum value (Min_TI). Therefore, due to the variation in the air-fuel ratio between the cylinders due to the changes over time of the injection characteristics of the fuel injection valve 7, the air-fuel ratios in a portion of the cylinders deviate from the flammable air-fuel ratio, and thus, it is possible to prevent the stability of the engine 9 from being decreased.

Second Example

In the first example, the variation in the air-fuel ratio between the cylinders is detected based on the output signal (Rabf) of the air-fuel ratio sensor 12, that is, the exhaust air-fuel ratio. However, since the variation in the air-fuel ratio between the cylinders occurs, rotation change of each cylinder is dispersed, and thus, it is possible to detect the variation in the air-fuel ratio between the cylinders from the rotation change of each cylinder. Accordingly, in a second example described below, the rotation change (angle acceleration) of each cylinder is calculated from the signals of a crank angle sensor 15, the variation in the air-fuel ratio between the cylinders is detected based on a difference between the maximum value and the minimum value of the rotation change of each cylinder, and the fuel injection pulse width is limited so as to be equal to or greater than a predetermined value.

Since the system configuration in engine 9 in the second example is similar to the system shown in FIG. 1 of the first example, and the circuit configuration of the controller 16 in the second example is similar to the circuit configuration shown in FIG. 2 in the first example, here, the detailed descriptions thereof are omitted. FIG. 15 is a functional block diagram showing the outline of the calculation processing of the fuel injection pulse width in the control unit 16 of the second example.

As shown in FIG. 15, the control unit 16 includes each calculation unit such as an inter-cylinder air-fuel ratio variation detection unit 1200, a fuel injection pulse width limitation unit 2200, and a fuel injection pulse width calculation unit 3200. The second example is different from the first example shown in FIG. 3 in that inter-cylinder air-fuel ratio variation detection unit 1200 inputs the signals (Ne) of the crank angle sensor 15. In addition, the inter-cylinder air-fuel ratio variation detection unit 1200 calculates the air-fuel ratio variation index (Ind_imb) based on the rotation change (angle acceleration) of each cylinder obtained from the signals (Ne) of the crank angle sensor 15, the fuel injection pulse width limitation unit 2200 calculates the (allowable) minimum value (Min_TI) of the fuel injection pulse width from the air-fuel ratio variation index (Ind_imb), and the fuel injection pulse width calculation unit 3200 calculates the fuel injection pulse widths (TI_1, TI_2, TI_3, and TI_4) of the cylinders based on the minimum value (Min_TI) or the like. Hereinafter, each calculation unit will be described in detail.

<Inter-Cylinder Air-Fuel Ratio Variation Detection Unit (FIG. 16)>

As shown in FIG. 16, the inter-cylinder air-fuel ratio variation detection unit 1200 includes a cylinder-by-cylinder rotation change calculation unit 1201 and an air-fuel ratio variation index calculation unit 1202. The cylinder-by-cylinder rotation change calculation unit 1201 calculates the rotation changes (dNe_1, dNe_2, dNe_3, and dNe_4) of the cylinder from the signals (Ne) of the crank angle sensor 15, and the air-fuel ratio variation index calculation unit 1202 calculates the air-fuel ratio variation index (Ind_Imb) from the rotation changes (dNe_1, dNe_2, dNe_3, and dNe_4) of the cylinders. Hereinafter, the cylinder-by-cylinder rotation change calculation unit 1201 and the air-fuel ratio variation index calculation unit 1202 will be described in detail.

<Cylinder-by-Cylinder Rotation Change Detection Unit (FIG. 17)>

In the cylinder-by-cylinder rotation change detection unit 1201, as shown in FIG. 17, the rotation changes (dNe_1, dNe_2, dNe_3, and dNe_4) of the cylinder are calculated. First, the difference between the current value and the previous value of the engine rotation speed (Ne) is calculated, and the difference is defined as dNe (rotation change). In addition, the rotation change (dNe_1) of the first cylinder, the rotation change (dNe_2) of the second cylinder, the rotation change (dNe_3) of the third cylinder, and the rotation change (dNe_4) of the fourth cylinder are calculated as follows based on the rotation change (dNe).

In the case that cylinder discrimination value (CYLCNT)=1, dNe_1=dNe_1 (previous value), dNe_2=dNe_2 (previous value), dNe_3=dNe_3 (previous value), and dNe_4=dNe.

In the case that cylinder discrimination value (CYLCNT)=2, dNe_1=dNe_1 (previous value), dNe_2=dNe_2 (previous value), dNe_3=dNe, and dNe_4=dNe_4 (previous value).

In the case that cylinder discrimination value (CYLCNT)=3, dNe_1=dNe_1 (previous value), dNe_2=dNe, dNe_3=dNe_3 (previous value), and dNe_4=dNe_4 (previous value).

In the case that cylinder discrimination value (CYLCNT)=4, dNe_1=dNe, dNe_2=dNe_2 (previous value), dNe_3=dNe_3 (previous value), and dNe_4=dNe_4 (previous value).

<Air-Fuel Ratio Variation Index Calculation Unit (FIG. 18)>

In the air-fuel ratio variation index calculation unit 1202, as shown in FIG. 18, the maximum value and the minimum value including the rotation change (dNe_1) of the first cylinder, the rotation change (dNe_2) of the second cylinder, the rotation change (dNe_3) of the third cylinder, and the rotation change (dNe_4) of the fourth cylinder are obtained, and the difference between the maximum value and the minimum value is set as the air-fuel ratio variation index (Ind_Imb).

<Fuel Injection Pulse Width Limitation Unit (FIG. 19)>

FIG. 19 is a functional block diagram showing the calculation processing in the fuel injection pulse width limitation unit 2200 shown in FIG. 15. In the fuel injection pulse width limitation unit 2200, the allowable minimum value (Min_TI) of the fuel injection pulse width is calculated as follows.

Min_$TI$=$K1$_Min_$TI$ in the case that Ind_$Imb$≥$K2$_Ind_$Imb$, and Min_$TI$=0 in the case that Ind_$Imb$<$K2$_Ind_$Imb$.

Here, K2_Ind_Imb is the threshold value which is used to determinate the level of the air-fuel ratio variation index (Ind_Imb), and when the fuel injection pulse width decreases, K2_Ind_Imb is appropriately determined in advance so that K2_Ind_Imb determines whether or not the variation in the air-fuel ratio is a variation in an air-fuel ratio which is likely to deviate from the flammable air-fuel ratio. That is, the threshold value (K2_Ind_Imb) is set so that in the case in which Ind_Imb≥K2_Ind_Imb, it is estimated that a portion of the cylinders is likely to deviate from the flammable air-fuel ratio as the fuel injection pulse width decreases, and in the case that Ind_Imb<K2_Ind_Imb, it is estimated that the air-fuel ratios of all cylinders will not deviate from the flammable air-fuel ratio even when the fuel injection pulse width decreases.

<Fuel Injection Pulse Width Calculation Unit (FIG. 8)>

In the fuel injection pulse width calculation unit 3200, the fuel injection pulse widths (TI_1, TI_2, TI_3, and TI_4) of the cylinders are calculated. Specifically, similarly to the fuel injection pulse width calculation unit 3100 shown in FIG. 8, since the fuel injection pulsewidths (TI_1, TI_2, TI_3, and TI_4) of the cylinders are calculated, the details thereof are omitted.

Effects of Second Example

Hereinafter, effects of the second example will be described. If the variation in the air-fuel ratio between the cylinders occurs, the variation in the rotation change (or the angle acceleration) between the cylinders occurs, and the variation in the rotation change increases as the variation in the air-fuel ratio increases.

Accordingly, when the changes of the static flow characteristics dominantly influence the variation in the air-fuel ratio, that is, when the fuel injection pulse width is relatively great, the rotation change of each cylinder is detected. In addition, when the difference (variation in the rotation change between cylinders) between the maximum value and the minimum value of the rotation change of each cylinder is equal to or greater than a predetermined value, it is determined that the variation in the air-fuel ratio is likely to increase (is likely to deviate from the flammable air-fuel ratio) when the fuel injection pulse width decreases (the influences of the change of the dynamic flow characteristics with respect to the variation in the air-fuel ratio increases), and the fuel injection pulse width is limited so as to be equal to or greater than the allowable minimum value (Min_TI) which is set to a greater value than that when the variation in the air-fuel ratio is small. Accordingly, based on the signals of the crank angle sensor 15, the variation in the air-fuel ratio between the cylinders is stably detected, and it is possible to prevent stability of the engine 9 from decreasing due to the variation in the air-fuel ratio between the cylinders caused by the changes over time of the injection characteristics of the fuel injection valve 7.

Third Example

In the first example, the variation in the air-fuel ratio between the cylinders is detected based on the detection value of the average air-fuel ratio between the cylinders. However, by providing the air-fuel ratio sensor which individually detects the exhaust air-fuel ratio of each cylinder, it is possible to detect the variation in the air-fuel ratio between the cylinders, and a third example which is the related configuration will be described in detail. FIG. 20 is a system diagram of the engine 9 in the third example.

In the engine 9 shown in FIG. 20, each of air-fuel ratio sensors 31 to 34 is attached to each of the exhaust pipes (upstream sides of the collection portions of the exhaust manifolds) of the first to fourth cylinders. Since the system configuration except for the air-fuel ratio sensors 31 to 34 is similar to the engine 9 shown in FIG. 1, detailed descriptions thereof are omitted. FIG. 21 shows the circuit configuration of the control unit 16 in the third example. Since the control unit 16 shown in FIG. 21 is different from that of FIG. 2 in that the output values of the air-fuel ratio sensors 31 to 34 are input and others are similar to those of FIG. 2, detailed descriptions thereof are omitted.

FIG. 22 is a functional block diagram showing the calculation processing function of the fuel injection pulse width in the control unit 16 of the third example, in which the control unit 16 includes an inter-cylinder air-fuel ratio variation detection unit 1300, a fuel injection pulse width limitation unit 2300, and a fuel injection pulse width calculation unit 3300. The inter-cylinder air-fuel ratio variation detection unit 1300 calculates the air-fuel ratio variation index (Ind_imb) based on output signals (Rabf1, Rabf2, Rabf3, and Rabf4) of the air-fuel ratio sensors 31 to 34 provided on the cylinders, the fuel injection pulse width limitation unit 2300 calculates the (allowable) minimum value (Min_TI) of the fuel injection pulse width from the air-fuel ratio variation index (Ind_imb), and the fuel injection pulse width calculation unit 3300 calculates the fuel injection pulse widths (TI_1, TI_2, TI_3, and TI_4) of the cylinders based on the minimum value (Min_TI) or the like.

Hereinafter, each calculation unit will be described in detail.

<Inter-Cylinder Air-Fuel Ratio Variation Detection Unit (FIG. 23)>

The inter-cylinder air-fuel ratio variation detection unit 1300 includes a cylinder air-fuel ratio movement average value calculation unit 1301 and an air-fuel ratio variation index calculation unit 1302. The cylinder air-fuel ratio movement average value calculation unit 1301 calculates movement average values (MRabf1, MRabf2, MRabf3, and MRabf4) of the air-fuel ratios of the first to fourth cylinders from the air-fuel ratios (Rabf1, Rabf2, Rabf3, and Rabf4) of the first to fourth cylinders, and the air-fuel ratio variation index calculation unit 1302 calculates the air-fuel ratio variation index (Ind_Imb) from the movement average values (MRabf1, MRabf2, MRabf3, and MRabf4) of the cylinders. Hereinafter, the cylinder air-fuel ratio movement average value calculation unit 1301 and the air-fuel ratio variation index calculation unit 1302 will be described in detail.

<Cylinder Air-Fuel Ratio Movement Average Value Calculation Unit (FIG. 24)>

As shown in FIG. 24, the cylinder air-fuel ratio movement average value calculation unit 1301 calculates the (weighting) movement average values (MRabf1, MRabf2, MRabf3, and MRabf4) of the air-fuel ratios of the first to fourth cylinders according to the following expressions.

$MRabf\_1 = KM \times Rabf\_1 + (1-KM) \times Rabf\_1(\text{previous value})$ $MRabf\_2 = KM \times Rabf\_2 + (1-KM) \times Rabf\_2(\text{previous value})$ $MRabf\_3 = KM \times Rabf\_3 + (1-KM) \times Rabf\_3(\text{previous value})$ $MRabf\_4 = KM \times Rabf\_4 + (1-KM) \times Rabf\_4(\text{previous value})$ In addition, a weighting coefficient (KM) is appropriately determined in advance so that high frequency noise of MRabf_1 to 4 is removed so as to be stabilized.

<Air-Fuel Ratio Variation Index Calculation Unit (FIG. 25)>

As shown in FIG. 25, the air-fuel ratio variation index calculation unit 1302 calculates a difference between the maximum value and the minimum value of the (weighting) movement average values (MRabf1, MRabf2, MRabf3, and MRabf4) of the air-fuel ratios of the first to fourth cylinders, in other words, a difference (the width of the variation in the air-fuel ratio) between the richest air-fuel ratio and the leanest air-fuel ratio out of the air-fuel ratios of the first to fourth cylinders, as the air-fuel ratio variation index (Ind_Imb).

<Fuel Injection Pulse Width Limitation Unit (FIG. 26)>

As shown in FIG. 26, the fuel injection pulse width limitation unit 2300 of the third example obtains the allowable minimum value (Min_TI) of the fuel injection pulse width. That is, Min_TI=K3_Min_TI in the case that Ind_Imb≥K3_Ind_Imb, and Min_TI=0 in the case that Ind_Imb<K3_Ind_Imb.

Here, K3_Ind_Imb is a threshold value which is used to determinate the level of the air-fuel ratio variation index (Ind_Imb), and when the fuel injection pulse width decreases, K3_Ind_Imb is appropriately determined in advance so that K3_Ind_Imb determines whether or not the variation in the air-fuel ratio is a variation in an air-fuel ratio which is likely to deviate from the flammable air-fuel ratio. That is, the threshold value (K3_Ind_Imb) is set so that in the case that Ind_Imb≥K3_Ind_Imb, it is estimated that a portion of the cylinders is likely to deviate from the flammable air-fuel ratio as the fuel injection pulse width decreases, and in the case that Ind_Imb<K3_Ind_Imb, it is estimated that the air-fuel ratios of all cylinders will not deviate from the flammable air-fuel ratio even when the fuel injection pulse width decreases.

<Fuel Injection Pulse Width Calculation Unit (FIG. 8)>

In the fuel injection pulse width calculation unit 3300, the fuel injection pulse widths (TI_1, TI_2, TI_3, and TI_4) of the cylinders are calculated. Specifically, since the fuel injection pulse widths (TI_1, TI_2, TI_3, TI_4) of the cylinders are calculated similarly to in the fuel injection pulse width calculation unit 3100 shown in FIG. 8, detailed descriptions thereof are omitted.

Effects of Third Example

Hereinafter, effects of the third example will be described. In the third example, the air-fuel ratio of each cylinder is individually detected from the signal of the air-fuel ratio sensor attached to the exhaust pipe of each cylinder, and when the difference (the variation in the air-fuel ratio between the cylinders) between the leanest air-fuel ratio and the richest air-fuel ratio among the air-fuel ratios of the cylinders is equal to or greater than the predetermined value, it is determined that the variation in the air-fuel ratio is likely to increase (is likely to deviate from the flammable air-fuel ratio) when the fuel injection pulse width decreases, and the fuel injection pulse width is limited so as to be equal to or greater than the allowable minimum value (Min_TI) which is set to a greater value than that when the air-fuel ratio variation is small.

Here, since the air-fuel ratio variation index (Ind_imb) is calculated from the output signals (Rabf1, Rabf2, Rabf3, and Rabf4) of the air-fuel ratio sensors 31 to 34 provided on the cylinders, it is possible to accurately detect the variation in the air-fuel ratio between cylinders. In addition, when the variation in the air-fuel ratio increases, the allowable minimum value (Min_TI) of the fuel injection pulse width is changed so as to be greater, and the air-fuel ratio is prevented from being deviated from the flammable air-fuel ratio. Accordingly, it is possible to prevent the stability of the engine 9 from decreasing due to the variation in the air-fuel ratio between the cylinders caused by the changes over time of the injection characteristics of the fuel injection valve 7.

Fourth Example

In the engine 9 which includes the air-fuel ratio sensors 31 to 34 for detecting the air-fuel ratios of the cylinders, the changes of the static flow characteristics and the changes of the dynamic flow characteristics of the fuel injection valve 7 of each cylinder are detected based on the output signals (Rabf1, Rabf2, Rabf3, and Rabf4) of the air-fuel ratio sensors 31 to 34, and it is possible to estimate whether or not the air-fuel ratio of each cylinder deviates from the range of the flammable air-fuel ratio when the fuel injection pulse width decreases, based on the detection results, and further, a fourth example which is the related configuration will be described in detail. Since the system configuration of the engine 9 of the fourth example is similar to the configuration (FIG. 20) of the third example and the internal configuration of the control unit 16 is similar to that of the third example (FIG. 21), here, detailed descriptions thereof are omitted.

FIG. 27 is a functional block diagram showing the outline of the calculation processing of the fuel injection pulse width in the control unit 16 of the fourth example, and an injection characteristic change detection unit 1400, a fuel injection pulse width limitation unit 2400, and a fuel injection pulse width calculation unit 3400 are provided. In addition, the injection characteristic change detection unit 1400 calculates the changes (S_1, S_2, S_3, S_4) of the static flow characteristics and the changes (QFD_1, QFD_2, QFD_3, QFD4) of the dynamic flow characteristics of the fuel injection valves 7 of the cylinders based on the output signals (Rabf1, Rabf2, Rabf3, and Rabf4) of the air-fuel ratio sensors 31 to 34 of the cylinders and the fuel injection pulse widths (TI_1, TI_2, TI_3, and TI_4) of the first to fourth cylinders, and calculates reference fuel injection amounts (QF0_1, QF0_2, QF0_3, and QF0_4) of the cylinders.

The fuel injection pulse width limitation unit 2400 calculates the (allowable) minimum value (Min_TI) of the fuel injection pulse width from the changes (S_1, S_2, S_3, and S_4) of the static flow characteristics, the changes (QFD_1, QFD_2, QFD_3, and QFD4) of the dynamic flow characteristics, and the reference fuel injection amounts (QF0_1, QF0_2, QF0_3, and QF0_4) of the cylinders. In addition, the fuel injection pulse width calculation unit 3400 calculates the fuel injection pulse widths (TI_1, TI_2, TI_3, and TI_4) of the cylinders based on the minimum value (Min_TI) of the fuel injection pulse width or the like.

Hereinafter, each calculation unit will be described in detail.

<Injection Characteristic Change Detection Unit (FIG. 28)>

As shown in the functional block diagram of FIG. 28, the injection characteristic change detection unit 1400 includes functions of an nth cylinder reference fuel injection amount calculation unit 1401, an nth cylinder actual fuel injection amount calculation unit 1402, and an nth cylinder injection characteristic change calculation unit 1403, and calculates an nth cylinder reference fuel injection amount (QF0_n), an nth cylinder static flow characteristic change (S_n), and an nth cylinder dynamic flow characteristic change (QFD_n) using the calculation units 1401 to 1403. Here, the n is a cylinder number (1 to 4), and the present processing is performed in every cylinder.

The nth cylinder reference fuel injection amount calculation unit 1401 calculates the nth cylinder reference fuel injection amount (QF0_n) from TI_n and S_n (previous values) and QFD_n (previous value), and the nth cylinder actual fuel injection amount calculation unit 1402 calculates an nth cylinder actual fuel injection amount c (QF_n_c), an nth cylinder reference fuel injection amount c (QF0_n_c), an nth cylinder actual fuel injection amount b (QF_n_b), and an nth cylinder reference fuel injection amount b (QF0_n_b) from QF0_n, TI_n, and Rabf_n, and the nth cylinder injection characteristic change calculation unit 1403 calculates the nth cylinder static flow characteristic change (S_n) and the nth cylinder dynamic flow characteristic change (QFD_n) from QF_n_c, QF0_n_c, QF_n_b, and QF0_n_b. Hereinafter, the nth cylinder reference fuel injection amount calculation unit 1401, the nth cylinder actual fuel injection amount calculation unit 1402, and the nth cylinder injection characteristic change calculation unit 1403 will be described in detail.

<Nth Cylinder Reference Fuel Injection Amount Calculation Unit (FIG. 29)>

As shown in FIG. 29, the nth cylinder reference fuel injection amount calculation unit 1401 calculates the nth cylinder reference fuel injection amount (QF0_n). Specifically, TI_n (the nth cylinder fuel injection pulse) is converted into the amount of injected fuel based on a table Tbl_QF0. The table Tbl_QF0 is equivalent to a design value (errorless ideal characteristic) of the correlation between the amount of injected fuel and the injection pulse width of an unused fuel injection valve 7 before the injection characteristics of the fuel injection valve are changed.

A value, which is obtained by adding QFD_n (nth cylinder dynamic flow characteristic change) to the amount of injected fuel converted by the table Tbl_QF0, and multiplying the added value by S_n (nth cylinder static flow characteristic change), is defined as QF0_n (nth cylinder reference fuel injection amount). QF0_n (nth cylinder reference fuel injection amount) is the amount of injected fuel after the injection characteristics are changed with time when it is assumed that the injection characteristics of the unused fuel injection valve 7 of the nth cylinder are errorless ideal characteristics (design value). In addition, S_n_and QFD_n may be updated when S_n_and QFD_n are compared with the previous values and are changed so as to be equal to or greater than a predetermined value, and may not be updated when S_n_and QFD_n are not changed.

<Nth Cylinder Actual Fuel Injection Amount Calculation Unit (FIG. 30)>

As shown in FIG. 30, the nth cylinder actual fuel injection amount calculation unit 1402 calculates the nth cylinder actual fuel injection amount c (QF_n_c), the nth cylinder reference fuel injection amount c (QF0_n_c), the nth cylinder actual fuel injection amount b (QF_n_b), and the nth cylinder reference fuel injection amount b (QF0_n_b).

Specifically, QF_n_c, QF0_n_c, QF_n_b, and QF0_n_b are calculated according to the following expressions.

In the case that TI_n_≥KTIc, AFO_n_c=Alpha×Rabf_n, QF0_n_c=QF0_n, and QF_n_c=AFst/AFO_n_c× QF0_n In the case that TI_n≤KTIb, AFO_n_b=Alpha×Rabf_n, QF0_n_b=QF0_n, and QF_n_b=AFst/AFO_n_b× QF0_n In the above expressions, TI_n is the nth cylinder fuel injection pulse width, QF0_n is the nth cylinder reference fuel injection amount, Rabf_n is the nth cylinder air-fuel ratio, AFO_n is the air-fuel ratio (base air-fuel ratio) of the cylinder when the air-fuel ratio feedback control is not performed, Alpha is a fuel injection amount correction coefficient used in the air-fuel ratio feedback control, and AFst is the errorless ideal air-fuel ratio of the fuel injection valve 7, that is, a target air-fuel ratio (generally, a theoretical air-fuel ratio). In addition, KTIc>KTIb is satisfied, and as described below, the deviation between KTIc and KTIb is set so as to be a sufficient value to obtain QFD_n (nth cylinder dynamic flow characteristic change) and S_n_(nth cylinder static flow characteristic change) from an actual injection amount of each of the two fuel injection pulse widths that are different from each other.

<Nth Cylinder Injection Characteristic Change Calculation Unit (FIG. 31)>

As shown in FIG. 31, the nth cylinder injection characteristic change calculation unit 1403 calculates the nth cylinder static flow characteristic change (S_n) and the nth cylinder dynamic flow characteristic change (QFD_n). Specifically, S_n_and QFD_n are obtained according to the following expression.

$$S\_n=(QF\_n\_c-QF\_n\_b)/(QF0\_n\_c-QF0\_n\_b) \text{ and}$$
$$QFD\_n=QF\_n\_c/S\_n-QF0\_n\_c$$

<Fuel Injection Pulse Width Limitation Unit (FIG. 32)>

As shown in FIG. 32, the fuel injection pulse width limitation unit 2400 calculates the minimum value (Min_TI) of the fuel injection pulse width. Specifically, first, an nth cylinder lean limitation equivalent fuel injection amount (QF0_n_L) is obtained as follows.

$$QF0\_n\_L=(R/(1-R))\times QFD\_n \text{ and } R=KAF\_L/AF\_st\times \text{Alpha}\_GK\times S\_n$$

In the above expressions, KAF_L_is a lean limitation equivalent air-fuel ratio (based on 16 to 17), and AF_st is a theoretical air-fuel ratio equivalent value. In addition, Alpha_GK is a learning value of the fuel injection amount correction coefficient Alpha used in the air-fuel ratio feedback control, and the amount of injected fuel increases (the air-fuel ratio becomes rich) as the value of Alpha_GK increases, and the amount of injected fuel decreases (the air-fuel ratio becomes lean) as the value of Alpha_GK decreases.

Next, the nth cylinder lean limitation equivalent fuel injection amount (QF0_n_L) is converted into an nth cylinder lean limitation equivalent fuel injection pulse width (TI0_n_L) using a table Tbl_TI0. The table Tbl_TI0 is a table in which the input column and the output column of the above-described table (Tbl_QF0) are inverted to each other. If the nth cylinder lean limitation equivalent fuel injection pulse width (TI0_n_L) is calculated, the maximum value of TI0_n_L (n:1 to 4) is defined as Min_TI (fuel injection pulse width minimum value). That is, the injection pulse width, which is not lean to exceed the lean limitation (flammable air-fuel ratio range) in all cylinders, is defined as Min_TI (fuel injection pulse width minimum value).

<Fuel Injection Pulse Width Calculation Unit (FIG. 8)>

The fuel injection pulse width calculation unit 3400 calculates the fuel injection pulse widths (TI1, TI2, TI3, and TI4) of the cylinders. Specifically, as shown in FIG. 8, the fuel injection pulse widths (TI1, TI2, TI3, and TI4) are calculated, the calculation contents are similar to those of the first example, and thus, here, detailed descriptions thereof are omitted.

Effects of Fourth Example

Hereinafter, effects of the fourth example will be described.

Based on the changes of the injection characteristics of the fuel injection valve 7 shown in FIGS. 9 and 10, the amount of injected fuel after the injection characteristics in a fuel injection pulse width are changed is expressed by Expression (1).

$$QF\_n=S\_n\times(QF0\_n+QFD\_n) \qquad (1)$$

In addition, if the air-fuel ratio of the nth cylinder while the air-fuel ratio feedback control is performed is defined as AFC_n, the air fuel ratio AFO_n of the cylinder when the air-fuel ratio feedback control is not performed, that is, the air-fuel ratio showing the deviation in the air fuel ratio due to the changes of the injection characteristics is expressed by Expression (2).

$$AFO\_n=\text{Alpha}\times AFC\_n \qquad (2)$$

In addition, a relationship between QFn, QF0n, and AFOn is expressed by Expression (3).

$$QF\_n=AFst/AFO\_n\times QF0\_n \qquad (3)$$

Accordingly, if the air-fuel ratio and Alpha of each cylinder in two fuel injection pulse widths different from each other are detected, based on Expression (1) and Expression (3), S_n_and QFD_n can be obtained according to Expression (4) and Expression (5), and in the fourth example, in the case that TI_≥KTIc and TI_n≤KTIb, the actual fuel injection amount (QF_n) and the reference fuel injection amount (QF0_n) are obtained.

$$S\_n=(QF\_n\_c-QF\_n\_b)/(QF0\_n\_c-QF0\_n\_b) \qquad (4)$$

$$QFD\_n=(QF\_n\_c/S\_n)-QF0\_n \qquad (5)$$

Moreover, when the lean limitation equivalent air-fuel ratio is defined as KAF_L, QF0_n satisfying AFC_n=KAF_L . . . (6) is obtained by sequentially substituting Expression (2), Expression (3), and Expression (1) for Expression (6).

$$QF0\_n=(R/1-R)\times QFD\_n \qquad (7)$$

Here, in the case that R=(KAF_L/AF_st)×Alpha×S_n, since the relationship between TI_n and QF0_n can be determined in advance, it possible to obtain TI_n satisfying Expression (7).

In addition, by limiting the fuel injection pulse width so as to be equal to or greater than the maximum value of TI_n of each cylinder satisfying Expression (7), it is possible to prevent the air fuel ratio of a cylinder from exceeding the lean limitation air-fuel ratio KAF_L. Since the change over time of the fuel injection valve is mainly generated by the static flow characteristics and the dynamic flow characteristics, if the changes of the static flow characteristics and the changes of dynamic flow characteristics of the fuel injection valve of each cylinder can be detected, it is also possible to estimate a deviation amount in the air-fuel ratio with respect to an arbitrary fuel injection pulse width. Accordingly, it is also possible to estimate the fuel injection pulse width which deviates from the flammable air-fuel ratio, and thus, it is possible to appropriately limit the fuel injection pulse width.

Fifth Example

In a fifth example described in detail below, based on the signal of the air-fuel ratio sensor (average air-fuel ratio) of the exhaust pipe collection portion and the signal of the crank angle sensor (engine rotation speed), the changes of the static flow characteristics and the changes of the dynamic flow characteristics of the fuel injection valve in the cylinder having the richest or leanest air-fuel ratio are detected, and based on the detection results, it is estimated whether or not the air-fuel ratio of the cylinder deviates from the range of the flammable air-fuel ratio if the fuel injection pulse width of the cylinder decreases, and when it is estimated that the air-fuel ratio of the cylinder deviates from the range of the flammable air-fuel ratio, the fuel injection pulse widths of all cylinders are limited so as to be equal to or greater than a predetermined value. Since the engine system of the fifth example is similar to that shown in FIG. 1 of the first example, detailed descriptions thereof are omitted. In addition, since the internal configuration of the control unit 16 of the fifth example is similar to that shown in FIG. 2 of the first example, detailed descriptions thereof are omitted.

FIG. 33 shows a functional block diagram showing the control contents of the control unit 16 in the fifth example, and a two-rotation component calculation unit 1501, a two-rotation component phase calculation unit 1502, a first air-fuel ratio deviation cylinder detection unit 1503, a two-rotation component power calculation unit 1504, a cylinder-by-cylinder rotation change calculation unit 1505, a second air-fuel ratio deviation cylinder detection unit 1506, a third air-fuel ratio deviation cylinder detection unit 1507, an air-fuel ratio estimation unit 1508 of air-fuel ratio deviation cylinder, an injection characteristic change detection unit 1509, a fuel injection pulse width limitation unit 2500, and a fuel injection pulse width calculation unit 3500 are provided.

Here, the two-rotation component calculation unit 1501 calculates the real number portion (R_2rev) and the imaginary number portion (I_2rev) of the two-rotation component in the signal (Rabf) of the air-fuel ratio sensor 12, and the two-rotation component phase calculation unit 1502 calculates a two-rotation component phase (Phase) from R_2rev and I_2rev. In addition, the first air-fuel ratio deviation cylinder detection unit 1503 detects the cylinder in which the air-fuel ratio is most deviated of all the cylinders and the deviation direction (rich direction or lean direction) of the air-fuel ratio in the detected cylinder, from the two-rotation component phase (Phase), and sets flags (f_a_2rev, f_b_2rev, f_c_2rev, and f_d_2rev) according to the detection results. Moreover, the two-rotation component power calculation unit 1504 calculates two-rotation component power (Power) from R_2rev and I_2rev.

Meanwhile, the cylinder-by-cylinder rotation change calculation unit 1505 calculates cylinder-by-cylinder rotation changes (dNe_1, dNe_2, dNe_3, and dNe_4) from the signal of the crank angle sensor 15, and the second air-fuel ratio deviation cylinder detection unit 1506 detects the cylinder in which the air-fuel ratio is most deviated and the deviation direction (rich direction or lean direction) of the air-fuel ratio in the detected cylinder, from d_Ne_1, dNe_2, dNe_3, and dNe_4, and sets flags (f_1R_dNe, f_2R_dNe, f_3R_dNe, f_4R_dNe, f_1L_dNe, f_2L_dNe, f_3L_dNe, and f_4L_dNe) according to the detection results. Moreover, the third air-fuel ratio deviation cylinder detection unit 1507 finally detects the cylinder in which the air-fuel ratio is most deviated and the deviation direction (rich direction or lean direction) of the air-fuel ratio in the detected cylinder, using both of the detection results of the first air-fuel ratio deviation cylinder detection unit 1503 and the detection results of the second air-fuel ratio deviation cylinder detection unit 1506, and sets flags (f_1R, f_2R, f_3R, f_4R, f_1L, f_2L, f_3L, and f_4L) according to the detection results.

In addition, the air-fuel ratio estimation unit 1508 of air-fuel ratio deviation cylinder calculates the air-fuel ratio (estRabf_k_cyl) of the cylinder in which the air-fuel ratio is most deviated and the number (k_cyl) of the cylinder, from the detection results of the third air-fuel ratio deviation cylinder detection unit 1507, the signal (Rabf) of the air-fuel ratio sensor 12, and the two-rotation component power (Power). The injection characteristic change detection unit 1509 calculates a static flow characteristic change (S_k_cyl), a dynamic flow characteristic change (QFD_k_cyl), and a reference fuel injection amount (QF0_k_cyl) of the cylinder with respect to the fuel injection valve 7 of the cylinder in which the air-fuel ratio is most deviated, based on estRabf_k_cyl, k_cyl, and the fuel injection pulse widths (TI_1, TI_2, TI_3, and TI_4) of the first to fourth cylinders.

The fuel injection pulse width limitation unit 2500 calculates the (allowable) minimum value (Min_TI) of the fuel injection pulse width from S_k_cyl, QFD_k_cyl, and QF0_k_cyl, and the fuel injection pulse width calculation unit 3500 calculates the fuel injection pulse widths (TI_1, TI_2, TI_3, and TI_4) of each cylinder, based on the minimum value (Min_TI) or the like of the fuel injection pulse width. Hereinafter, each calculation unit will be described in detail.

<Two-Rotation Component Calculation Unit (FIG. 5)>

The two-rotation component calculation unit 1501 calculates the real number portion (R_2rev) and the imaginary number portion (I_2rev) of the two-rotation component in the signal (Rabf) of the air-fuel ratio sensor 12. Specifically, since the calculation is performed as shown in FIG. 5 described in detail as the first example, detailed descriptions thereof are omitted.

<Two-Rotation Component Phase Calculation Unit (FIG. 34)>

The two-rotation component phase calculation unit 1502 calculates two-rotation component phase (Phase). Specifically, first, Phase0 (two-rotation component phase base value) is calculated from R_2rev and I_2rev by using the following Expression.

$$\text{Phase0} = \arctan 2(I\_2\text{rev}/R\_2\text{rev}) \times (180/\pi)$$

Here, arctan 2 indicates the calculation of an arc tangent value (=phase) corresponding to a fourth quadrant (−180 to 180 deg). In addition, a Phase (two-rotation component phase) in which the range of the phase is set to 0 to 360 deg is obtained.

Specifically, in the case that Phase0<0, Phase=Phase0+360, and in the other cases, Phase=Phase0.

<First Air-Fuel Ratio Deviation Cylinder Detection Unit (FIG. 35)>

The first air-fuel ratio deviation cylinder detection unit 1503 detects the cylinder, in which the air-fuel ratio is deviated as shown in FIG. 35, using the Phase (two-rotation component phase). First, as shown in the following Expressions, flags (f_a_2rev, f_b_2rev, f_c_2rev, and f_d_2rev) are initialized.

$$f\_a\_2rev=0, f\_b\_2rev=0, f\_c\_2rev=0, \text{ and } f\_d\_2rev=0.$$

In addition, in the case that K1_Phase≤Phase≤K2_Phase, the air-fuel of the first cylinder is richest or the air-fuel ratio of the fourth cylinder is leanest, and the first cylinder rich flag or the fourth cylinder lean flag (f_a_2rev) is set to 1. In the engine 9 having four cylinders, if an ignition order (combustion order) is the first cylinder→the third cylinder→the fourth cylinder→the second cylinder, for example, in a case where the air-fuel ratio of the first cylinder is deviated to the rich side and in a case where the air-fuel ratio of the fourth cylinder is deviated to the lean side, the phases substantially overlap with each other, and thus, the cylinder cannot be specified. However, since it is possible to specify that the first cylinder is rich or the fourth cylinder is lean, the detection results are defined as the first cylinder being rich or the fourth cylinder being lean.

Hereinafter, similarly, the second cylinder rich flag or the third cylinder lean flag (f_b_2rev) is set to 1 in the case that K2_Phase≤Phase<K3_Phase, the third cylinder rich flag or the second cylinder lean flag (f_c_2rev) is set to 1 in the case that K3_Phase≤Phase<K4_Phase, and the fourth cylinder rich flag or the first cylinder lean flag (f_d_2rev) is set to 1 in the case that K4_Phase≤Phase<K5_Phase. In addition, the values of K1_Phase, K2_Phase, K3_Phase, K4_Phase, and K5_Phase which are threshold values used to discriminate the Phase (two-rotation component phase) are appropriately determined in advance.

<Two-Rotation Component Power Calculation Unit (FIG. 36)>

The two-rotation component power calculation unit 1504 calculates the two-rotation component power (Power). Specifically, as shown in FIG. 36, the Power (two-rotation component power) is calculated from R_2rev and I_2rev using the following Expression (Expression 2).

$$\text{Power}=\sqrt{(R\_2rev \times R\_2rev)+(I\_2rev \times I\_2rev)} \quad \text{[Expression 2]}$$

<Cylinder-by-Cylinder Rotation Change Calculation Unit (FIG. 37)>

As shown in FIG. 37, the cylinder-by-cylinder rotation change calculation unit 1505 calculates the rotation changes (dNe_1, dNe_2, dNe_3, and dNe_4) of the cylinders. First, the difference (the amount of change in the rotational speed (Ne) during a predetermined time) between the current value and the previous value of Ne (rotation speed) is calculated, and is defined as dNe (rotation change). Moreover, as described below, the rotation changes (dNe_1, dNe_2, dNe_3, and dNe_4) of the cylinders, that is, the first cylinder rotation change (dNe_1), the second cylinder rotation change (dNe_2), the third cylinder rotation change (dNe_3), and the fourth cylinder rotation change (dNe_4) are calculated.

In the case that CYLCNT=1, dNe_1=dNe_1 (previous value), dNe_2=dNe_2 (previous value), dNe_3=dNe_3 (previous value), and dNe_4=dNe In the case that CYLCNT=2, dNe_1=dNe_1 (previous value), dNe_2=dNe_2 (previous value), dNe_3=dNe, and dNe_4=dNe_4 (previous value)

In the case that CYLCNT=3, dNe_=dNe_1 (previous value), dNe_2=dNe, dNe_3=dNe_3 (previous value), and dNe_4=dNe_4 (previous value)

In the case that CYLCNT=4, dNe_1=dNe, dNe_2=dNe_2 (previous value), dNe_3=dNe_3 (previous value), and dNe_4=dNe_4 (previous value)

<Second Air-Fuel Ratio Deviation Cylinder Detection Unit (FIG. 38)>

The second air-fuel ratio deviation cylinder detection unit 1506 detects the cylinder in which the air-fuel ratio is deviated, using the rotation changes (dNe_1, dNe_2, dNe_3, and dNe_4) of the cylinders. Specifically, as shown in FIG. 38, first, by initializing flags (f_1R_dNe, f_2R_dNe, f_3R_dNe, f_4R_dNe, f_1L_dNe, f_2L_dNe, f_3L_dNe, and f_4L_dNe), f_1R_dNe=0, f_2R_dNe=0, f_3R_dNe=0, f_4R_dNe=0, f_1L_dNe=0, f_2L_dNe=0, f_3L_dNe=0, and f_4L_dNe=0.

In addition, based on the rotation changes (dNe_1, dNe_2, dNe_3, and dNe_4) of the cylinders, processing for erecting one of the flags (f_1R_dNe, f_2R_dNe, f_3R_dNe, f_4R_dNe, f_1L_dNe, f_2L_dNe, f_3L_dNe, and f_4L_dNe) is performed. When the maximum value out of dNe_1, dNe_2, dNe_3, and dNe_4 is dNe_1, the air-fuel ratio of the first cylinder is richest, and thus, the first cylinder rich flag (f_1R_dNe) is set to 1.

Moreover, when the maximum value out of dNe_1, dNe_2, dNe_3, and dNe_4 is dNe_2, the air-fuel ratio of the second cylinder is richest, and the second cylinder rich flag (f_2R_dNe) is set to 1. In addition, when the maximum value out of dNe_1, dNe_2, dNe_3, and dNe_4 is dNe_3, the air-fuel ratio of the third cylinder is richest, and the third cylinder rich flag (f_3R_dNe) is set to 1.

Moreover, when the maximum value out of dNe_1, dNe_2, dNe_3, and dNe_4 is dNe_4, the air-fuel ratio of the fourth cylinder is richest, and the fourth cylinder rich flag (f_4R_dNe) is set to 1. Meanwhile, when the minimum value out of dNe_1, dNe_2, dNe_3, and dNe_4 is dNe_1, the air-fuel ratio of the first cylinder is leanest, and thus, the first cylinder lean flag (f_1R_dNe) is set to 1.

In addition, when the minimum value out of dNe_1, dNe_2, dNe_3, and dNe_4 is dNe_2, the air-fuel ratio of the second cylinder is leanest, and thus, the second cylinder lean flag (f_2L_dNe) is set to 1. Moreover, when the minimum value out of dNe_1, dNe_2, dNe_3, and dNe_4 is dNe_3, the air-fuel ratio of the third cylinder is leanest, and thus, the third cylinder lean flag (f_3L_dNe) is set to 1.

Moreover, when the minimum value out of dNe_1, dNe_2, dNe_3, and dNe_4 is dNe_4, the air-fuel ratio of the fourth cylinder is leanest, and thus, the fourth cylinder lean flag (f_4L_dNe) is set to 1. In addition, with respect to the same cylinder, when the rich flags (f_1R_dNe, f_2R_dNe, f_3R_dNe, and f_4R_dNe) and the lean flags (f_1L_dNe, f_2L_dNe, f_3L_dNe, and f_4L_dNe) are 1, the lean determination is prioritized, and thus, the rich flags (f_1R_dNe, f_2R_dNe, f_3R_dNe, and f_4R_dNe) are reset to 0 while the lean flags (f_1L_dNe, f_2L_dNe, f_3L_dNe, and f_4L_dNe) are maintained at 1.

<Third Air-Fuel Ratio Deviation Cylinder Detection Unit (FIG. 39)>

The third air-fuel ratio deviation cylinder detection unit 1507 finally specifies the cylinder in which the air-fuel ratio is deviated, using the detection results of the first air-fuel ratio deviation cylinder detection unit 1503 and the detection results of the second air-fuel ratio deviation cylinder detection unit 1506. Specifically, as shown in FIG. 39, first, by initializing the flags (f_1R, f_2R, f_3R, f_4R, f_1L, f_2L, f_3L, and f_4L) which set the final determination results of the cylinder in which the air-fuel ratio is deviated, f_1R=0, f_2R=0, f_3R=0, f_4R=0, f_1L=0, f_2L=0, f_3L=0, and f_4L=0.

In addition, in the case that f_a_2rev=1 and f_1R_dNe=1, when it is determined that the air-fuel ratio of the first cylinder is richest from the phase information related to the two-rotation component of the signal of the air-fuel ratio sensor and the air-fuel ratio of the first cylinder is richest from the rotation change information obtained from the signal of the crank angle sensor, that is, when both the phase information related to the two-rotation component of the signal of the air-fuel ratio sensor and the rotation change information obtained from the signal of the crank angle sensor indicate that the air-fuel ratio of the first cylinder is richest, it is finally determined that the air-fuel ratio of the first cylinder is richest, and thus, the first cylinder rich flag (f_1R) is set to 1.

Hereinafter, similarly, f_2R=1 in the case that f_b_2rev=1 and f_2R_dNe=1, f_3R=1 in the case that f_c_2rev=1 and f_3R_dNe=1, and f_4R=1 in the case that f_d_2rev=1 and f_4R_dNe=1. Moreover, in the case that f_d_2rev=1 and f_1L_dNe=1, when it is determined that the air-fuel ratio of the first cylinder is leanest from the phase information related to the two-rotation component of the signal of the air-fuel ratio sensor and the air-fuel ratio of the first cylinder is leanest from the rotation change information obtained from the signal of the crank angle sensor, that is, when both the phase information related to the two-rotation component of the signal of the air-fuel ratio sensor and the rotation change information obtained from the signal of the crank angle sensor indicate that the air-fuel ratio of the first cylinder is leanest, it is finally determined that the air-fuel ratio of the first cylinder is leanest, and thus, the first cylinder lean flag (f_1L) is set to 1. Hereinafter, similarly, f_2L=1 in the case that f_c_2rev=1 and f_2L_dNe=1, f_3L=1 in the case that f_b_2rev=1 and f_3L_dNe=1, and f_4L=1 in the case that f_a_2rev=1 and f_4L_dNe=1

<Air-Fuel Ratio Estimation Unit of Air-Fuel Ratio Deviation Cylinder (FIG. 40)>

The air-fuel ratio estimation unit 1508 of air-fuel ratio deviation cylinder calculates the air-fuel ratio deviation cylinder number (k_cyl) and the air-fuel ratio (estRabf_k_cyl) of the air-fuel ratio deviation cylinder. Specifically, as shown in FIG. 40, with respect to the air-fuel ratio deviation cylinder number (k_cyl), when the air-fuel ratio of the first cylinder is richest or leanest and f_1R=1 or f_1L=1 is satisfied, the air-fuel ratio deviation cylinder number (k_cyl) is set to 1.

Hereinafter, similarly, k_cyl=2 in the case that f_2R=1 or f_2L=1, k_cyl=3 in the case that f_3R=1 or f_3L=1, and k_cyl=4 in the case that f_4R=1 or f_4L=1. In addition, as processing for calculating the air air-fuel ratio (estRabf_k_cyl) of the air-fuel ratio deviation cylinder, when any one of the rich flags (f_1R, f_2R, f_3R, and f_4R) is 1, the rich flag (f_R) is set to 1, and when any one of the rich flags (f_1L, f_2L, f_3L, and f_4L) is 1, the lean flag (f_L) is set to 1.

Moreover, with respect to the air-fuel ratio (estRabf_k_cyl) of the air-fuel ratio deviation cylinder, estRabf_k_cyl=Rabf−dRabf in the case that f_R=1, and estRabf_k_cyl=Rabf+dRabf in the case that f_L=1. Here, Rabf is the output signal (Rabf) of the air-fuel ratio sensor 12 and indicates the average air-fuel ratio of each cylinder, and the air-fuel ratio deviation amount (dRabf) is a value which is obtained by converting the two-rotation component power (Power), that is, the amplitude during the two-rotation period of the engine in the signal (Rabf) of the air-fuel ratio sensor 12 based on the table (Tbl_estRabf). The conversion characteristics of the table (Tbl_estRabf) are obtained by setting the correlation between the two-rotation component power (Power) and the deviation amount of the air-fuel ratio according to the characteristics of the engine in advance.

<Injection Characteristic Change Detection Unit (FIG. 41)>

As shown in FIG. 41, the injection characteristic change detection unit 1509 includes a k_cylth cylinder reference fuel injection amount calculation unit 1509A, a k_cylth cylinder actual fuel injection amount calculation unit 1509B, and a k_cylth cylinder injection characteristic change calculation unit 1509C. The k_cylth cylinder reference fuel injection amount calculation unit 1509A calculates a k_cylth cylinder reference fuel injection amount (QF0_k_cyl) from TI_k_cyl, S_k_cyl (previous value), and QFD_k_cyl (previous value).

The k_cylth cylinder actual fuel injection amount calculation unit 1509B calculates a k_cylth cylinder actual fuel injection amount c (QF_k_cyl_c), a k_cylth cylinder reference fuel injection amount c (QF0_k_cyl_c), an nth cylinder actual fuel injection amount b (QF_k_cyl_b), and an nth cylinder reference fuel injection amount b (QF0_k_cyl_b) from QF0_k_cyl, TI_k_cyl, and Rabf_k_cyl. The k_cylth cylinder injection characteristic change calculation unit 1509C calculates a k_cylth cylinder static flow characteristic change (S_k_cyl) and a k_cylth cylinder dynamic flow characteristic change (QFD_k_cyl) from QF_k_cyl_c, QF0_k_cyl_c, QF_k_cyl_b, and QF0_k_cyl_b. Hereinafter, the k_cylth cylinder reference fuel injection amount calculation unit 1509A, the k_cylth cylinder actual fuel injection amount calculation unit 1509B, and the k_cylth cylinder injection characteristic change calculation unit 1509C will be described in detail.

<K_Cylth Cylinder Reference Fuel Injection Amount Calculation Unit (FIG. 42)>

The k_cylth cylinder reference fuel injection amount calculation unit 1509A calculates the k_cylth cylinder reference fuel injection amount (QF0_k_cyl). Specifically, as shown in FIG. 42, TI_k_cyl (k_cylth cylinder fuel injection pulse width) is converted into the amount of injected fuel using the table Tbl_QF0, QFD_k_cyl (k_cylth cylinder dynamic flow characteristic change) is added to the amount of injected fuel obtained by the conversion, and a value, which is obtained by multiplying the value obtained from the addition by S_k_cyl (k_cylth cylinder static flow characteristic change), is defined as QF0_k_cyl (k_cylth cylinder reference fuel injection amount).

The table Tbl_QF0 is equivalent to the design value (errorless ideal characteristic) of the correlation between the amount of injected fuel and the injection pulse width of an unused fuel injection valve 7 before the injection characteristics of the fuel injection valve are changed. In addition, S_k_cyl and QFD_k_cyl may be updated when S_k_cyl and QFD_k_cyl are compared with the previous values and are changed so as to be equal to or greater than a predetermined value, and may not be updated when S_k_cyl and QFD_k_cyl are not changed.

<k_Cylth Cylinder Actual Fuel Injection Amount Calculation Unit (FIG. 43)>

The k_cylth cylinder actual fuel injection amount calculation unit 1509B calculates the k_cylth cylinder actual fuel injection amount c (QF_k_cyl_c), the k_cylth cylinder reference fuel injection amount c (QF0_k_cyl_c), the k_cylth cylinder actual fuel injection amount b (QF_k_cyl_b), and the k_cylth cylinder reference fuel injection amount b (QF0_k_cyl_b) based on TI_k_cyl (k_cylth cylinder fuel injection pulse width), QF0_k_cyl (k_cylth cylinder reference fuel injection amount), and the air-fuel ratio (estRabf_k_cyl) of the air-fuel ratio deviation cylinder.

Specifically, as shown in FIG. 43, AFO_k_cyl_c=Alpha×Rabf_k_cyl, QF0_k_cyl_c=QF0_k_cyl, and QF_k_cyl_c=AFst/AFO_k_cyl_c×QF0_k_cyl in the case that TI_k_cyl≥KTIc, AFO_k_cyl_b=Alpha×Rabf_k_cyl, QF0_k_cyl_b=QF0_k_cyl, and QF_k_cyl_b=AFst/AFO_k_cyl_b×QF0_k_cyl in the case that TI_k_cyl≤KTIb, and thus, QF_k_cyl_c, QF0_k_cyl_c, QF_k_cyl_b, and QF0_k_cyl_b are calculated.

Here, TI_k_cyl is the k_cylth cylinder fuel injection pulse width, QF0_k_cyl is k_cylth cylinder reference fuel injection amount, Rabf_k_cyl is the k_cylth cylinder air-fuel ratio, AFO_k_cyl is the air-fuel ratio (base air-fuel ratio) of the cylinder when the air-fuel ratio feedback control is not performed, Alpha is the fuel injection amount correction coefficient used in the air-fuel ratio feedback control, and AFst is the errorless and ideal air-fuel ratio of the fuel injection valve 7, that is, the target air-fuel ratio (generally, the theoretical air-fuel ratio). In addition, in the case that KTIc>KTIb, the deviation between KTIc and KTIb is set so as to be a sufficient value at which the k_cylth cylinder static flow characteristic change (S_k_cyl) and the k_cylth cylinder dynamic flow characteristic change (QFD_k_cyl) are obtained from the actual injection amount of each of the two fuel injection pulse widths which are different from each other, as described below.

<K_Cylth Cylinder Injection Characteristic Change Calculation Unit (FIG. 44)>

The k_cylth cylinder injection characteristic change calculation unit 1509C calculates the k_cylth cylinder static flow characteristic change (S_k_cyl) and the k_cylth cylinder dynamic flow characteristic change (QFD_k_cyl) based on the k_cylth cylinder actual fuel injection amount c (QF_k_cyl_c), the k_cylth cylinder reference fuel injection amount c (QF0_k_cyl_c), the k_cylth cylinder actual fuel injection amount b (QF_k_cyl_b), and the k_cylth cylinder reference fuel injection amount b (QF0_k_cyl_b).

Specifically, as shown in FIG. 44, S_k_cyl and QFD_k_cyl are calculated according to the following expression.

$$S\_k\_cyl=(QF\_k\_cyl\_c-QF\_k\_cyl\_b)/(QF0\_k\_cyl\_c-QF0\_k\_cyl\_b)$$

$$QFD\_k\_cyl=QF\_k\_cyl\_c/S\_k\_cyl-QF0\_k\_cyl\_c$$

<Fuel Injection Pulse Width Limitation Unit (FIG. 45)>

The fuel injection pulse width limitation unit 2500 calculates the minimum value (Min_TI) of the fuel injection pulse width. Specifically, as shown in FIG. 45, first, a k_cylth cylinder lean limitation equivalent fuel injection amount (QF0_k_cyl_L) is calculated from the k_cylth cylinder static flow characteristic change (S_k_cyl) and the k_cylth cylinder dynamic flow characteristic change (QFD_k_cyl), according to the following expression.

$$QF0\_k\_cyl\_L=(R/(1-R))\times QFD\_k\_cyl$$

$$R=KAF\_L/AF\_st\times Alpha\_GK\times S\_k\_cyl$$

In the above expression, KAF_L is the lean limitation equivalent air-fuel ratio (based on 16 to 17), and AF_st is the theoretical air-fuel ratio equivalent value. In addition, Alpha_GK is the learning value of the fuel injection amount correction coefficient Alpha used in the air-fuel ratio feedback control, and the amount of injected fuel increases (the air-fuel ratio becomes rich) as the value of Alpha_GK increases, and the amount of injected fuel decreases (the air-fuel ratio becomes lean) as the value of Alpha_GK decreases.

Next, the k_cylth cylinder lean limitation equivalent fuel injection amount (QF0_k_cyl_L) is converted into TI0_k_cyl_L (k_cylth cylinder lean limitation equivalent fuel injection pulse width) using a table Tbl_TI0. The table Tbl_TI0 is a table which inverts the input column and the output column of the table Tbl_QF0, using the k_cylth cylinder reference fuel injection amount calculation unit 1509A. If TI0_k_cyl_L (k_cylth cylinder lean limitation equivalent fuel injection pulse width) is obtained, the maximum value of TI0_k_cyl_L (k_cyl:1 to 4) is defined as Min_TI (fuel injection pulse width minimum value).

<Fuel Injection Pulse Width Calculation Unit (FIG. 8)>

The fuel injection pulse width calculation unit 3500 calculates the fuel injection pulse widths (TI_1, TI_2, TI_3, and TI_4) of the cylinders. Specifically, similar to FIG. 1, since the fuel injection pulse widths (TI_1, TI_2, TI_3, and TI_4) of the cylinders are calculated as shown in FIG. 8, detailed descriptions thereof are omitted.

Effects of Fifth Example

For example, it is not possible to distinguish the case in which the air-fuel ratio of the first cylinder is deviated to the rich side and the air-fuel ratio of the fourth cylinder is deviated to the lean side from the Phase (two-rotation component phase) of the signal of the air-fuel ratio sensor. However, it is possible to specify the first cylinder rich state or the fourth cylinder lean state. Accordingly, by comparing the cylinder which is determined to be leanest or richest based on the rotation change of the engine, and the determination results of the deviation in the air-fuel ratio based on the Phase (two-rotation component phase), it is possible to accurately detect the variation in the air-fuel ratio.

Since the change over time of the fuel injection valve is mainly generated due to the static flow characteristics and the dynamic flow characteristics, if the changes of the static flow characteristics and the changes of dynamic flow characteristics of the fuel injection valve of each cylinder can be detected, it is also possible to estimate an amount of deviation in the air-fuel ratio with respect to an arbitrary fuel injection pulse width. Accordingly, similar to the fourth example, by detecting the changes of the static flow characteristics and the changes of dynamic flow characteristics, it is also possible to estimate the fuel injection pulse width which deviates from the flammable air-fuel ratio, and thus, it is possible to appropriately limit the fuel injection pulse width.

Sixth Example

In a sixth example described in detail below, the variation in the air-fuel ratio between cylinders is detected based on the amplitude (power) during the two-rotation period of the engine of the signal of the air-fuel ratio sensor, the minimum value (Min_TI) of the fuel injection pulse width is set based on the amplitude, and the injection at the injection pulse width lower than the minimum value (Min_TI) is prevented by switching performance and nonperformance of a multi-stage injection according to the minimum value (Min_TI). Since the engine system of the sixth example is similar to that shown in FIG. 1 of the first example, detailed descriptions thereof are omitted. In addition, since the internal configuration of the control unit 16 of the sixth example is similar to that shown in FIG. 2 of the first example, and detailed descriptions thereof are omitted.

FIG. 46 shows a functional block diagram showing the control contents of the control unit 16 in the sixth example, and an inter-cylinder air-fuel ratio variation detection unit 1600, a fuel injection pulse width limitation unit 2600, and a multi-stage injection control permission unit 3600 are provided. The inter-cylinder air-fuel ratio variation detection unit 1600 calculates the air-fuel ratio variation index (Ind_imb) based on the two-rotation component of the signal (Rabf) of the air-fuel ratio sensor 12, the fuel injection pulse width limitation unit 2600 calculates the (allowable) minimum value (Min_TI) of the fuel injection pulse width from the air-fuel ratio variation index (Ind_imb), and the multi-stage injection control permission unit 3600 calculates a multi-stage injection control permission flag (fTADAN) based on the fuel injection pulse width minimum value (Min_TI) or the like. Hereinafter, each calculation unit will be described in detail.

<Inter-Cylinder Air-Fuel Ratio Variation Detection Unit (FIG. 4)>

The inter-cylinder air-fuel ratio variation detection unit 1600 calculates the air-fuel ratio variation index (Ind_Imb). Specifically, as shown in FIG. 4, the two-rotation component calculation unit (FIG. 5) and the air-fuel ratio variation index (FIG. 6) are provided, and the inter-cylinder air-fuel ratio variation detection unit 1600 calculates the air-fuel ratio variation index (Ind_Imb) based on the two-rotation component of the signal (Rabf) of the air-fuel ratio sensor 12. This is similar to the inter-cylinder air-fuel ratio variation detection unit 1100 of the first example, and thus, detailed descriptions thereof are omitted.

<Fuel Injection Pulse Width Limitation Unit (FIG. 7)>

The fuel injection pulse width limitation unit 2600 calculates the allowable minimum value (Min_TI) of the fuel injection pulse width from the air-fuel ratio variation index (Ind_Imb). The calculation of the allowable minimum value (Min_TI) is shown in FIG. 7 and is similar to that of the first example, and thus, detailed descriptions thereof are omitted.

<Multi-Stage Injection Control Permission Unit (FIG. 47)>

As shown in FIG. 47, the multi-stage injection control permission unit 3600 calculates the multi-stage injection control permission flag (fTADAN). The multi-stage injection control (split injection control) is a control which performs the fuel injection multiple times during one cycle, and includes a case where the injection is performed multiple times at the same pulse width and a case where the injection is performed multiple times at pulse widths different from each other.

With respect to the multi-stage injection control permission flag (fTADAN), as shown in FIG. 47, when all of a plurality of conditions permits the multi-stage injection, a multi-stage injection control permission flag (fTADAN) is set to 1. The multi-stage injection control is performed if the multi-stage injection control permission flag (fTADAN) is set to 1, the multi-stage injection control is not performed if the multi-stage injection control permission flag (fTADAN) is set to 0, and the fuel injection is performed once during one cycle. As one of the permission conditions of the multi-stage injection, a condition in which the shortest pulse width (K1_Min_TI) of the injection performed multiple times during one cycle is equal to or greater than the allowable minimum value (Min_TI) is set in the multi-stage injection control, and when the pulse width (K1_Min_TI) is less than the allowable minimum value (Min_TI), the multi-stage injection control is not performed (is inhibited).

When the multi-stage injection control is not performed, the pulse width is increased by measuring the plurality of times of injection, and it is possible to perform the fuel injection at the pulse width equal to or greater than the allowable minimum value (Min_TI). Accordingly, switching from performance of the multi-stage injection control to nonperformance thereof limits the pulse width so as to be equal to or greater than the allowable minimum value (Min_TI). In addition, as the permission conditions of the multi-stage injection other than the condition in which the pulse width (K1_Min_TI) is equal to or greater than the allowable minimum value (Min_TI), there is a condition in which the water temperature of the engine, the engine rotation speed, the load of the engine, or the like is within a predetermined range.

Moreover, instead of the case where the multi-stage injection control is not performed when the pulse width (K1_Min_TI) is less than the allowable minimum value (Min_TI), it is possible to decrease the number of times of the injection per one cycle. For example, in a case where the injection is set so as to be performed three times during one cycle, the allowable minimum value (Min_TI) is changed so as to be increased according to the increase of the variation in the air-fuel ratio via the changes of the injection characteristics. As a result, when the pulse width (K1_Min_TI) is less than the allowable minimum value (Min_TI), the number of times that the injection is performed is decreased to two-times, and when the pulse width (K1_Min_TI) in the two injections is equal to or greater than the allowable minimum value (Min_TI), the injection is switched from the three injections to the two injections during one cycle. In addition, in a case where the pulse width (K1_Min_TI) is less than the allowable minimum value (Min_TI) even when the number of times that the injection is performed is decreased to two-times, the number of times that the injection is performed is decreased to one-time, and thus, the fuel injection is performed at the pulse width equal to or greater than the allowable minimum value (Min_TI).

Moreover, in the multi-stage injection control which performs the injection multiple times at the pulse widths which are different from each other, by decreasing the difference between the pulse widths during the multiple injections, it is possible to set the pulse width (K1_Min_TI) so as to be equal to or greater than the allowable minimum value (Min_TI). For example, in the case where the two injections are set so as to be performed during one cycle, when a first injection pulse width is set so as to be greater than the second injection pulse, the first injection pulse width is equal to or greater than the allowable minimum value (Min_TI). However, since the second injection pulse width is less than the allowable minimum value (Min_TI), by changing the distribution rates of the first injection amount and the second injection amount and increasing the second injection pulse width by the decrease of the first injection pulse width, it is also possible to set the second injection pulse width so as to be equal to or greater than the allowable minimum value (Min_TI).

Moreover, by combining the change of the number of times of the injection and the changes of the distribution rates of the injection amount, it is possible to set the pulse width (K1_Min_TI) in the multi-stage injection so as to be equal to or greater than the allowable minimum value (Min_TI). In addition, when the variation in the air-fuel ratio is increased due to the changes over time of the injection characteristics of the fuel injection valve 7 and the allowable minimum value (Min_TI) is changed to a value exceeding the set value, the multi-stage injection control may not be performed without comparing the pulse width (K1_Min_TI) and the allowable minimum value (Min_TI). Moreover, the calculation processing of the allowable minimum value (Min_TI) in the sixth example is not limited to the same processing as the first example, and it is possible to combine performance/nonperformance of the multi-stage injection control based on the allowable minimum value (Min_TI) of the sixth example and the calculation processing of the allowable minimum values (Min_TI) in the second to fifth examples.

Effects of Sixth Example

When the variation in the air-fuel ratio occurs according to the changes of the injection characteristics due to the change over time of the fuel injection valve 7, the case where the air-fuel ratio exceeds the flammable range and becomes excessively lean is prevented by switching the performance of the multi-stage injection control to the nonperformance thereof and limiting the injection pulse width so as to be equal to or greater than the allowable minimum value (Min_TI), and thus, a decrease in stability of the engine is prevented. In addition, when the injection pulse width is limited so as to be equal to or greater than the allowable minimum value (Min_TI) by changing the number of times of performing the injection and/or the distribution rate of the injection, it is possible to prevent the air-fuel ratio from exceeding the flammable range and becoming lean while preventing a decrease in formation performance of the fuel-air mixture generated by the multi-stage injection control.

Seventh Example

In a seventh example described in detail below, the variation in the air-fuel ratio between the cylinders is detected based on the amplitude (power) of the two-rotation period of the engine in the signal of the air-fuel ratio sensor, the minimum value (Min_TI) of the fuel injection pulse width is set based on the amplitude, performance and nonperformance of low rotation control during an idle operation are switched with each other according to the minimum value (Min_TI), and thus, the injection at the injection pulse width less than the minimum value (Min_TI) is prevented. Since the engine system of the seventh example is similar to that shown in FIG. 1 of the first example, detailed descriptions thereof are omitted. In addition, since the internal configuration of the control unit 16 of the seventh example is similar to that shown in FIG. 2 of the first example, detailed descriptions thereof are omitted.

FIG. 48 shows a functional block diagram showing the control contents of the control unit 16 in the seventh example, and an inter-cylinder air-fuel ratio variation detection unit 1700, a fuel injection pulse width limitation unit 2700, and an idle target rotating speed calculation unit 3700 are provided. The inter-cylinder air-fuel ratio variation detection unit 1700 calculates the air-fuel ratio variation index (Ind_imb) based on the two-rotation component of the signal (Rabf) of the air-fuel ratio sensor 12, the fuel injection pulse width limitation unit 2700 calculates the (allowable) minimum value (Min_TI) of the fuel injection pulse width from the air-fuel ratio variation index (Ind_imb), and the idle target rotating speed calculation unit 3700 calculates an idle target rotational speed (TgNe) based on the fuel injection pulse width minimum value (Min_TI) or the like.

Hereinafter, each calculation unit will be described in detail.

<Inter-Cylinder Air-Fuel Ratio Variation Detection Unit (FIG. 4)>

The inter-cylinder air-fuel ratio variation detection unit 1700 calculates the air-fuel ratio variation index (Ind_Imb). Specifically, as shown in FIG. 4, the two-rotation component calculation unit (FIG. 5) and the air-fuel ratio variation index (FIG. 6) are provided, and the inter-cylinder air-fuel ratio variation detection unit 1700 calculates the air-fuel ratio variation index (Ind_Imb) based on the two-rotation component of the signal (Rabf) of the air-fuel ratio sensor 12. This is similar to the inter-cylinder air-fuel ratio variation detection unit 1100 of the first example, and thus, detailed descriptions thereof are omitted.

<Fuel Injection Pulse Width Limitation Unit (FIG. 7)>

The fuel injection pulse width limitation unit 2700 calculates the allowable minimum value (Min_TI) of the fuel injection pulse width from the air-fuel ratio variation index (Ind_Imb). The calculation of the allowable minimum value (Min_TI) is shown in FIG. 7 and is similar to that of the first example, and thus, detailed descriptions thereof are omitted.

<Idle Target Rotating Speed Calculation Unit (FIG. 49)>

As shown in FIG. 49, the idle target rotating speed calculation unit 3700 calculates the idle target rotational speed (TgNe). Specifically, the injection pulse width K2_Min_TI and the allowable minimum value (Min_TI) are compared with each other in the idle operational state of the engine 9, the idle target rotational speed (TgNe) is switched according to the comparison results, Tg_Ne=K1_Tg_Ne in the case that Min_TI≤K2_Min_TI, and Tg_Ne=K2_Tg_Ne in the case that Min_TI>K2_Min_TI. In addition, K1_Tg_Ne<K2_Tg_Ne is satisfied, and K1_Tg_Ne is an initial set value (default value).

That is, when the variation in the air-fuel ratio increases due to the changes over time of the injection characteristics of the fuel injection valve 7 and the air-fuel ratio exceeding the flammable range is likely to be lean, the allowable minimum value (Min_TI) is changed to the increase side, and as a result, if Min_TI>K2_Min_TI is satisfied, the idle target rotation speed (TgNe) increases (the low rotation control is changed so as to be not performed during the idle operation). Since the actual engine rotation speed approaches to the related target rotational speed as the idle target rotational speed (TgNe) increases, the amount of intake air of the engine 9 is controlled so as to be increased. As a result, the injection pulse width during the idling increases and becomes a greater pulse width than the allowable minimum value (Min_TI), and thus, the injection pulse width during the idling is limited so as to be equal to or greater than the allowable minimum value (Min_TI) according to the increase in the idle target rotational speed (TgNe).

In addition, the calculation processing of the allowable minimum value (Min_TI) in the seventh example is not limited to the same processing as the first example, and the change (switching the performance and the nonperformance of the low rotation control during the idle operation) of the idle target rotational speed (TgNe) based on the allowable minimum value (Min_TI) of the seventh example, and the calculation processing of the allowable minimum value (Min_TI) in the second to fifth examples may be combined. In addition, when it is switched from Min_TI≤K2_Min_TI to Min_TI>K2_Min_TI, the target rotational speed (TgNe) gradually increases from the target rotational speed (K1_Tg_Ne) which is the initial set value, and it is possible to stop the increase in the target rotational speed (TgNe) when it is determined that the pulse width is stably less than Min_TI.

Effects of Seventh Example

When the variation in the air-fuel ratio occurs according to the changes of the injection characteristics due to the change over time of the fuel injection valve 7, the case in which the air-fuel ratio exceeds the flammable range and is lean is prevented by increasing the idle target rotational speed (TgNe) and limiting the injection pulse width so as to be equal to or greater than the allowable minimum value (Min_TI), and thus, it is possible to prevent the decrease of the stability of the engine.

In addition, the present invention is not limited to the contents of the above-described embodiments, and various modifications may be applied within a range which does not depart from the gist of the present invention. For example, the fuel injection valve 7 is not limited to a fuel injection valve which directly injects fuel into the cylinder, and may be a fuel injection valve which injects fuel into an intake pipe.

In addition, with respect to the detection of the variation in the air-fuel ratio based on the exhaust air-fuel ratio, instead of the air-fuel ratio sensor which linearly detects the air-fuel ratio, it is possible to detect the variation in the air-fuel ratio from signals of a sensor (oxygen sensor) which detects richness or leanness state of air-fuel ratio with respect to the theoretical air-fuel ratio. In addition, as shown in FIG. 7, the present invention is not limited to the configuration in which the variation in the air-fuel ratio is determined in two stages such as the large variation and the small variation. That is, the level of the variation in the air-fuel ratio may be determined in three stages or more, and thus, the allowable minimum value (Min_TI) may be switched to three or more values.

In addition, when the variation in the air-fuel ratio exceeds the threshold value, it is possible to alert a driver of a vehicle using an alarm device (lamp or buzzer). Moreover, a device which detects the air-fuel ratio from strength of light passing through the fuel-air mixture inside the combustion chamber is provided in each cylinder, and it is possible to calculate the variation in the air-fuel ratio from the air-fuel ratio of each cylinder which is detected by the related air-fuel ratio detection device.

Moreover, it is possible to detect the variation in the air-fuel ratio from the variation between the cylinders of the pressure in the combustion chamber (cylinder internal pressure). In addition, in the engine which is operated at the air-fuel ratio which is leaner than the theoretical air-fuel ratio, it is possible to limit the injection pulse width so as to be equal to or greater than the allowable minimum value (Min_TI) by enriching (including switching the operation to the operation at the theoretical air-fuel ratio) the target air-fuel ratio.

REFERENCE SIGNS LIST

1: AIR CLEANER, 2: AIR FLOW SENSOR, 3: ELECTRONIC THROTTLE, 4: INTAKE AIR PIPE, 5: COLLECTOR, 6: ACCELERATOR, 7: FUEL INJECTION VALVE, 8: IGNITION PLUG, 9: ENGINE, 10: EXHAUST PIPE, 11: THREE-WAY CATALYST, 12: AIR-FUEL RATIO SENSOR, 13: ACCELERATOR OPENING SENSOR, 14: WATER TEMPERATURE SENSOR, 15: ENGINE SPEED SENSOR, 16: CONTROL UNIT, 17: THROTTLE OPENING SENSOR, 18: EXHAUST RECIRCULATING PIPE, 19: EXHAUST RECIRCULATION AMOUNT ADJUSTMENT VALVE, 20: OXYGEN SENSOR, 21: CPU, 22: ROM, 23: RAM, 24: INPUT CIRCUIT, 25: INPUT/OUTPUT PORT, 26: IGNITION OUTPUT CIRCUIT, 27: FUEL INJECTION VALVE DRIVE CIRCUIT, 28: ELECTRONIC THROTTLE DRIVE CIRCUIT, 29: INTAKE AIR TEMPERATURE SENSOR, 30: VEHICLE SPEED SENSOR, 31: FIRST CYLINDER AIR-FUEL RATIO SENSOR, 32: SECOND CYLINDER AIR-FUEL RATIO SENSOR, 33: THIRD CYLINDER AIR-FUEL RATIO SENSOR, 34: FOURTH CYLINDER AIR-FUEL RATIO SENSOR

The invention claimed is:

1. An apparatus for an engine, the apparatus comprising:
a control device that is configured to control the engine, the engine being a multi-cylinder engine in which a fuel injection valve is provided in each of a plurality of cylinders, wherein
the control device is configured to control the fuel injection valve such that a minimum value of an injection pulse width of the fuel injection valve is limited to be more than a predetermined value when variation in an air-fuel ratio between the plurality of cylinders is detected during operation of the multi-cylinder engine, and
the control device is further configured to detect a static flow characteristic change and a dynamic flow characteristic change of the fuel injection valve of each cylinder based on the air-fuel ratio of each cylinder, and the predetermined value is changed based on the static flow characteristic change and the dynamic flow characteristic change of the fuel injection valve of each cylinder.

2. The apparatus according to claim 1, wherein the control device is further configured to detect the variation in the air-fuel ratio when the injection pulse width is greater than a first predetermined value, and the injection pulse width is limited so as to be greater than a second predetermined value (first predetermined value>second predetermined value) when the variation in the air-fuel ratio is greater than a set value.

3. The apparatus according to claim 2, wherein the control device is further configured to detect amplitude during a two-rotation period of an engine in an exhaust air-fuel ratio of an exhaust pipe collection portion.

4. The apparatus according to claim 2, wherein the control device is further configured to detect a variation in a rotation change in each cylinder as the index value of the variation in the air-fuel ratio.

5. The apparatus according to claim 2, wherein the control device is further configured to detect a width of the variation in the air-fuel ratio in each cylinder.

6. The apparatus according to claim 1, wherein the control device is further configured to detect the static flow characteristic change and the dynamic flow characteristic change of the fuel injection valve of each cylinder based on the air-fuel ratio of each cylinder in each of the injection pulse widths which are different from each other.

7. The apparatus according to claim 6, wherein the control device is further configured to detect an allowable pulse width of each cylinder based on the static flow characteristic change and the dynamic flow characteristic change of the fuel injection valve of each cylinder, and the control device sets the predetermined value based on the allowable pulse width of each cylinder.

8. The apparatus according to claim 7, wherein when the injection pulse width is less than the predetermined value according to an operational state of the engine, the control device is further configured to limit injection pulse width to be greater than the predetermined value by changing the injection pulse width to the predetermined value.

9. The apparatus according to claim 7, wherein when the injection pulse width in each fuel injection is less than the predetermined value in a multi-stage injection in which fuel injection is performed multiple times during one cycle, the control device is further configured to limit the injection pulse width to be greater than the predetermined value by decreasing the number of times of performing the injection in the multi-stage injection or inhibiting the multi-stage injection.

10. The apparatus according to claim 7, wherein when the injection pulse width during an idle operation of the engine is less than the predetermined value, the control device is further configured to limit the injection pulse width to be greater than the predetermined value by increasing engine rotation speed during an idle operation.

11. The apparatus according to claim 10, wherein the predetermined value is a value which makes the air-fuel ratio of each cylinder be within a flammable air-fuel ratio range.

12. A method for controlling an engine, the method comprising:
   controlling a fuel injection valve of the engine, with a control device, such that a minimum value of an injection pulse width of the fuel injection valve is limited to be more than a predetermined value when variation in an air-fuel ratio between a plurality of cylinders of the engine is detected during operation of the engine, and
   detecting, with the control device, a static flow characteristic change and a dynamic flow characteristic change of the fuel injection valve of each cylinder based on the air-fuel ratio of each cylinder, and the predetermined value is changed based on the static flow characteristic change and the dynamic flow characteristic change of the fuel injection valve of each cylinder.

* * * * *